US012755499B2

(12) United States Patent
Arora et al.

(10) Patent No.: US 12,755,499 B2
(45) Date of Patent: Oct. 6, 2026

(54) SYSTEM STATES FOR TRANSITIONING AUGMENTED-REALITY (AR) INTERFACES BETWEEN DIFFERENT DISPLAY MODES, CONFIGURATION USER INTERFACES FOR INPUT AND OUTPUT DEVICES OF AN AR SYSTEM, AND METHODS AND AR DEVICES INCORPORATING SUCH FEATURES

(71) Applicant: Meta Platforms Technologies, LLC, Menlo Park, CA (US)

(72) Inventors: Tushar Arora, Seattle, WA (US); Wai Leong Chak, Bellevue, WA (US); Jonathan Michael Proto, Oakland, CA (US); Johnathon Simmons, Seattle, WA (US); Zachary Gil Freeman, Seattle, WA (US); Pritam Pebam, South San Francisco, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 19/336,445

(22) Filed: Sep. 22, 2025

(65) Prior Publication Data

US 2026/0087754 A1 Mar. 26, 2026

Related U.S. Application Data

(60) Provisional application No. 63/699,088, filed on Sep. 25, 2024.

(51) Int. Cl.
*G06T 19/00* (2011.01)
*G06F 3/01* (2006.01)

(52) U.S. Cl.
CPC ............ *G06T 19/006* (2013.01); *G06F 3/012* (2013.01); *G06F 3/013* (2013.01); *G06F 3/017* (2013.01); *G06T 2200/24* (2013.01)

(58) Field of Classification Search
CPC .......... G06F 3/011; G06F 3/013; G06F 3/017; G06F 3/04815; G06F 3/012;
(Continued)

(56) References Cited

U.S. PATENT DOCUMENTS

| | | | | |
|---|---|---|---|---|
| 2021/0208674 | A1 | 7/2021 | Haine et al. | |
| 2023/0206572 | A1* | 6/2023 | Pazmino ............... | G06T 19/006 345/633 |
| 2024/0411421 | A1* | 12/2024 | Pastrana Vicente .... | G06F 3/011 |

FOREIGN PATENT DOCUMENTS

| | | | |
|---|---|---|---|
| CA | 3084149 | A1 | 6/2019 |
| EP | 3495926 | A1 | 6/2019 |
| WO | 2024136383 | A1 | 6/2024 |

OTHER PUBLICATIONS

Extended European Search Report for European Patent Application No. 25204368.2, dated Jan. 26, 2026, 11 pages.

* cited by examiner

*Primary Examiner* — Dong Hui Liang
(74) *Attorney, Agent, or Firm* — Morgan, Lewis & Bockius LLP

(57) ABSTRACT

A method of switching between augmented-reality (AR) user interface states at an AR headset. The method includes, causing the AR headset to present a glance user interface element at a first portion of a display of the AR headset. The method further includes, in response to a first request from a user of the AR headset to display a follow user interface element, causing the AR headset to present the follow user interface element at a second portion of the display, wherein the second portion is larger than the third portion. The method further includes, in response to a second request from the user of the AR headset to display a home user interface element, causing the AR headset to present the
(Continued)

home user interface element at a third portion of the display, wherein the third portion is larger than the second portion.

20 Claims, 51 Drawing Sheets

(58) Field of Classification Search
CPC .. G06F 3/0482; G06F 3/04842; G06F 3/0346; G06F 3/04845; G06F 3/04883; G06F 3/0304; G06F 3/016; G06F 3/167; G06F 3/0481; G06F 3/0488; G06F 3/015; G06F 3/04817; G06F 3/04847; G06F 3/0484; G06F 1/163; G06F 9/451; G06T 19/006; G06T 2200/24; G06T 2207/30041
See application file for complete search history.

SYSTEM STATES FOR TRANSITIONING AUGMENTED-REALITY (AR) INTERFACES BETWEEN DIFFERENT DISPLAY MODES, CONFIGURATION USER INTERFACES FOR INPUT AND OUTPUT DEVICES OF AN AR SYSTEM, AND METHODS AND AR DEVICES INCORPORATING SUCH FEATURES

RELATED APPLICATIONS

This application claims priority to U.S. Provisional Patent Application No. 63/699,088, entitled "System States For Transitioning Augmented-Reality (AR) Interfaces Between Different Display Modes, Configuration User Interfaces For Input And Output Devices Of An AR System, And Methods And AR Devices Incorporating Such Features" filed Sep. 25, 2024, which is hereby incorporated by reference in its entirety.

TECHNICAL FIELD

This relates generally to system states for transitioning augmented-reality (AR) interfaces between different display modes and configuration user interfaces for input and output devices of an AR system.

BACKGROUND

To help advance acceptance of new device paradigms for augmented-reality (AR) headset and smart glasses, new designs for games are needed to ensure that users enjoy their initial interactions and continue to explore new features and interaction paradigms.

As such, there is a need to address one or more of the above-identified challenges. A brief summary of solutions to the issues noted above are described below.

SUMMARY

One example of a method performed at an augmented-reality (AR) headset is described herein. This example method includes causing an AR headset to present a glance user interface element at a first portion of the display of the AR headset. The method further includes, in response to a first request from a user of the AR headset to display a follow user interface element, causing the AR headset to present the follow user interface element at a second portion of the display of the AR headset, wherein the second portion is larger than the third portion. The method further includes, in response to a second request from the user of the AR headset to display a home user interface element, causing the AR headset to present the home user interface element at a third portion of the display of the AR headset, wherein the third portion is larger than the second portion.

A second example of a second method performed at an AR headset is now described. This second example method includes receiving a request to begin an AR game with a second user of a second AR headset. The second method further includes, in response to the request to begin the AR game with the second user of the second AR headset, determining whether the second user is within a colocation threshold distance of a first user of a first AR headset. The second method further includes, in accordance with a determination that the second user is within the colocation threshold distance of the first user, presenting the AR game in a first state, wherein the first user plays the AR game while viewing the second user in-person through the first AR headset. The second method further includes, in accordance with a determination that the second user is not within the colocation threshold distance of the first user, presenting the AR game in a second state, wherein an avatar representation associated with the second user is presented by the AR headset such that the first user plays the AR game while viewing the second user as the avatar representation.

A third example of a third method performed at an AR headset is now described. This third example method includes causing an AR headset to present an AR configuration user interface for configuring options associated with the AR headset, wherein the AR configuration user interface includes: (i) a first selectable element for calibrating an eye-gaze tracking, (ii) a second selectable element for pairing the AR headset with at least one other AR device, (iii) a third selectable element for selecting at least one targeting input method, (iv) a battery indicator for indicating a battery status of the AR headset and a battery status of the at least one other AR device, and (v) a signal indicator for indicating a connection strength between the AR headset and the at least one other AR device.

A fourth example of a fourth method performed at an AR headset is now described. This fourth example method includes, in response to detecting a first hand gesture, causing an AR headset to present a launcher menu, wherein the launcher menu includes a plurality of AR elements. The fourth method further includes, in response to detecting a second hand gesture and in accordance with a determination that a user of the AR headset is targeting an AR element presented by the AR headset, causing the AR headset to perform an action associated with the AR element, wherein the second hand gesture is distinct from the first hand gesture. The fourth method further includes, in response to detecting a third hand gesture, causing the AR headset to enter a sleep mode, wherein the third hand gesture is distinct from the first hand gesture and the second hand gesture. The fourth method further includes, in response to detecting a fourth hand gesture, causing the AR headset to pair with another AR device, wherein the fourth hand gesture is distinct from the first hand gesture, the second hand gesture, and the third hand gesture.

Instructions that cause performance of the methods and operations described herein can be stored on a non-transitory computer readable storage medium. The non-transitory computer-readable storage medium can be included on a single electronic device or spread across multiple electronic devices of a system (computing system). A non-exhaustive of list of electronic devices that can either alone or in combination (e.g., a system) perform the method and operations described herein include an extended-reality (XR) headset (e.g., a mixed-reality (MR) headset or an augmented-reality (AR) headset as two examples), a wrist-wearable device, an intermediary processing device, a smart textile-based garment, etc. For instance, the instructions can be stored on an AR headset or can be stored on a combination of an AR headset and an associated input device (e.g., a wrist-wearable device) such that instructions for causing detection of input operations can be performed at the input device and instructions for causing changes to a displayed user interface in response to those input operations can be performed at the AR headset. The devices and systems described herein can be configured to be used in conjunction with methods and operations for providing an XR experience. The methods and operations for providing an XR experience can be stored on a non-transitory computer-readable storage medium.

The features and advantages described in the specification are not necessarily all inclusive and, in particular, certain additional features and advantages will be apparent to one of ordinary skill in the art in view of the drawings, specification, and claims. Moreover, it should be noted that the language used in the specification has been principally selected for readability and instructional purposes.

Having summarized the above example aspects, a brief description of the drawings will now be presented.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

Figure 1A:
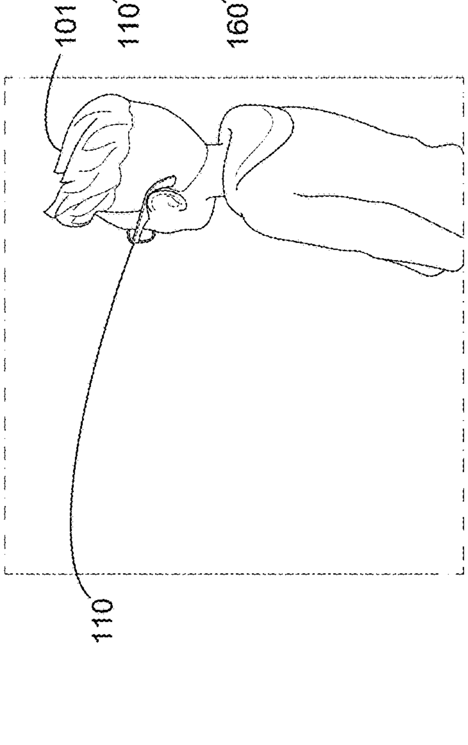
FIGS. 1A-1F illustrate example user interface (UI) states displayed to a user at a display of a head-wearable device, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DETAILED DESCRIPTION

Numerous details are described herein to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not necessarily been described in exhaustive detail so as to avoid obscuring pertinent aspects of the embodiments described herein.

Overview

Embodiments of this disclosure can include or be implemented in conjunction with various types of extended-realities (XRs) such as mixed-reality (MR) and augmented-reality (AR) systems. MRs and ARs, as described herein, are any superimposed functionality and/or sensory-detectable presentation provided by MR and AR systems within a user's physical surroundings. Such MRs can include and/or represent virtual realities (VRs) and VRs in which at least some aspects of the surrounding environment are reconstructed within the virtual environment (e.g., displaying virtual reconstructions of physical objects in a physical environment to avoid the user colliding with the physical objects in a surrounding physical environment). In the case of MRs, the surrounding environment that is presented through a display is captured via one or more sensors configured to capture the surrounding environment (e.g., a camera sensor, time-of-flight (ToF) sensor). While a wearer of an MR headset can see the surrounding environment in full detail, they are seeing a reconstruction of the environment reproduced using data from the one or more sensors (i.e., the physical objects are not directly viewed by the user). An MR headset can also forgo displaying reconstructions of objects in the physical environment, thereby providing a user with an entirely VR experience. An AR system, on the other hand, provides an experience in which information is provided, e.g., through the use of a waveguide, in conjunction with the direct viewing of at least some of the surrounding environment through a transparent or semi-transparent waveguide(s) and/or lens(es) of the AR headset. Throughout this application, the term "extended reality (XR)" is used as a catchall term to cover both ARs and MRs. In addition, this application also uses, at times, a head-wearable device or headset device as a catchall term that covers XR headsets such as AR headsets and MR headsets.

As alluded to above, an MR environment, as described herein, can include, but is not limited to, non-immersive, semi-immersive, and fully immersive VR environments. As also alluded to above, AR environments can include marker-based AR environments, markerless AR environments, location-based AR environments, and projection-based AR environments. The above descriptions are not exhaustive and any other environment that allows for intentional environmental lighting to pass through to the user would fall within the scope of an AR, and any other environment that does not allow for intentional environmental lighting to pass through to the user would fall within the scope of an MR.

The AR and MR content can include video, audio, haptic events, sensory events, or some combination thereof, any of which can be presented in a single channel or in multiple channels (such as stereo video that produces a three-dimensional effect to a viewer). Additionally, AR and MR can also be associated with applications, products, accessories, services, or some combination thereof, which are used, for example, to create content in an AR or MR environment and/or are otherwise used in (e.g., to perform activities in) AR and MR environments.

Interacting with these AR and MR environments described herein can occur using multiple different modalities and the resulting outputs can also occur across multiple different modalities. In one example AR or MR system, a user can perform a swiping in-air hand gesture to cause a song to be skipped by a song-providing application programming interface (API) providing playback at, for example, a home speaker.

A hand gesture, as described herein, can include an in-air gesture, a surface-contact gesture, and or other gestures that can be detected and determined based on movements of a single hand (e.g., a one-handed gesture performed with a user's hand that is detected by one or more sensors of a wearable device (e.g., electromyography (EMG) and/or inertial measurement units (IMUs) of a wrist-wearable device, and/or one or more sensors included in a smart textile wearable device) and/or detected via image data captured by an imaging device of a wearable device (e.g., a camera of a head-wearable device, an external tracking camera setup in the surrounding environment)). "In-air" generally includes gestures in which the user's hand does not contact a surface, object, or portion of an electronic device (e.g., a head-wearable device or other communicatively coupled device, such as the wrist-wearable device), in other words the gesture is performed in open air in 3D space and without contacting a surface, an object, or an electronic device. Surface-contact gestures (contacts at a surface, object, body part of the user, or electronic device) more generally are also contemplated in which a contact (or an intention to contact) is detected at a surface (e.g., a single- or double-finger tap on a table, on a user's hand or another finger, on the user's leg, a couch, a steering wheel). The different hand gestures disclosed herein can be detected using image data and/or sensor data (e.g., neuromuscular signals sensed by one or more biopotential sensors (e.g., EMG sensors) or other types of data from other sensors, such as proximity sensors, ToF sensors, sensors of an IMU, capacitive sensors, strain sensors) detected by a wearable device worn by the user and/or other electronic devices in the user's possession (e.g., smartphones, laptops, imaging devices, intermediary devices, and/or other devices described herein).

The input modalities as alluded to above can be varied and are dependent on a user's experience. For example, in an interaction in which a wrist-wearable device is used, a user can provide inputs using in-air or surface-contact gestures that are detected using neuromuscular signal sensors of the wrist-wearable device. In the event that a wrist-wearable device is not used, alternative and entirely interchangeable input modalities can be used instead, such as camera(s) located on the headset or elsewhere to detect in-air or surface-contact gestures or inputs at an intermediary processing device (e.g., through physical input components (e.g., buttons and trackpads)). These different input modalities can be interchanged based on both desired user experiences, portability, and/or a feature set of the product (e.g., a low-cost product may not include hand-tracking cameras).

While the inputs are varied, the resulting outputs stemming from the inputs are also varied. For example, an in-air gesture input detected by a camera of a head-wearable device can cause an output to occur at a head-wearable device or control another electronic device different from the head-wearable device. In another example, an input detected using data from a neuromuscular signal sensor can also cause an output to occur at a head-wearable device or control another electronic device different from the head-wearable device. While only a couple examples are described above, one skilled in the art would understand that different input modalities are interchangeable along with different output modalities in response to the inputs.

Specific operations described above may occur as a result of specific hardware. The devices described are not limiting and features on these devices can be removed or additional features can be added to these devices. The different devices can include one or more analogous hardware components. For brevity, analogous devices and components are described herein. Any differences in the devices and components are described below in their respective sections.

As described herein, a processor (e.g., a central processing unit (CPU) or microcontroller unit (MCU)), is an electronic component that is responsible for executing instructions and controlling the operation of an electronic device (e.g., a wrist-wearable device, a head-wearable device, a handheld intermediary processing device (HIPD), a smart textile-based garment, or other computer system). There are various types of processors that may be used interchangeably or specifically required by embodiments described herein. For example, a processor may be (i) a general processor designed to perform a wide range of tasks, such as running software applications, managing operating systems, and performing arithmetic and logical operations; (ii) a microcontroller designed for specific tasks such as controlling electronic devices, sensors, and motors; (iii) a graphics processing unit (GPU) designed to accelerate the creation and rendering of images, videos, and animations (e.g., VR animations, such as three-dimensional modeling); (iv) a field-programmable gate array (FPGA) that can be programmed and reconfigured after manufacturing and/or customized to perform specific tasks, such as signal processing, cryptography, and machine learning; or (v) a digital signal processor (DSP) designed to perform mathematical operations on signals such as audio, video, and radio waves. One of skill in the art will understand that one or more processors of one or more electronic devices may be used in various embodiments described herein.

As described herein, controllers are electronic components that manage and coordinate the operation of other components within an electronic device (e.g., controlling inputs, processing data, and/or generating outputs). Examples of controllers can include (i) microcontrollers, including small, low-power controllers that are commonly used in embedded systems and Internet of Things (IoT) devices; (ii) programmable logic controllers (PLCs) that may be configured to be used in industrial automation systems to control and monitor manufacturing processes; (iii) system-on-a-chip (SoC) controllers that integrate multiple components such as processors, memory, I/O interfaces, and other peripherals into a single chip; and/or (iv) DSPs. As described herein, a graphics module is a component or software module that is designed to handle graphical operations and/or processes and can include a hardware module and/or a software module.

As described herein, memory refers to electronic components in a computer or electronic device that store data and instructions for the processor to access and manipulate. The devices described herein can include volatile and non-volatile memory. Examples of memory can include (i) random access memory (RAM), such as DRAM, SRAM, DDR RAM or other random access solid state memory devices, configured to store data and instructions temporarily; (ii) read-only memory (ROM) configured to store data and instructions permanently (e.g., one or more portions of system firmware and/or boot loaders); (iii) flash memory, magnetic disk storage devices, optical disk storage devices, other non-volatile solid state storage devices, which can be configured to store data in electronic devices (e.g., universal serial bus (USB) drives, memory cards, and/or solid-state drives (SSDs)); and (iv) cache memory configured to temporarily store frequently accessed data and instructions. Memory, as described herein, can include structured data (e.g., SQL databases, MongoDB databases, GraphQL data, or JSON data). Other examples of memory can include (i) profile data, including user account data, user settings, and/or other user data stored by the user; (ii) sensor data detected and/or otherwise obtained by one or more sensors; (iii) media content data including stored image data, audio data, documents, and the like; (iv) application data, which can include data collected and/or otherwise obtained and stored during use of an application; and/or (v) any other types of data described herein.

As described herein, a power system of an electronic device is configured to convert incoming electrical power into a form that can be used to operate the device. A power system can include various components, including (i) a power source, which can be an alternating current (AC) adapter or a direct current (DC) adapter power supply; (ii) a charger input that can be configured to use a wired and/or wireless connection (which may be part of a peripheral interface, such as a USB, micro-USB interface, near-field magnetic coupling, magnetic inductive and magnetic resonance charging, and/or radio frequency (RF) charging); (iii) a power-management integrated circuit, configured to distribute power to various components of the device and ensure that the device operates within safe limits (e.g., regulating voltage, controlling current flow, and/or managing heat dissipation); and/or (iv) a battery configured to store power to provide usable power to components of one or more electronic devices.

As described herein, peripheral interfaces are electronic components (e.g., of electronic devices) that allow electronic devices to communicate with other devices or peripherals and can provide a means for input and output of data and signals. Examples of peripheral interfaces can include (i) USB and/or micro-USB interfaces configured for connecting devices to an electronic device; (ii) Bluetooth interfaces configured to allow devices to communicate with each other, including Bluetooth low energy (BLE); (iii) near-field communication (NFC) interfaces configured to be short-range wireless interfaces for operations such as access control; (iv) pogo pins, which may be small, spring-loaded pins configured to provide a charging interface; (v) wireless charging interfaces; (vi) global-positioning system (GPS) interfaces; (vii) Wi-Fi interfaces for providing a connection between a device and a wireless network; and (viii) sensor interfaces.

As described herein, sensors are electronic components (e.g., in and/or otherwise in electronic communication with electronic devices, such as wearable devices) configured to detect physical and environmental changes and generate electrical signals. Examples of sensors can include (i) imaging sensors for collecting imaging data (e.g., including one or more cameras disposed on a respective electronic device, such as a simultaneous localization and mapping (SLAM) camera); (ii) biopotential-signal sensors; (iii) IMUs for detecting, for example, angular rate, force, magnetic field, and/or changes in acceleration; (iv) heart rate sensors for measuring a user's heart rate; (v) peripheral oxygen saturation ($SpO_2$) sensors for measuring blood oxygen saturation and/or other biometric data of a user; (vi) capacitive sensors for detecting changes in potential at a portion of a user's body (e.g., a sensor-skin interface) and/or the proximity of other devices or objects; (vii) sensors for detecting some inputs (e.g., capacitive and force sensors); and (viii) light sensors (e.g., ToF sensors, infrared light sensors, or visible light sensors), and/or sensors for sensing data from the user or the user's environment. As described herein biopotential-signal-sensing components are devices used to measure electrical activity within the body (e.g., biopotential-signal sensors). Some types of biopotential-signal sensors include (i) electroencephalography (EEG) sensors configured to measure electrical activity in the brain to diagnose neurological disorders; (ii) electrocardiography (ECG or EKG) sensors configured to measure electrical activity of the heart to diagnose heart problems; (iii) EMG sensors configured to measure the electrical activity of muscles and diagnose neuromuscular disorders; (iv) electrooculography (EOG) sensors configured to measure the electrical activity of eye muscles to detect eye movement and diagnose eye disorders.

As described herein, an application stored in memory of an electronic device (e.g., software) includes instructions stored in the memory. Examples of such applications include (i) games; (ii) word processors; (iii) messaging applications; (iv) media-streaming applications; (v) financial applications; (vi) calendars; (vii) clocks; (viii) web browsers; (ix) social media applications; (x) camera applications; (xi) web-based applications; (xii) health applications; (xiii) AR and MR applications; and/or (xiv) any other applications that can be stored in memory. The applications can operate in conjunction with data and/or one or more components of a device or communicatively coupled devices to perform one or more operations and/or functions.

As described herein, communication interface modules can include hardware and/or software capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol, including communication protocols not yet developed as of the filing date of this document. A communication interface is a mechanism that enables different systems or devices to exchange information and data with each other, including hardware, software, or a combination of both hardware and software. For example, a communication interface can refer to a physical connector and/or port on a device that enables communication with other devices (e.g., USB, Ethernet, HDMI, or Bluetooth). A communication interface can refer to a software layer that enables different software programs to communicate with each other (e.g., APIs and protocols such as HTTP and TCP/IP).

As described herein, a graphics module is a component or software module that is designed to handle graphical operations and/or processes and can include a hardware module and/or a software module.

As described herein, non-transitory computer-readable storage media are physical devices or storage medium that can be used to store electronic data in a non-transitory form (e.g., such that the data is stored permanently until it is intentionally deleted and/or modified).

Augmented-Reality User Interfaces, Display Modes, and Configurations Thereof

Described herein are a plurality of extended-reality (XR) user interfaces (UIs) presented within an XR environment (e.g., an artificial-reality environment comprising entirely artificial elements and/or a mixed-reality/augmented-reality environment comprising both real-world and digital elements) to a user at one or more displays of a head-wearable device, in accordance with some embodiments. The user may interact with XR UIs and/or elements within the XR UIs by performing one or more of one or more hand gesture input (e.g., a point gesture, a pinch gesture, a thumb-slide gesture, etc.) detected at the head-wearable device (e.g., based on image data captured at one or more cameras of the head-wearable device) and/or another device communicatively coupled to the head-wearable device (e.g., based on biopotential data captured at one or more biopotential sensors of a wrist-wearable device), one or more gaze inputs (e.g., a gaze at a location within the XR UIs) detected at the head-wearable device (e.g., based on gaze data captured at one or more eye-tracking cameras of the head-wearable device and/or gaze approximation data based on inertial measurement unit (IMU) data captured at one or more IMU sensors of the head-wearable device), one or more touch inputs (e.g., a tap input, a drag input, a long press input, etc.) detected at the head-wearable device and/or the other device (e.g., detected at a touch input surface of the head-wearable device and/or the other device), one or more button inputs detected at the head-wearable device and/or the other device (e.g., detected at one or more buttons, joysticks, thumbsticks, and/or triggers of the head-wearable device and/or the other device), and/or a combination of inputs (e.g., the one or more gaze inputs are used to target a location within the XR UIs and the one or more hand gesture inputs to select elements within the XR UIs).

FIGS. 1A-1F illustrate example UI states displayed to a user 101 at one or more displays of a head-wearable device 110 (e.g., an XR headset and/or a pair of smart glasses), in accordance with some embodiments. In some embodiments, the example UI states are displayed in an XR environment that includes a plurality of XR elements displayed by the display of the head-wearable device 110 such that the UI states and/or the XR elements appear over a point-of-view of the user of a physical environment around the user. FIG. 1A illustrates a first UI state (e.g., an "Off" state), wherein the head-wearable 110 device does not display XR augments to the user, in accordance with some embodiments.

Figure 1B:
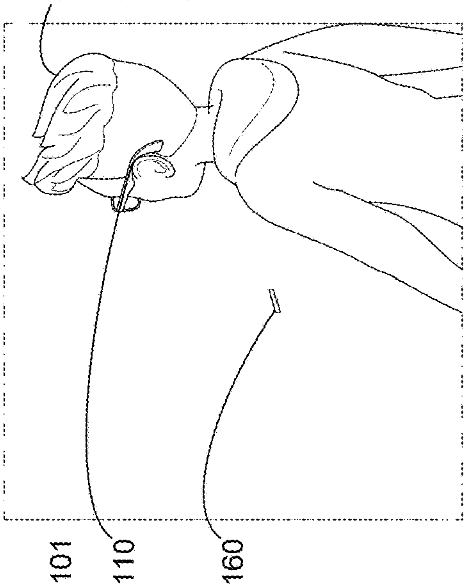

FIG. 1B illustrates a second UI state (e.g., a "Glance" state), wherein the head-wearable device 110 displays a glance XR augment 160, in accordance with some embodiments. In some embodiments, the glance XR augment 160 is displayed at the display of the head-wearable device 110 such that the glance UI element 160 appears at a peripheral portion of a field-of-view 150 of the user 101. In some embodiments, the glance XR augment 160 is displayed such that the glance XR augment 160 appears at a lower portion of the field-of-view 150 of the user 101. In some embodiments, the glance XR augment 160 is displayed and/or at least one quality of the glance XR augment 160 changes in response to receiving a notification at the head-wearable device 110 and/or another device communicatively coupled to the head-wearable device 110 while the head-wearable device 110 is displaying the first UI state. The user 101 may interact with the glance XR augment 160 to open an application associated with the notification. In some embodiments, if the user 101 does not interact with the glance XR augment 160 after receiving the notification and after a predetermined period (e.g., five seconds) thereafter, the glance XR augment 160 disappears and the head-wearable device 110 displays the first UI state. In some embodiments, the glance XR augment 160 is a system status bar that displays information about the head-wearable device 110, the other device, and/or an operating system executed at the head-wearable device 110 and/or the other device (e.g., time of day, date, wireless connection status (e.g., WiFi, Bluetooth, etc.), battery level, etc.).

Figure 1C:
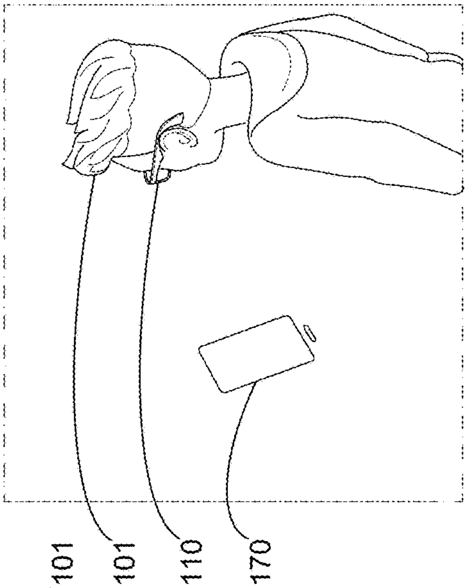

FIG. 1C illustrates a third UI state (e.g., a "Follow" state), wherein the head-wearable device 110 displays a follow XR augment 170, in accordance with some embodiments. The follow XR augment 170 includes content from a first application executed at the head-wearable device 110 and/or the other device. In some embodiments, the follow XR augment 170 is displayed such that the follow XR augment 170 appears at the lower portion of the field-of-view 150 of the user 101 (e.g., a bottom-right corner). In some embodiments, the follow XR augment 170 is tethered to the user 101 (e.g., as the user 101 moves, the follow XR augment 170 remains at a single location in the field-of-view 150 of the user 101.

Figure 1D:
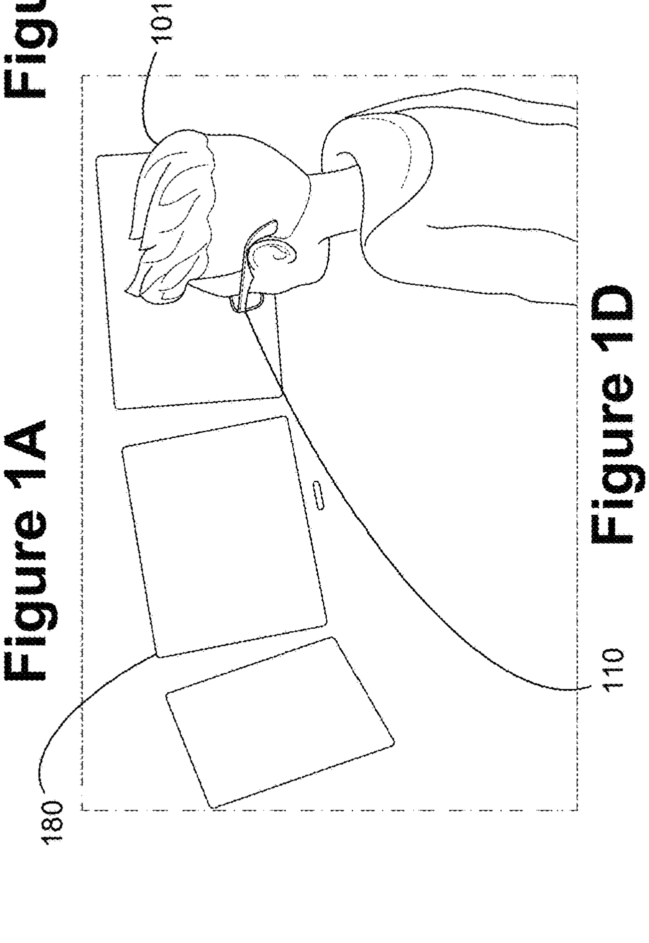

FIG. 1D illustrates a fourth UI state (e.g., a "Home" state), wherein the head-wearable device 110 displays an application-view XR augment 180, in accordance with some embodiments. In some embodiments, the application-view XR augment 180 includes the content from the first application. In some embodiments, the follow XR augment 170 is a displayed at first size and the application-view XR augment 180 is displayed at a second size, larger than the first size (e.g., as illustrated in FIGS. 1C-1D). In some embodiments, the head-wearable device 110 displays a plurality of application-view XR augments 180 (e.g., three home XR augments 180, as illustrated in FIG. 1D), including the application-view XR augment 180, while in the fourth UI state (e.g., as illustrated in FIG. 1D). Each of the plurality of application-view XR augments 180 is associated with a respective application executed at the head-wearable device 110 and/or the other device. In some embodiments, the head-wearable device 110 displays a launcher menu in the fourth UI state. The launcher menu includes one or more applications that are executable at the head-wearable device 110 and/or the other device. In some embodiments, the application-view XR augment 180 and/or the plurality of home XR augments application-view is locked in place (e.g., as the user 10 moves, the home XR augment 180 and/or the plurality of XR home augments 180 remain at respective locations in the physical environment around the user 101). In some embodiments, the user 101 switches the head-wearable device 110 to the fourth UI state by performing a fourth state-switch gesture (e.g., a middle finger pinch gesture). In some embodiments, the user 101 switches the head-wearable device 110 from the fourth UI state to the third UI state by physically leaving a predetermined area (e.g., a "home" area) in the physical environment around the user 101 (e.g., if the user 101 moves five feet away from the respective locations in the physical environment where the plurality of home XR augments 180 are located, the head-wearable device 110 switches the head-wearable device 110 to the third UI state).

Figure 1E:
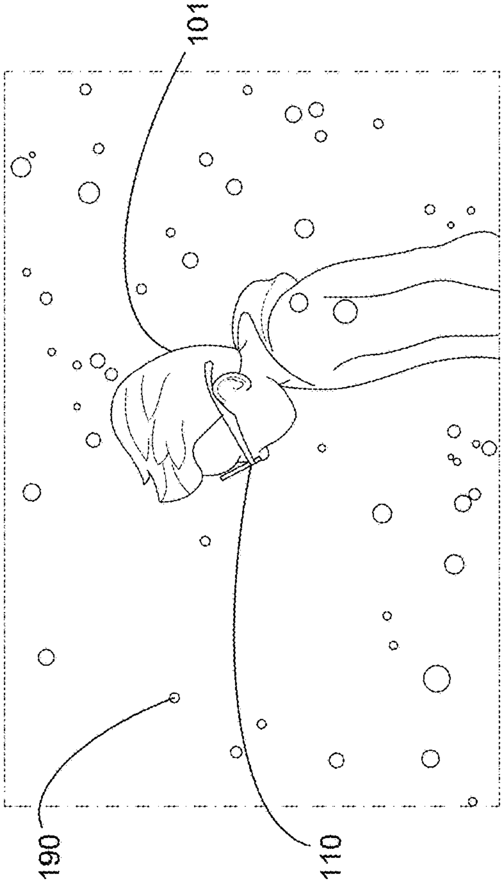

FIG. 1E illustrates a fifth UI state (e.g., an "Exclusive" state), wherein the head-wearable device 110 displays exclusive XR content 190 from a third application and excludes other content from other applications from being displayed, in accordance with some embodiments. The user 101 switches the head-wearable device 110 to the fifth UI state by launching the third application. In some embodiments, the exclusive XR content 190 from the third application is a game, a co-presence session with a different user of a different device, and/or other exclusive XR content. The exclusive XR content 190 from the third application is locked in place and/or is tethered to the user 101, depending on a type of exclusive XR content 190 from the third application. In some embodiments, the exclusive XR content 190 is displayed in an entirety of the field-of-view 150 of the user 101.

Figure 1F:
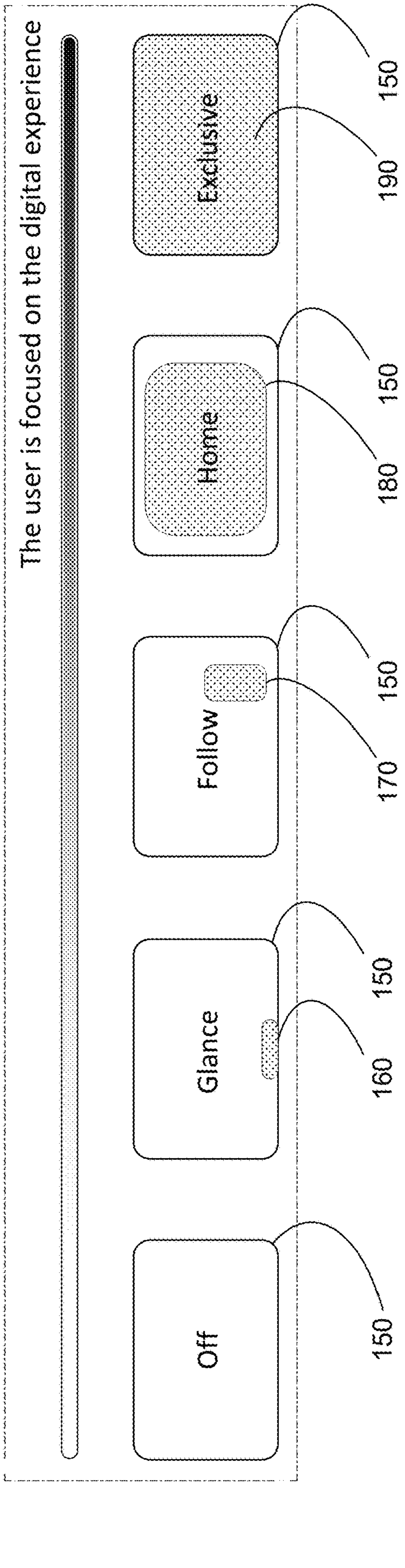

FIG. 1F illustrates respective portions of the field-of-view 150 of the user 101 that contain XR augments and/or XR content while the head-wearable device 110 is displaying the five UI states, in accordance with some embodiments. While in the first UI state, no portion of the field-of-view 150 of the user 101 contains an XR augment or XR content (e.g., as described in reference to 1A). While in the second UI state, a small lower portion of the field-of-view 150 of the user 101 contains the glance XR augment 160 (e.g., as described in reference to 1B). While in the third UI state, a bottom-right portion of the field-of-view 150 of the user 101 contains the follow XR augment 170 (e.g., as described in reference to 1C). While in the fourth UI state, a large portion of the field-of-view 150 of the user 101 contains the application-view XR augment 180 (e.g., as described in reference to 1D). While in the fifth UI state, an entirety of the field-of-view 150 of the user 101 contains the exclusive XR content 190 (e.g., as described in reference to 1E).

Figure 2C:
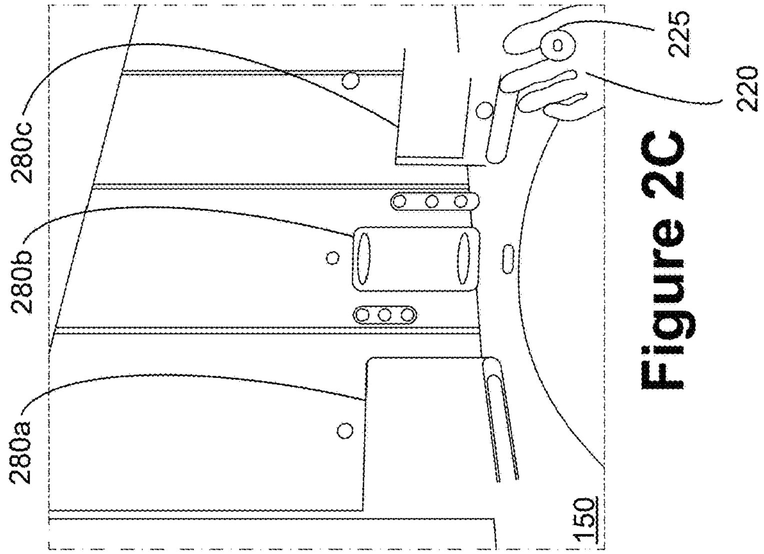
FIGS. 2A-2C illustrate a first sequence of a user interacting with five different UI states displayed at a display of a head-wearable device, in accordance with some embodiments.
Figure 2B:
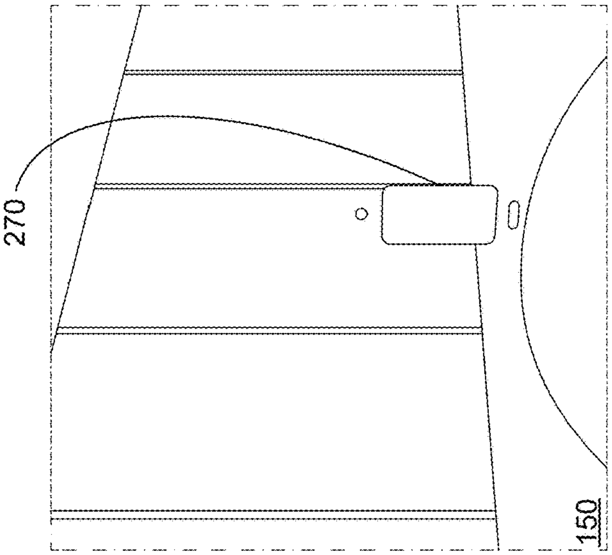
Figure 2A:
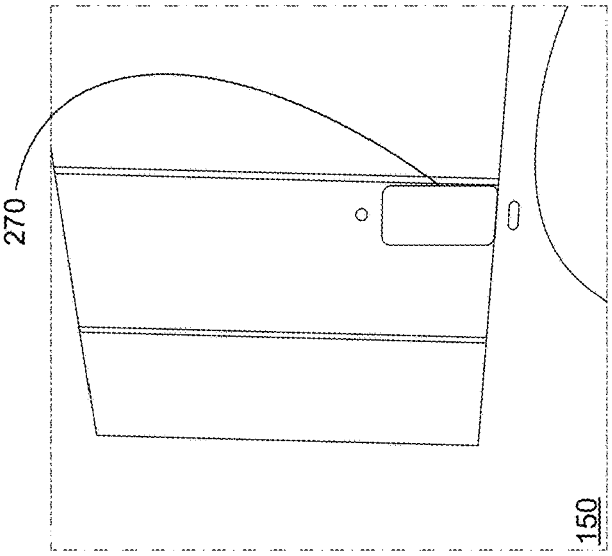

FIGS. 2A-2C illustrate a first sequence of the user 101 interacting with the third UI state and the fourth UI state displayed at the one or more displays of the head-wearable device 110, in accordance with some embodiments. FIG. 2A illustrates the user 101 interacting with a first follow XR augment 270 (e.g., watching a video displayed at the follow XR augment 270), in accordance with some embodiments. The head-wearable device 110 presents the first follow XR augment 270 (e.g., a video XR augment associated with a video streaming application, and the video XR augment plays a video) at the bottom-right portion of the field-of-view 150. FIG. 2B illustrates the user 101 moving in the physical environment (e.g., walking) while the head-wearable device 110 displays the first follow XR augment 270, in accordance with some embodiments. Since the first follow XR augment 270 is tethered to the user 101, the head-wearable device 110 continues to display the first follow XR augment 270 at the bottom-right portion of the field-of-view 150 of the user 101 (e.g., the first follow XR augment 270 continues to play the video, as illustrated in FIG. 2B). FIG. 2C illustrates the user 101 switching the head-wearable device 110 from the third UI state to the fourth UI state, in accordance with some embodiments. The user 101 performs the fourth state-switch gesture 220 to switch to the fourth UI state. In some embodiments, the head-wearable device 110 displays a hand-detection XR augment 225 such that the hand-detection XR augment 225 appears next to and/or over a user's hand within the field-of-view 150 to indicate to the user 101 that the head-wearable device 110 is currently detecting hand gestures, as illustrated in FIG. 2C. In response to the detecting the fourth state-switch gesture 220, the head-wearable device 110 displays a first application-view XR augment 280*a*-280*c*. As illustrated in FIG. 2C, the first application-view XR augment 280*a*-280*c* includes a plurality of application XR augments (e.g., a first application XR augment 280*a* associated with a messaging application, a second application XR augment 280*b* associated with the video streaming application, and a third application XR augment 280*c* associated with a web browsing application). In some embodiments, when the head-wearable device 110 displays a first application-view XR augment 280*a*-280*c*, at least one application XR augment of the first application-view XR augment 280*a*-280*c* (e.g., the second application XR augment 280*b*) and the first follow XR augment 270 are both associated with a first application (e.g., the video streaming application). For example, the video XR augment associated with the video streaming application is presented in the third UI state, and, in response to the detecting the fourth state-switch gesture 220, another video XR augment associated with the video streaming application is presented in the fourth UI state, as illustrated in FIGS. 2A-2C.

Figure 3C:
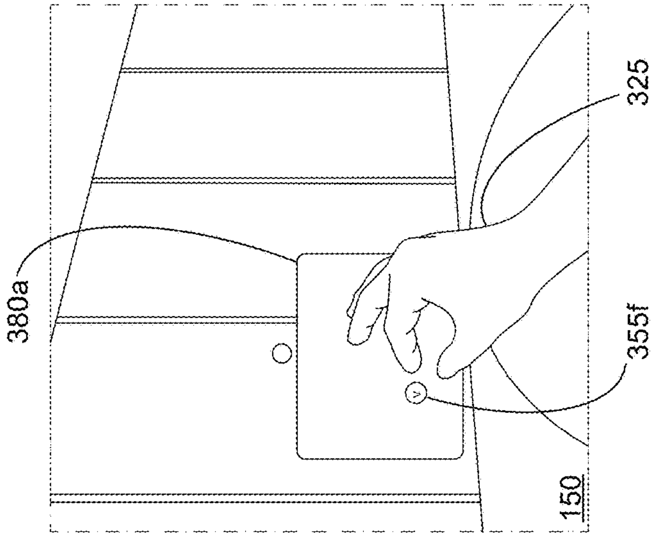
FIGS. 3A-3F illustrate a second sequence of a user selecting a plurality of home XR augments to display in a fourth UI state, in accordance with some embodiments.
Figure 3B:
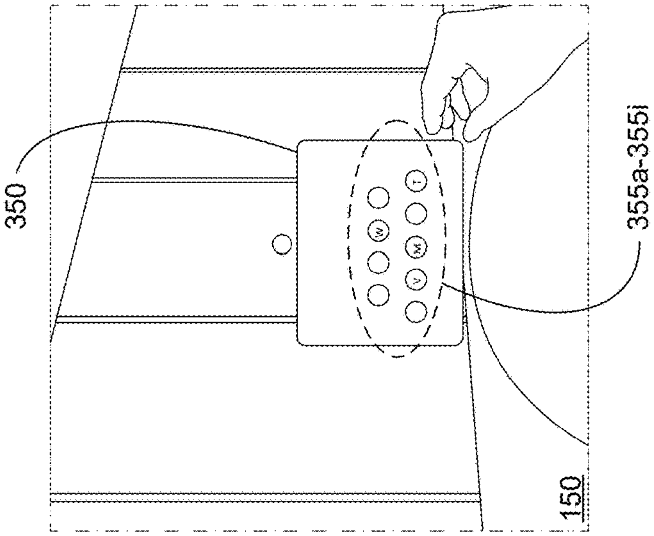
Figure 3A:
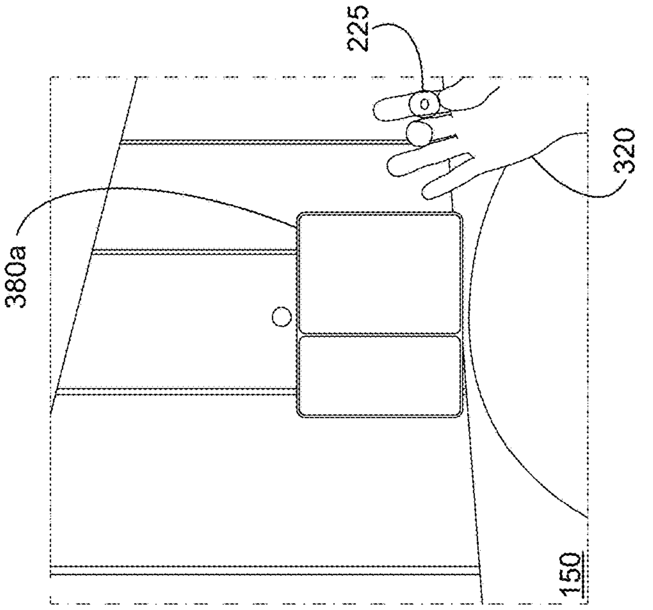

FIGS. 3A-3F illustrate a second sequence of the user 101 selecting a plurality of second application XR augments to display in a second application-view XR augment 380*a*-380*c* while in the fourth UI state, in accordance with some embodiments. FIG. 3A illustrates the user 101 viewing a fourth application XR augment 380*a* (e.g., an application XR augment associated with the messaging application) while in the fourth UI state, and the user 101 performing a menu gesture 320 (e.g., a middle finger-double pinch gesture) to cause the head-wearable device 110 to display the launcher menu 350 while still in the fourth UI state, in accordance with some embodiments. In some embodiments, the menu gesture 320 and the fourth state-switch gesture 220 are a common hand gesture (e.g., a middle finger pinch gesture, and while in a UI state other than the fourth UI state, the middle finger pinch gesture causes the fourth UI state to be displayed, and while in the fourth UI state the middle finger pinch gesture causes the launcher menu 350 to be displayed). In some embodiments, the head-wearable device 110 displays the hand-detection XR augment 225, as illustrated in FIG. 3A. FIG. 3B illustrates head-wearable device 110 displaying the launcher menu 350, in accordance with some embodiments. The launcher menu 350 includes a plurality of application icons 355*a*-355*i*, and each application icon of the plurality of application icons is associated with a respective application executed at the head-wearable device 110 and/or the other device. In some embodiments, the user 101 may perform a select gesture at a respective application icon of the plurality of application icons 355*a*-355*i* (e.g., pointing at the respective application icon and performing an index finger pinch gesture) to cause head-wearable device 110 and/or the other device to run the respective application.

Figure 3D:
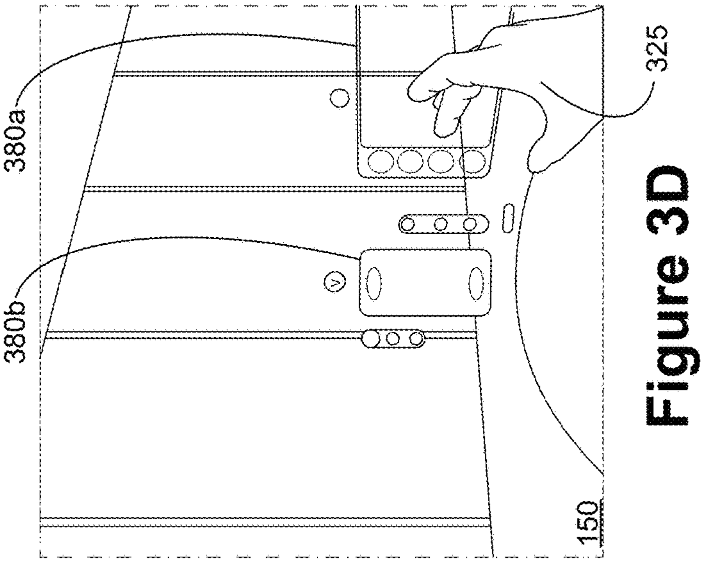

FIG. 3C illustrates the user performing a first drag-and-drop gesture 325 on a fifth application icon 355*f* (e.g., a video streaming icon associated with the video streaming application), in accordance with some embodiments. In some embodiments, the first drag-and-drop 325 gesture includes the user selecting the fifth application icon 355*f* from the launcher menu 350 (e.g., by performing an index finger pinch gesture), dragging the fifth application icon 355*f* to a second location (e.g., a location to a left side of the fourth application XR augment 380*a*) in the field-of-view 150 (e.g., by moving a hand performing the index finger pinch gesture while continuing to perform the index finger pinch gesture), and deselecting the fifth application icon 355*f* (e.g., by releasing the index finger pinch gesture). Since the fourth application XR augment 380*a* is locked in place while the user 101 is performing the first drag-and-drop gesture 325, the fourth application XR augment 380*a* remains in a first location (e.g., a center portion of the field-of-view 150) in the field-of-view 150, as illustrated in FIG. 3C. FIG. 3D illustrates the head-wearable device 110 displaying a fifth application XR augment 380*b* after the user 101 performs the first drag-and-drop gesture 325 on the fifth application icon 355*f*, in accordance with some embodiments. The fifth application icon 355*f* and the fifth application XR augment 380*b* are associated with a same application. In response to the first drag-and-drop gesture 325, the fifth application XR augment 380*b* (e.g., an application XR augment associated with the video streaming application) is displayed at the second location in the field-of-view 150.

Figure 3E:
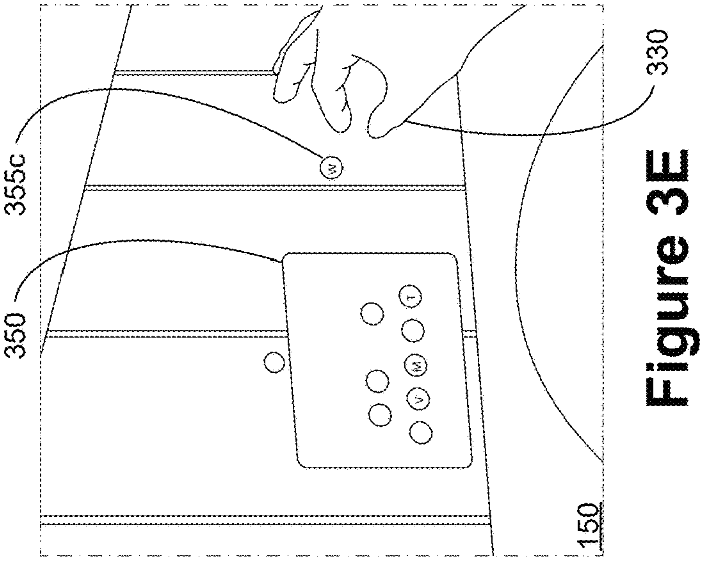
Figure 3F:
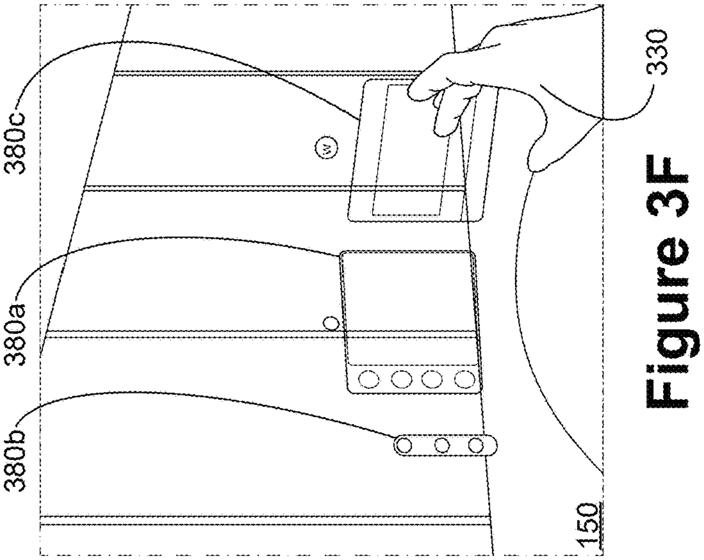

FIG. 3E illustrates the user 101 performing a second drag-and-drop gesture 330 on a third application icon 355*c* (e.g., a web-browsing icon associated with a web browsing application), in accordance with some embodiments. In some embodiments, the second drag-and-drop gesture 330 includes the user 101 selecting the third application icon 355*c* from the launcher menu 350, dragging the third application icon 355*c* to a third location (e.g., a location to a right side of the fourth application XR augment 380*a*) in the field-of view 150, and deselecting the third application icon 355*c*. Since the fourth application XR augment 380*a* and the fifth application XR augment 380*b* are locked in place, while the user 101 is performing the second drag-and-drop gesture 330, the fourth application XR augment 380*a* remains in the first location, and the fifth application XR augment 380*b* remains at the second location, as illustrated in FIG. 3E. FIG. 3F illustrates the head-wearable device 110 displaying a sixth application XR augment 380*c* after the user performs the second drag-and-drop 330 gesture on the third application icon 355*c*, in accordance with some embodiments. The third application icon 355*c* and the sixth application XR augment 380*c* are associated with another same application. In response to the second drag-and-drop gesture 330, the sixth application XR augment 380*c* (e.g., an application XR augment associated with the web browsing application) is displayed at the third location in the field-of-view 150.

Figure 4C:
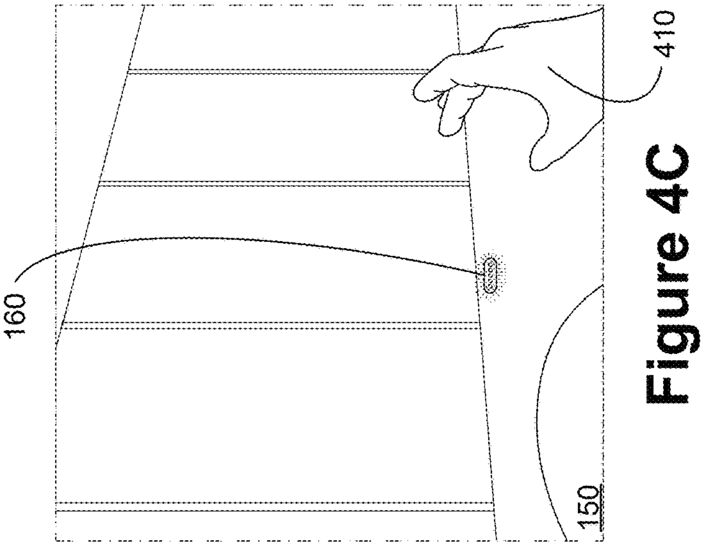
FIGS. 4A-4C illustrate a third sequence of a head-wearable device displaying a second UI state, in accordance with some embodiments.
Figure 4B:
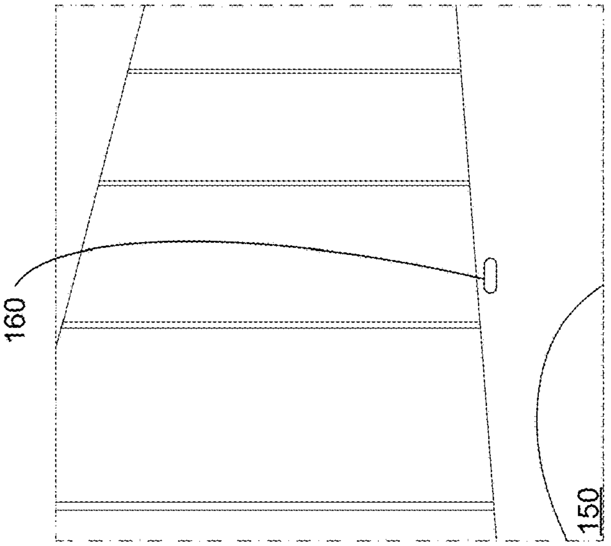
Figure 4A:
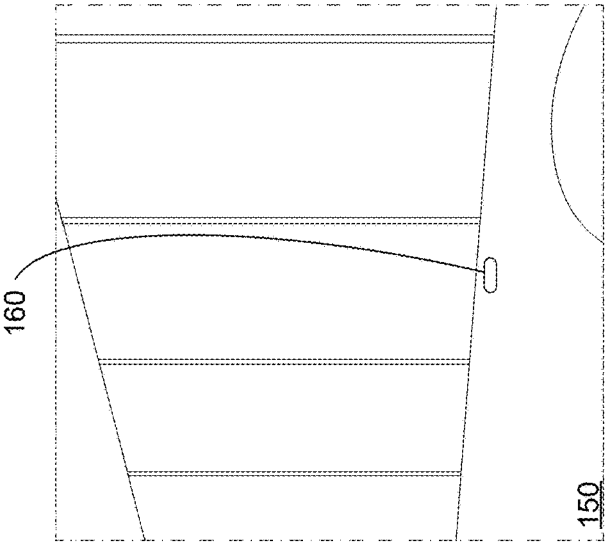

FIGS. 4A-4C illustrate a third sequence of the head-wearable device 110 displaying the second UI state, in accordance with some embodiments. FIG. 4A illustrates the glance XR augment 160 displayed at the peripheral portion of the field-of-view 150 the user 101 (e.g., a bottom portion of the field-of-view 150 of the user 101), in accordance with some embodiments. FIG. 4B illustrates the user 101 moving in a physical environment while in the second UI state, in accordance with some embodiments. Since the glance XR augment 160 is tethered to the user 101, the glance XR augment 160 remains at the peripheral portion of the field-of-view 150 the user 101, as illustrated in FIG. 4B. FIG. 4C illustrates the glance XR augment 160 providing an indication to user 101 that a notification has been received at the head-wearable device 110 and/or the other device communicatively coupled to the head-wearable device 110, in accordance with some embodiments. In some embodiments, the indication includes changing a quality of the glance XR augment 160 (e.g., changing a brightness of the glance XR augment 160, changing a color of the glance XR augment 160, augmenting the glance XR augment 160 with an animation, as illustrated in FIG. 4C, etc.). In some embodiments, the user 101 performs a glance select gesture 410 (e.g., by performing a middle finger-pinch gesture, as illustrated in FIG. 4C) to select the glance XR augment 160 to view the notification and/or open the application associated with the notification. In some embodiments, in response to the user 101 performing the glance select gesture 410, the head-wearable device 110 switches from the second UI state to the third UI display state and displays a follow XR augment associated with the application associated with the notification and/or the head-wearable device 110 switches from the second UI state to the fourth UI display state and displays an application XR augment associated with the application associated with the notification.

Figure 5A:
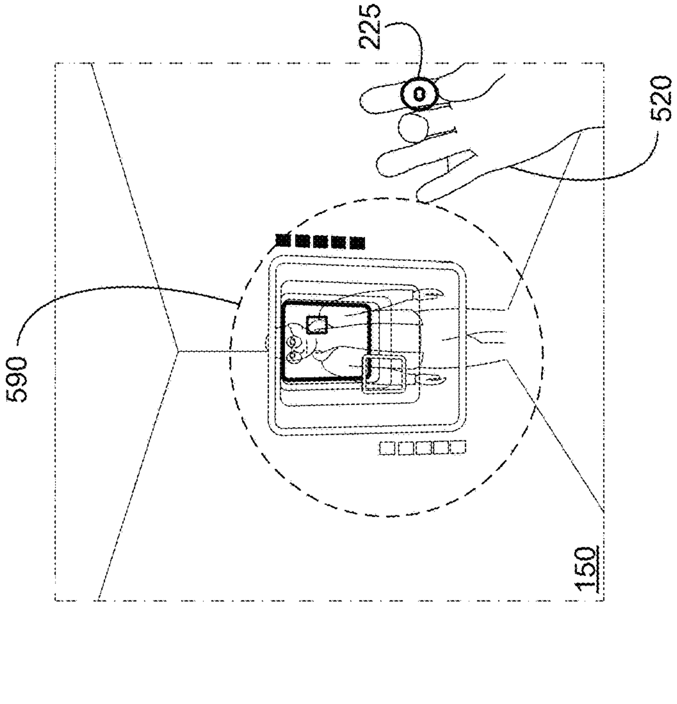
FIGS. 5A-5C illustrate a fourth sequence of the user switching between the fifth UI state and the fourth UI state, in accordance with some embodiments.
Figure 5B:
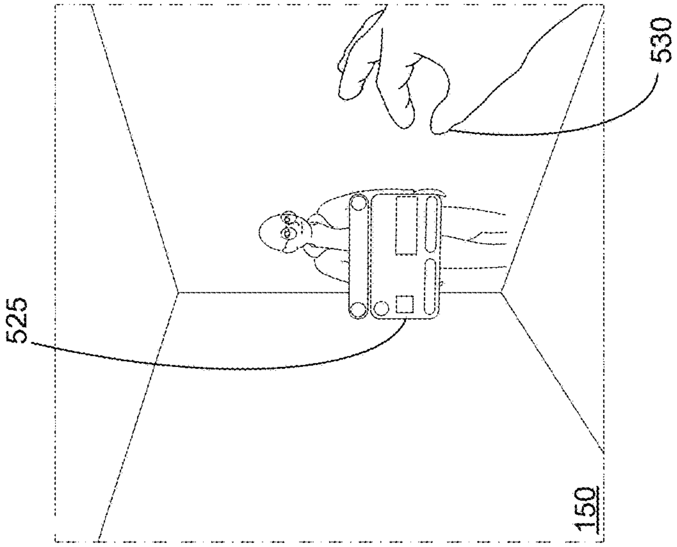
Figure 5C:
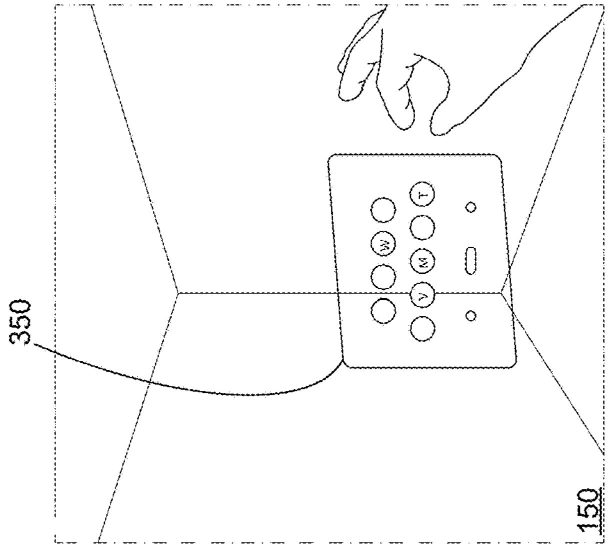

FIGS. 5A-5C illustrate a fourth sequence of the user 101 switching between the fifth UI state and the fourth UI state, in accordance with some embodiments. FIG. 5A illustrates the head-wearable device 110 displaying first exclusive XR content 590 (e.g., exclusive XR content 190, such as virtual-reality (VR) video game content) associated with an exclusive content application (e.g., a VR video game application), in accordance with some embodiments. The user 101 performs the menu gesture 320 (e.g., the middle finger pinch gesture) to cause the head-wearable device 110 to display another menu 525 associated with the exclusive XR content 590 and/or the exclusive content application. FIG. 5B illustrates the head-wearable device 110 displaying the first exclusive XR content 590 and the other menu 525, in accordance with some embodiments. The other menu 525 includes one or more options associated with the exclusive XR content 590 and/or the exclusive content application (e.g., an option to exit the VR video game application, an option to invite another user to play a multiplayer game, an option to adjust one or more settings of the VR video game application, etc.). The user 101 performs an additional menu hand gesture 530 (e.g., an index finger pinch gesture to select an "exit" option at the other menu 525, as illustrated in FIG. 5B) to exit the exclusive content application at the head-wearable device 110. In some embodiments, in response to exiting the exclusive content application, the head-wearable device 110 switches from the fifth UI state to the fourth UI state. FIG. 5C illustrates the head-wearable device 110 displaying the launcher menu 350 in the fourth UI state in response to exiting the exclusive content application, in accordance with some embodiments. In some embodiments, in response to exiting the exclusive content application, the head-wearable device 110 displays an application XR augment associated with the exclusive content application in the fourth UI state. In some embodiments, in response to exiting the exclusive content application, the head-wearable device 110 switches from the fifth UI state to the first UI state, the second UI state, and/or the third UI state (e.g., the head-wearable device 110 displays a follow XR augment associated with the exclusive content application).

Figure 6A:
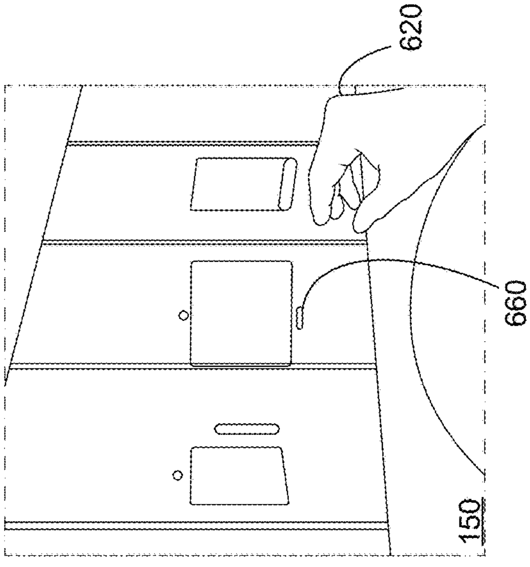
FIGS. 6A-6D illustrate a user switching to a fourth UI state and causing a head-wearable device to display a launcher menu by selecting a bar XR augment, in accordance with some embodiments.
Figure 6B:
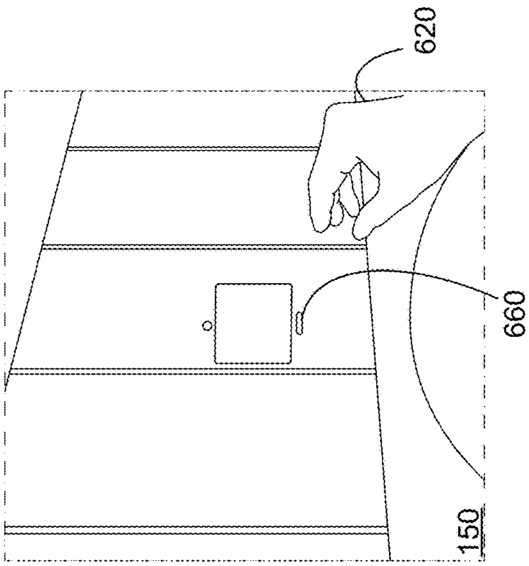
Figure 6C:
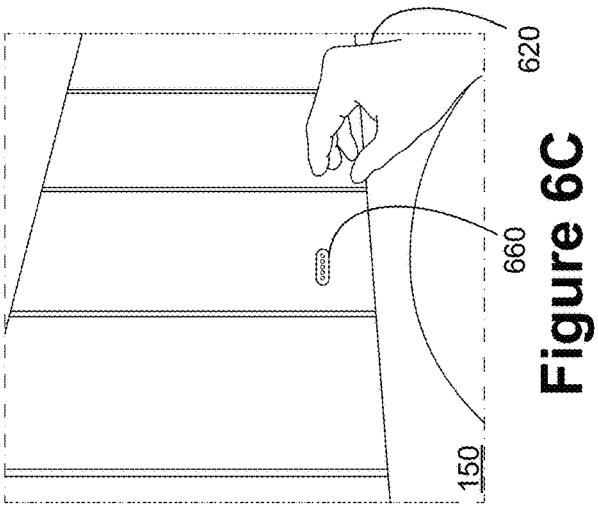
Figure 6D:
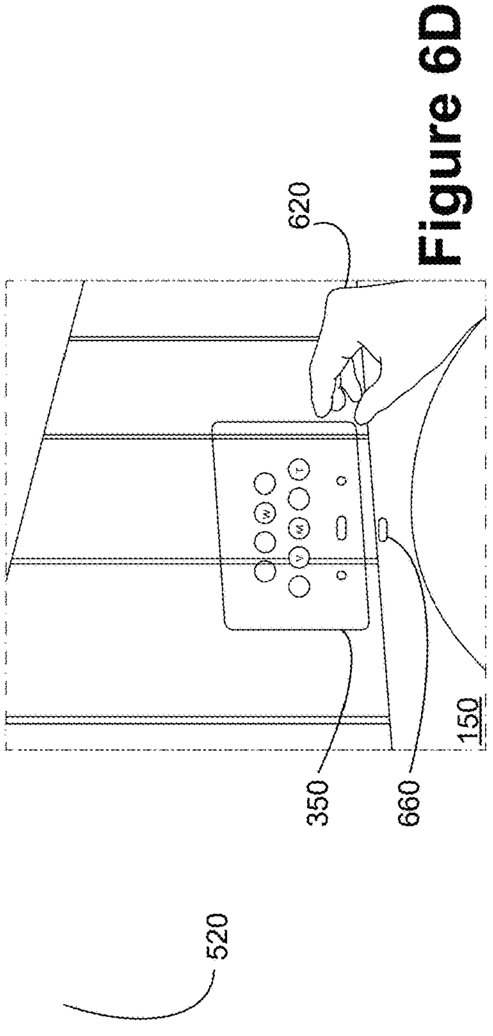

FIGS. 6A-6D illustrate the user 101 interacting with the head-wearable device 110 in the fourth UI state and causing the head-wearable device 110 to display the launcher menu 350 by selecting a bar XR augment 660, in accordance with some embodiments. In some embodiments, the bar XR augment 660 is identical to the glance XR augment 110. FIG. 6A illustrates the user 101 selecting the bar XR augment 660 (e.g., the glance XR augment 160) by performing a bar select gesture 620 (e.g., the index-finger pinch gesture directed at the bar XR augment 660) while the head-wearable device 110 is displaying the fourth UI state, in accordance with some embodiments. FIG. 6B illustrates the user 101 selecting the bar XR augment 660 by performing the bar select gesture 620 (e.g., an index-finger pinch gesture) while the head-wearable device 110 is displaying the third UI state, in accordance with some embodiments. FIG. 6C illustrates the user 101 selecting the bar XR augment 660 by performing the bar select gesture 620 while the head-wearable device 110 is displaying the second UI state, in accordance with some embodiments. FIG. 6D illustrates the head-wearable device 110 displaying the launcher menu 350 while also presenting the bar glance XR augment 660, in accordance with some embodiments. In some embodiments, when the head-wearable device 110 displays the launcher menu 350, in response to the user 101 performing the bar select gesture 620, the head-wearable device 110 also continues to display the bar glance XR augment 660.

Figure 7B:
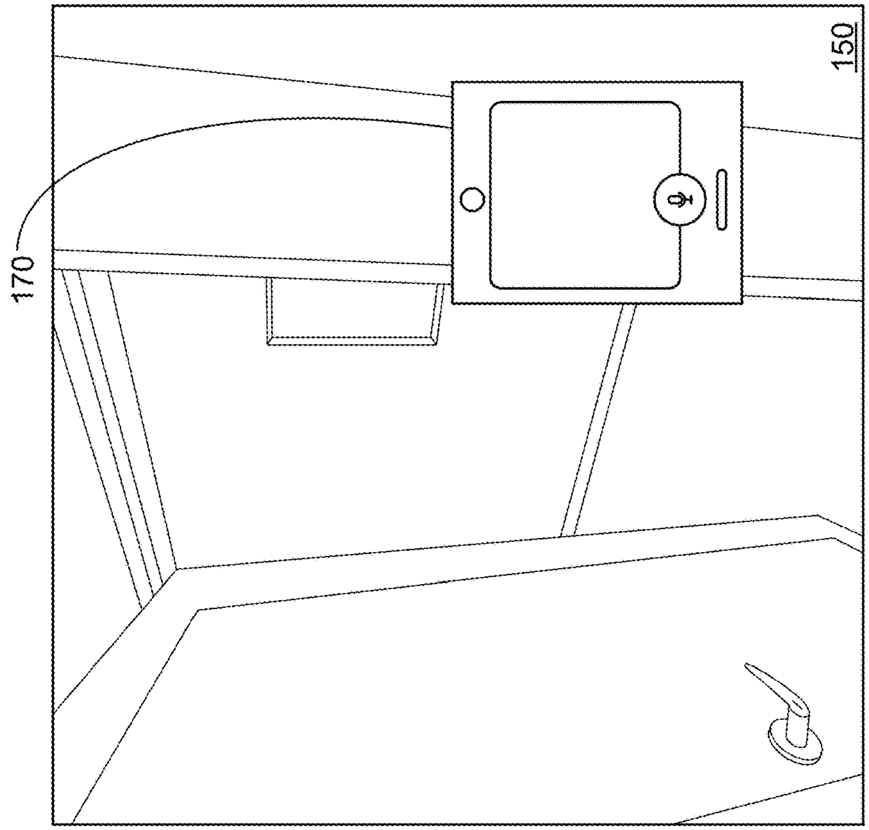
FIGS. 7A-7B illustrate a fifth sequence of a user switching between a fourth UI state and a third UI state by physically leaving a predetermined area in a physical environment around the user, in accordance with some embodiments.
Figure 7A:
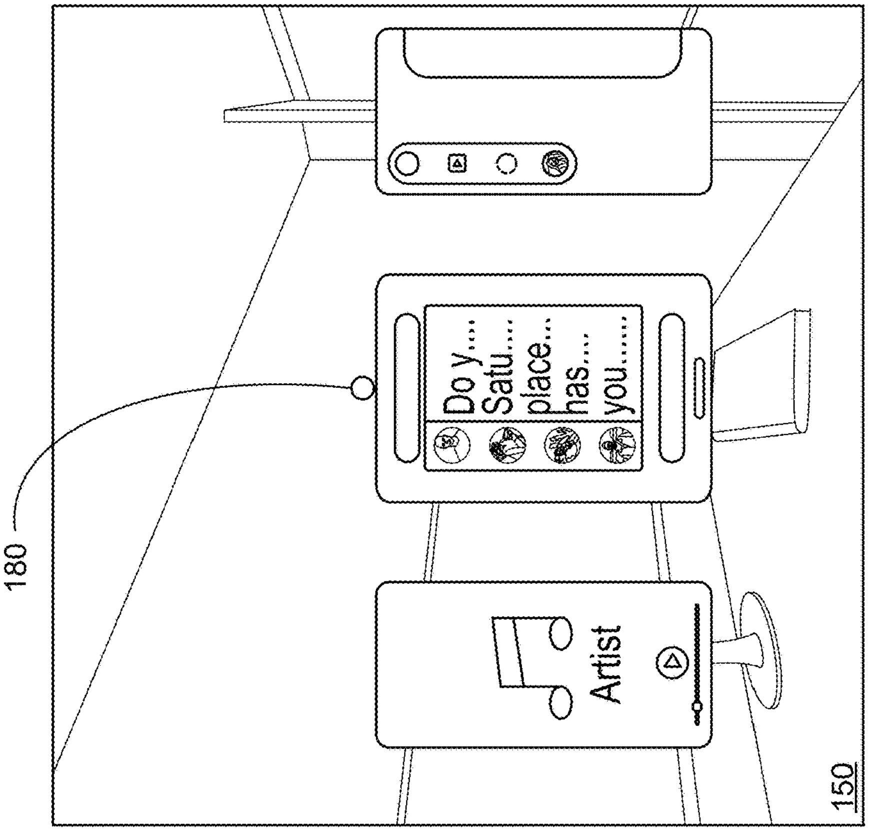

FIGS. 7A-7B illustrate a fifth sequence of the user 101 switching between the fourth UI state and the third UI state by physically leaving the predetermined area in the physical environment around the user 101, in accordance with some embodiments. FIG. 7A illustrates the user 101 interacting with the application-view XR augment 180 in the fourth UI state while inside the predetermined area in the physical environment (e.g., at a work-desk), in accordance with some embodiments. FIG. 7B illustrates the user leaving the predetermined area, and, in response, the head-wearable device 110 stops displaying the fourth UI state and begins displaying the third UI state including the follow XR augment 170, in accordance with some embodiments. In some embodiments, the predetermined area in the physical environment is an area of a predetermined size (e.g., a circle with a radius of five feet) around the user when the user initially switches into the fourth UI state. In some embodiments, when the head-wearable device 110 stops displaying the fourth UI state and begins displaying the third UI state, the follow XR augment 170 displayed in the third UI state includes content from a previous application (e.g., content that was display in the application-view XR augment 180) that the user 101 most recently interacted with while interacting with the fourth UI state. For example, as illustrated in FIG. 7A, the user 101 is interacting with a seventh application XR augment associated with a messaging application, and, thus, when the user 101 leaves the predetermined area in the physical environment, the head-wearable device 110 begins displaying the third UI state including a seventh follow XR augment associated with the messaging application is displayed, as illustrated in FIG. 7B. In some embodiments, when the head-wearable device 110 stops displaying the fourth UI state and begins displaying the third UI state, the follow XR augment 170 displayed during the third UI state includes content from an application with ongoing input and/or output (e.g., a video call application while a video call is ongoing), an application with a constantly updating output (e.g., a video streaming application), an application with an intermittently updating output (e.g., a messaging application), and an application with a static activity (e.g., a notetaking application).

Figure 8B:
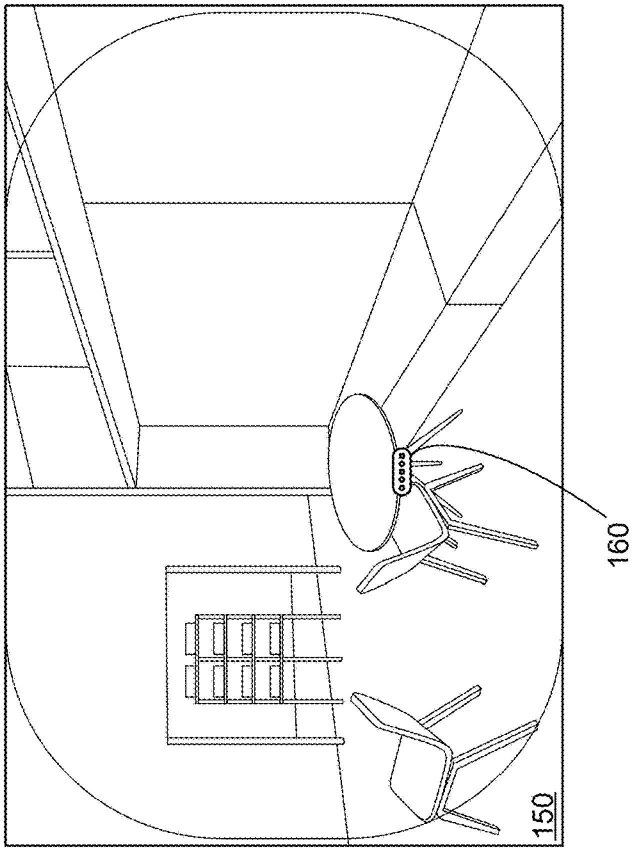
FIGS. 8A-8B illustrate a sixth sequence of a user switching between a third UI state and a second UI state, in accordance with some embodiments.
Figure 8A:
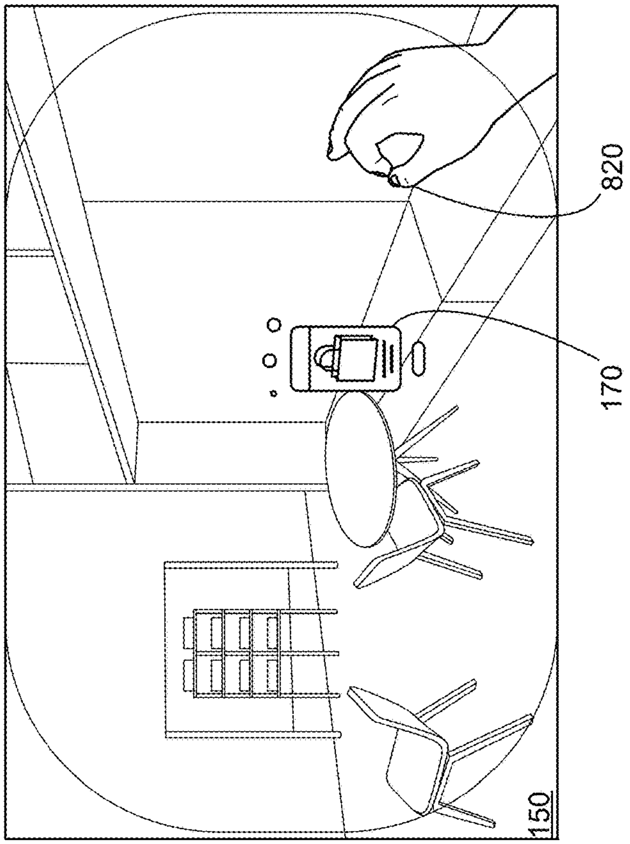

FIGS. 8A-8B illustrate a sixth sequence of the user 101 switching from the third UI state to the second UI state, in accordance with some embodiments. FIG. 8A illustrates the user 101 interacting the follow XR augment 170 in the third UI state, and the user 101 performing a glance switch gesture 820 (e.g., an index finger double-pinch gesture), in accordance with some embodiments. FIG. 8B illustrates the head-wearable device 110 displaying the second UI state including the glance XR augment 160 in response to the user performing the glance switch gesture 820, in accordance with some embodiments.

Figure 9A:
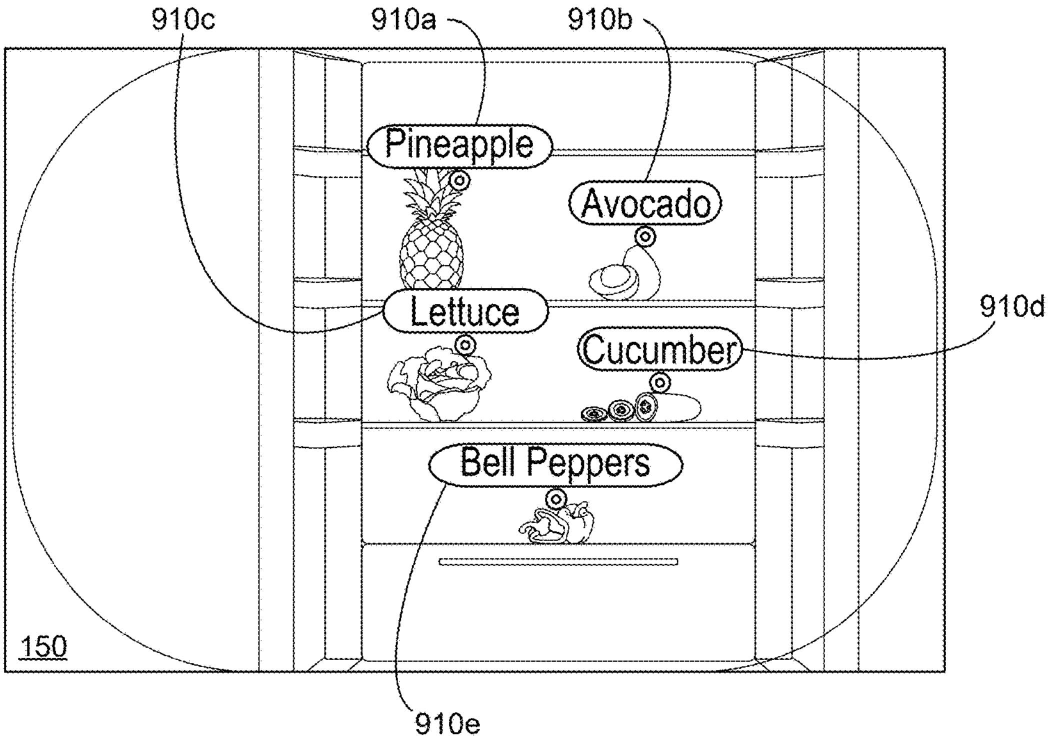
FIGS. 9A-9E illustrate a seventh sequence of a user interacting with an artificially intelligent (AI) assistant at a head-wearable device to prepare a recipe, in accordance with some embodiments.
Figure 9B:
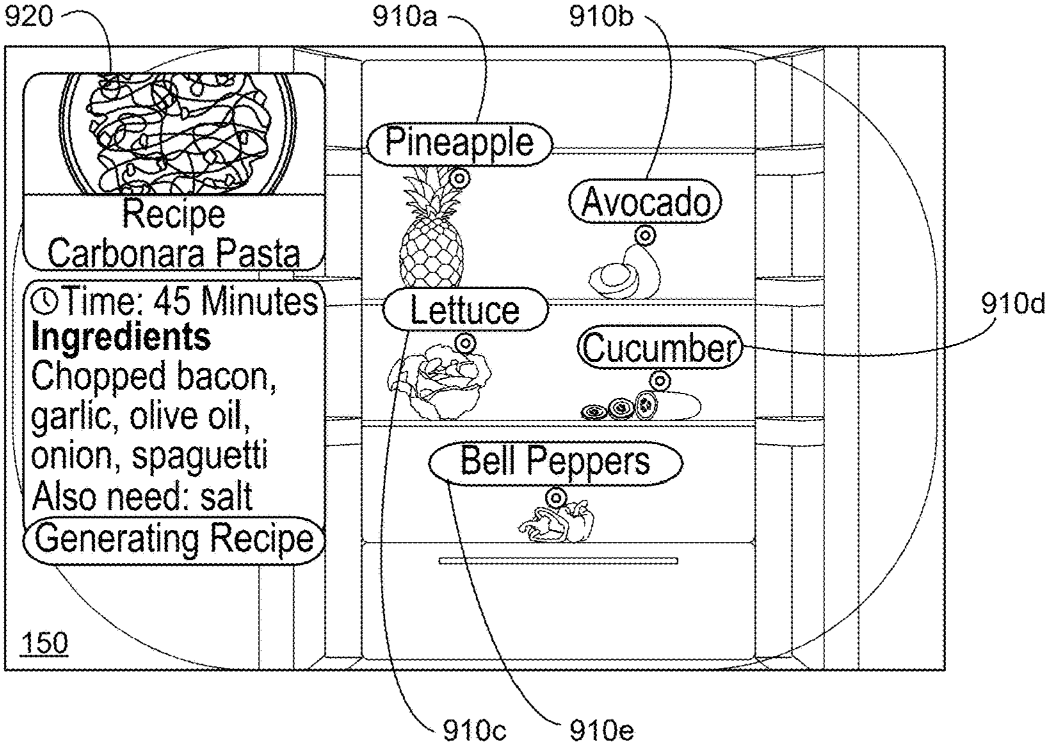
Figure 9C:
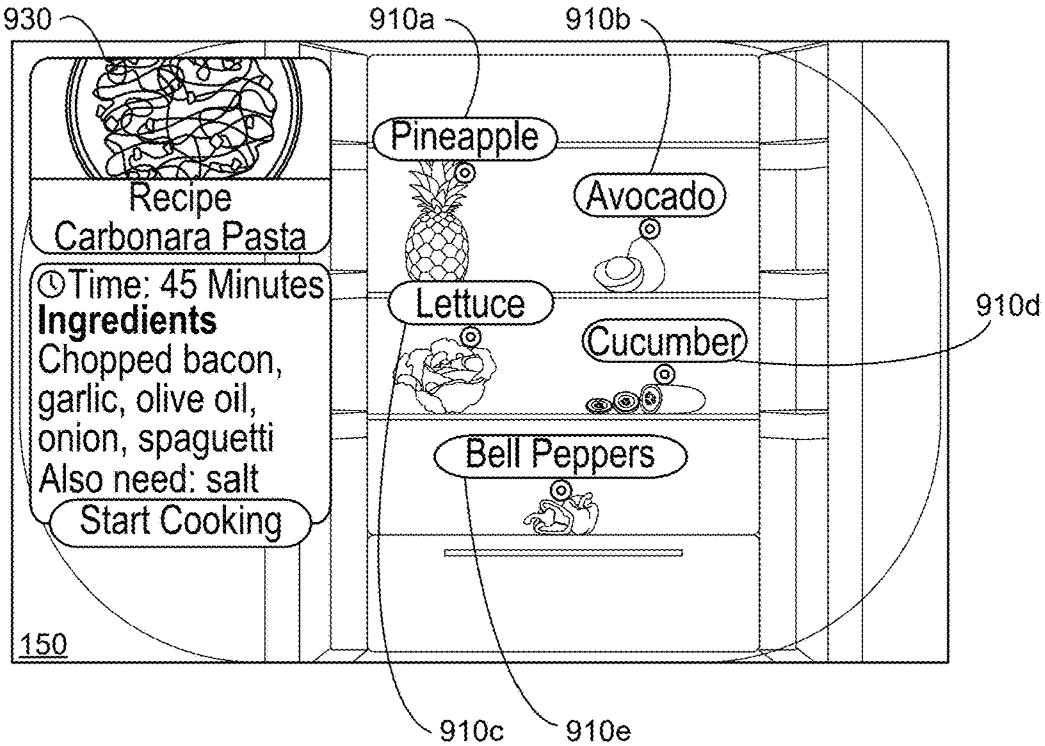
Figure 9D:
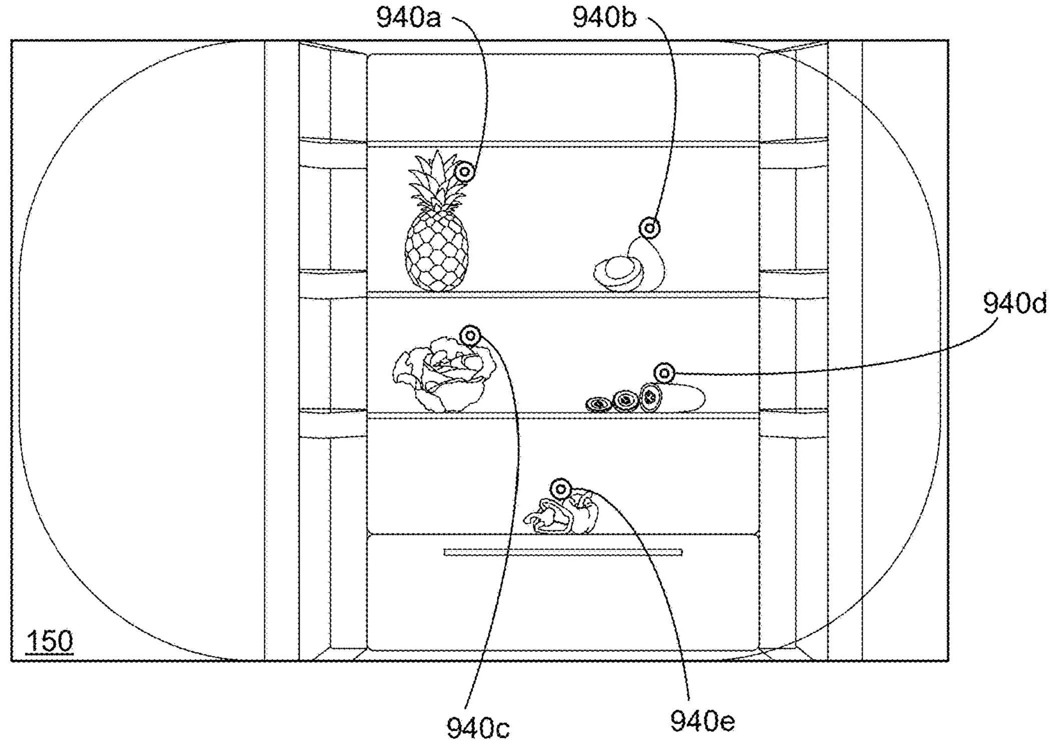

FIGS. 9A-9E illustrate a seventh sequence of the user 101 interacting with an artificially intelligent (AI) assistant at the head-wearable device 110 to prepare a recipe, in accordance with some embodiments. In some embodiments, the recipe is generated by the AI assistant based on ingredients available to the user. FIG. 9A illustrates the AI assistant identifying the ingredients available to the user 101 in a refrigerator within the field-of-view 150 of the user 101, in accordance with some embodiments. The AI assistant identifies the ingredients available to the user 101 (e.g., pineapple, avocado, lettuce, cucumber, and bell peppers, as illustrated in FIG. 9A) with an AI image recognition program based on image data (e.g., a picture and/or video data) of the field-of-view 150 captured from an imaging device (e.g., a camera) of the head-wearable device 110. In some embodiments, in response to identifying the ingredients available to the user 101, the head-wearable device 110 displays a respective label 910*a*-910*e* (e.g., pineapple XR label 910*a*, avocado XR label 910*b*, lettuce XR label 910*c*, cucumber XR label 910*d*, and bell pepper XR label 910*e*, as illustrated in FIGS. 9A-9D) at a respective location in the field-of-view 150 corresponding to each of the ingredients available to the user 101, as illustrated in FIG. 9A. In some embodiments, the AI assistant identifies the ingredients available to the user 101 in response to an instruction from the user 101 (e.g., a voice command "What can I make for dinner with this?"). FIG. 9B illustrates the AI assistant generating the recipe (e.g., Mama's Tomato Pasta) based on the ingredients available to the user 101, in accordance with some embodiments. In some embodiments, the AI assistant generates the recipe based on user behavior, user settings, and other ingredients known to the AI assistant (e.g., generic ingredients, such as salt and pepper). In some embodiments, AI assistant generating the recipe with a generative AI program. In some embodiments, while the AI assistant generates the recipe, the head-wearable device 110 presents a recipe loading XR augment 920 that informs the user 101 that the AI assistant is currently generating the recipe as well as information regarding the recipe (e.g., name of the recipe, ingredients needed for the recipe, time to prepare the recipe, etc.), as illustrated in FIG. 9B. FIG. 9C illustrates the AI assistant presenting a recipe XR augment 930 (e.g., name of the recipe, ingredients needed for the recipe, time to prepare the recipe, etc.) to the user 101 at the head-wearable device 110, in accordance with some embodiments. In some embodiments, the user 101 can select the recipe XR augment 930 and view instructions of the recipe (e.g., by selecting “Start cooking”) and/or ask the AI assistant to generate a different recipe based on the ingredients available to the user 101. FIG. 9D illustrates the head-wearable device 110 displaying a respective other label 910*a*-910*e* (e.g., a plurality of circles, as illustrated in FIG. 9D) at respective locations corresponding to each of the ingredients needed for the recipe, in accordance with some embodiments. The other respective labels remain while the user is preparing the recipe to assist the user 101 in gathering the ingredients need to prepare the recipe.

Figure 9E:
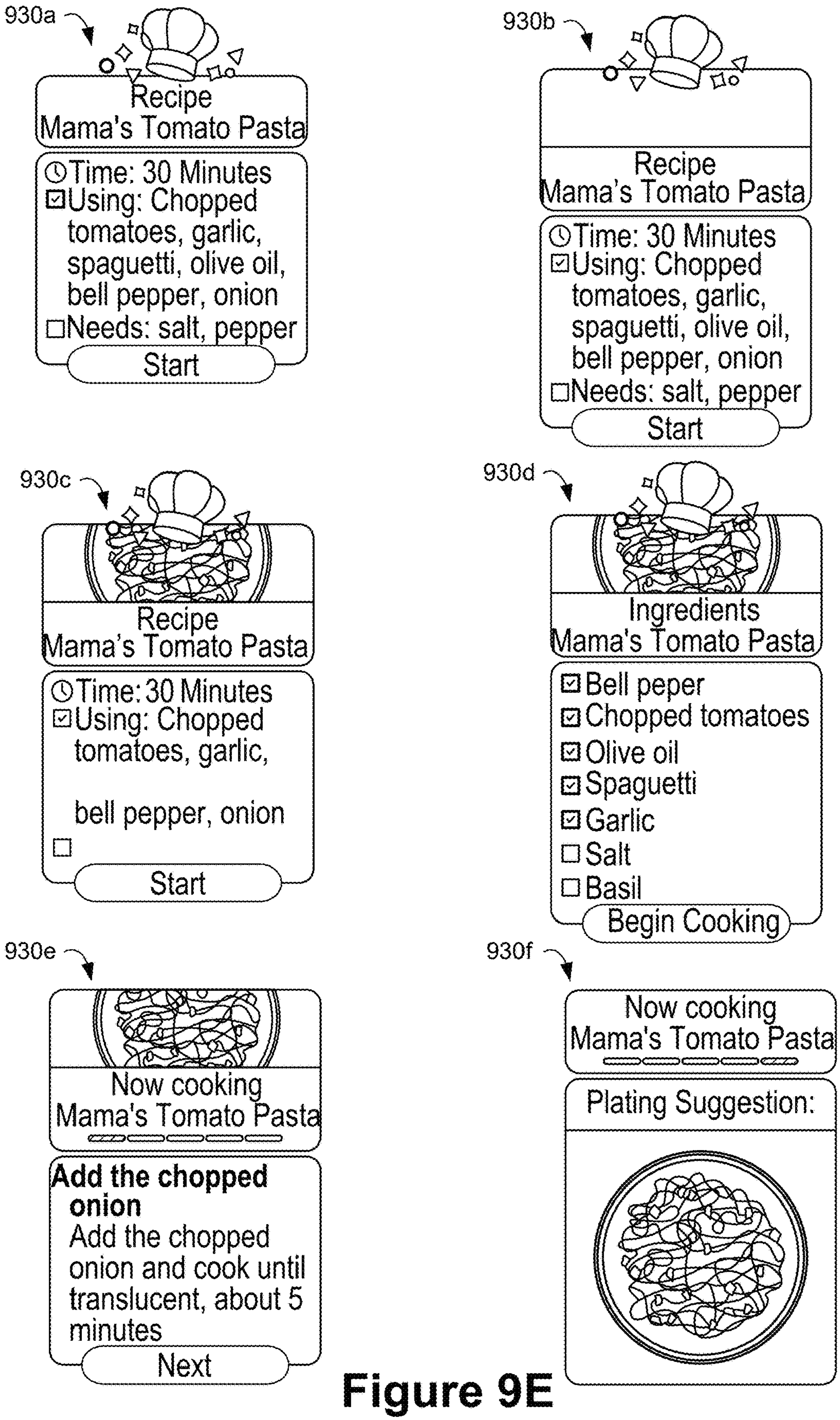

FIG. 9E illustrate a plurality of example recipe XR augments 930*a*-930*f* presented at the head-wearable device 110, in accordance with some embodiments. In some embodiments, each of the plurality of example recipe XR augments 930*a*-930*f* is presented in as a recipe follow XR augment in third UI state and/or a recipe application XR augment the fourth UI state by the head-wearable device 110. A first example recipe XR augment 930*a* shows a recipe title, an estimated preparation time, and a list of ingredients. A second example recipe XR augment 930*b* shows the recipe title, the estimated preparation time, the list of ingredients, and a placeholder image displayed while the AI assistant loads an image that is appropriate for the recipe. A third example recipe XR augment 930*c* shows the recipe title, the estimated preparation time, the list of ingredients, and the image that is appropriate for the recipe. A fourth example recipe XR augment 930*d* shows the list of ingredients and a checklist indicating which of the ingredients needed to prepare the recipe have been gathered by the user. A fifth example recipe XR augment 930*e* shows the instructions of the recipe as the user prepares the recipe. A sixth example recipe XR augment 930*f* shows a plating suggestion for the recipe displayed when the user has completed and/or is close to completing the recipe. In some embodiments, the head-wearable device 110 switches between one or more of the plurality of example recipe XR augments 930*a*-930*f* as the user 101 makes progress preparing the recipe.

Figure 10A:
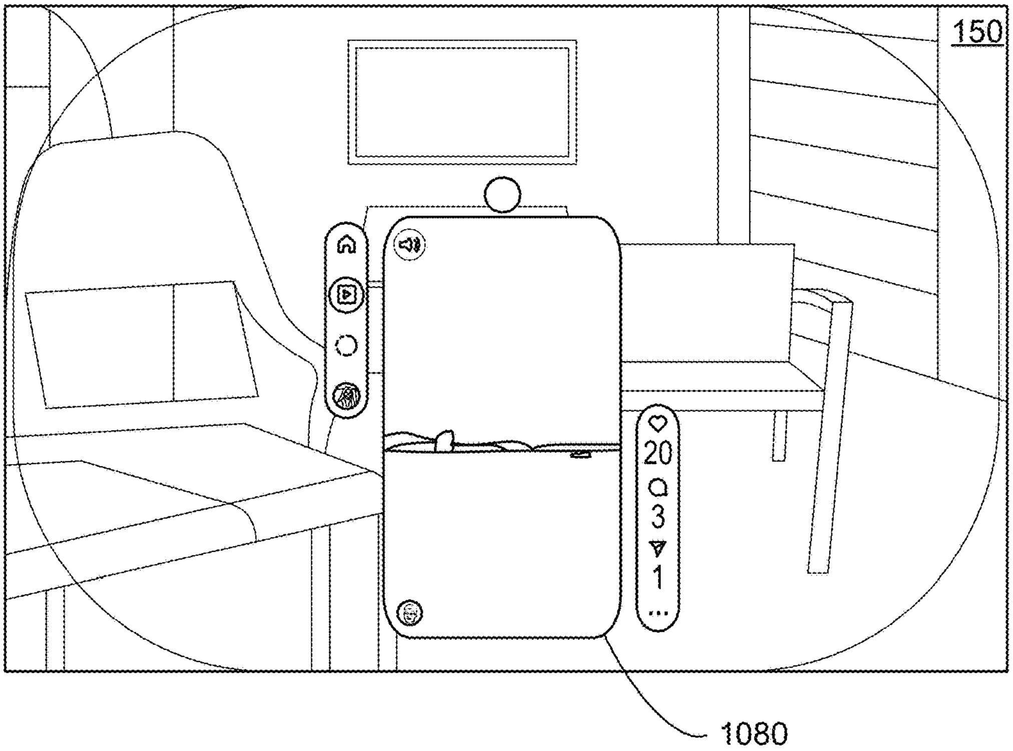
FIGS. 10A-10H illustrate an eighth sequence of a user performing a call at a head-wearable device, in accordance with some embodiments.
Figure 10B:
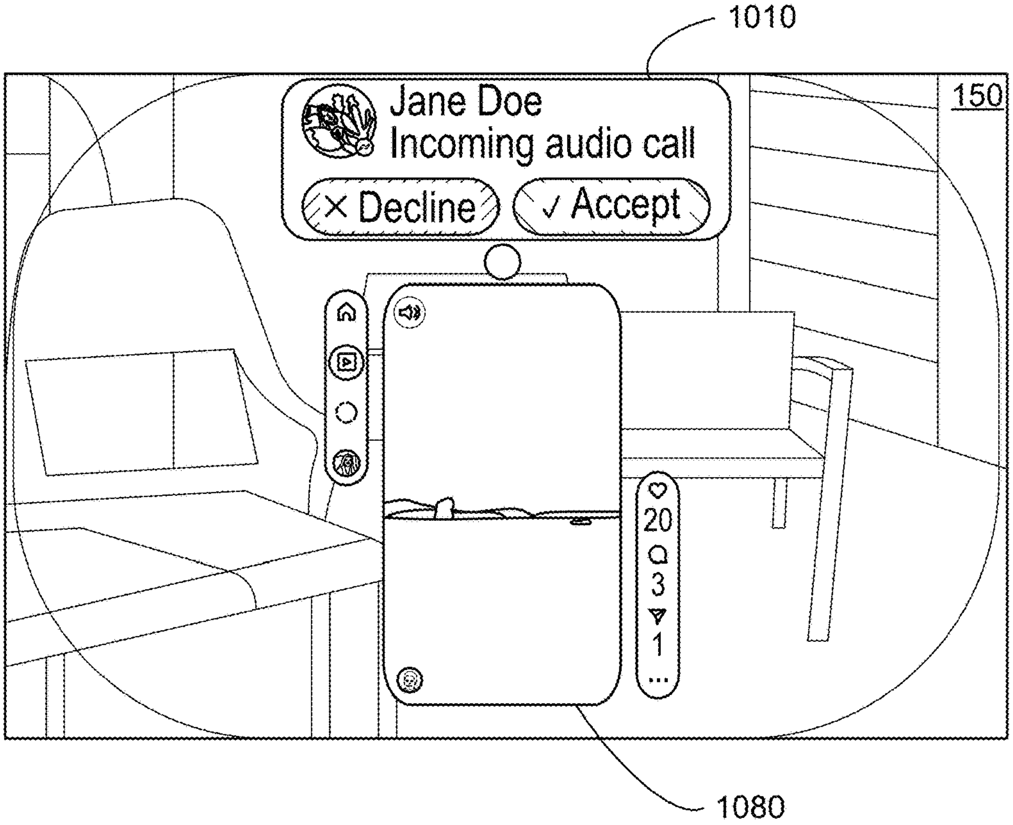

FIGS. 10A-10H illustrate an eighth sequence of the user 101 performing a video call (and/or a voice call in accordance with some embodiments) at the head-wearable device 110, in accordance with some embodiments. FIG. 10A illustrates the user 101 interacting with an eighth application XR augment 1080 (e.g., a social media application XR augment) associated with an eighth application (e.g., a social media application) in the fourth UI state displayed in the field-of-view 150 of the user 101 by the head-wearable device 110, in accordance with some embodiments. FIG. 10B illustrates an incoming call XR augment 1010 associated with an incoming video call displayed in the fourth UI state, in accordance with some embodiments. The incoming call XR augment 1010 includes a first option to decline the incoming video call and a second option to accept the incoming video call. In accordance with a determination that the user 101 declines the incoming video call (e.g., by selecting the first option to decline the incoming video call), the head-wearable device 110 ceases displaying the incoming call XR augment 1010 and continues displaying the eighth application XR augment 1080. In some embodiments, the head-wearable device 110 continues to display the eighth application XR augment 1080 while presenting the incoming call XR augment 1010.

Figure 10C:
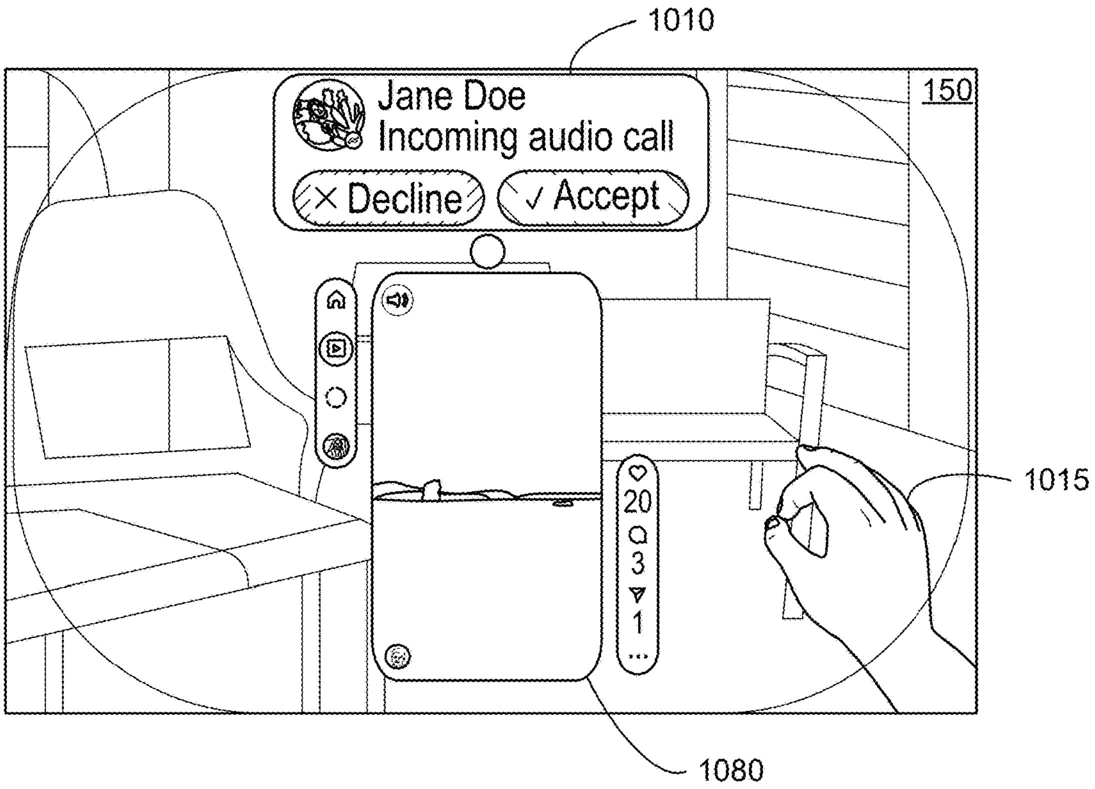
Figure 10D:
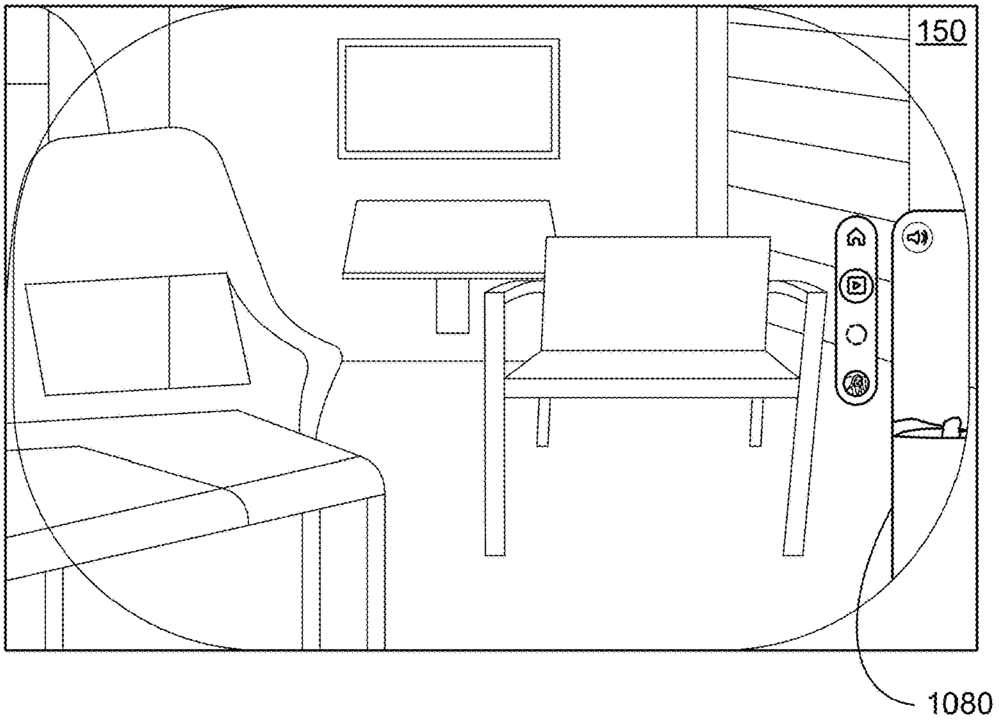

FIG. 10C illustrates the user 101 accepting the incoming video call by performing an accept hand gesture 1015 (e.g., an index finger pinch gesture directed at the second option to accept the incoming video call), in accordance with some embodiments. FIG. 10D illustrates the eighth application XR augment 1080 automatically being moved from a first location in the field-of-view 150 (e.g., directly in front of the user 101) to a second location in the field-of-view 150 (e.g., to a right side of the user 101 and/or to a right side of the first location), in accordance with some embodiments. In some embodiments, in response to the user 101 accepting the incoming video call by performing an accept hand gesture 1015, the head-wearable device 110 ceases displaying the incoming call XR augment 1010.

Figure 10E:
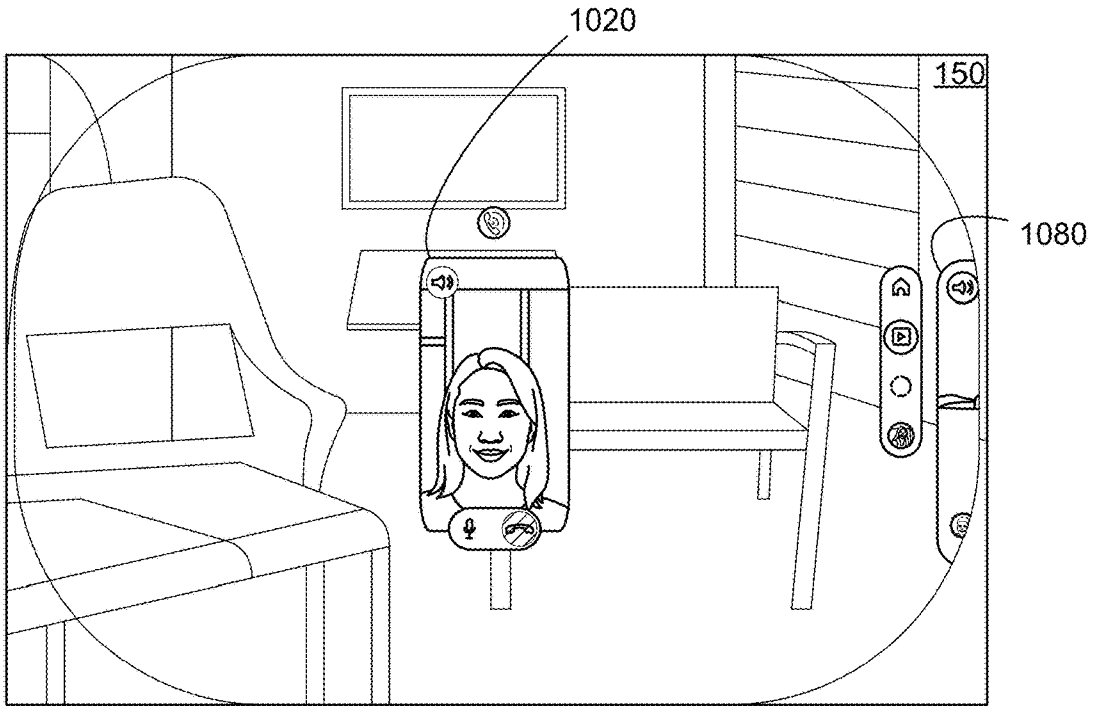
Figure 10F:
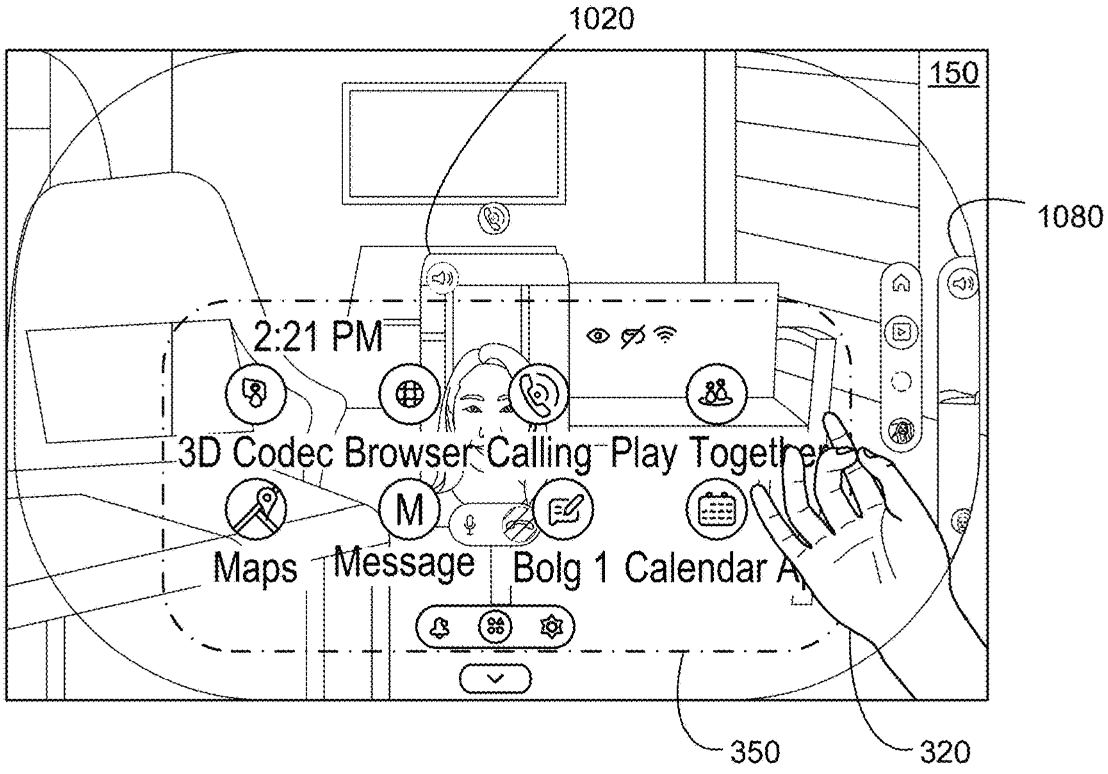

FIG. 10E illustrates a video call application XR augment 1020 associated with the incoming video call displayed at the first location in the field-of-view 150, in accordance with some embodiments. In some embodiments, the video call application XR augment 1020 includes video data from the incoming video call, an option to hand up the incoming video call, and/or mute an outgoing audio of the user 101. FIG. 10F illustrates the user 101 causing the launcher menu 350 (e.g., the launcher menu 350 including a plurality of application icons 355*a*-355*h*) to be displayed by performing the menu gesture 320 (e.g., a middle finger double-pinch gesture), in accordance with some embodiments. In some embodiments, while the launcher menu 350 is displayed, the incoming video call continues in a background of the field-of-view 150 (e.g., the launcher menu 350 is displayed in front of the video call application XR augment 1020, as illustrated in FIG. 10F). The user 101 may interact with the launcher menu 350 while the incoming video call continues at the video call application XR augment 1020.

Figure 10G:
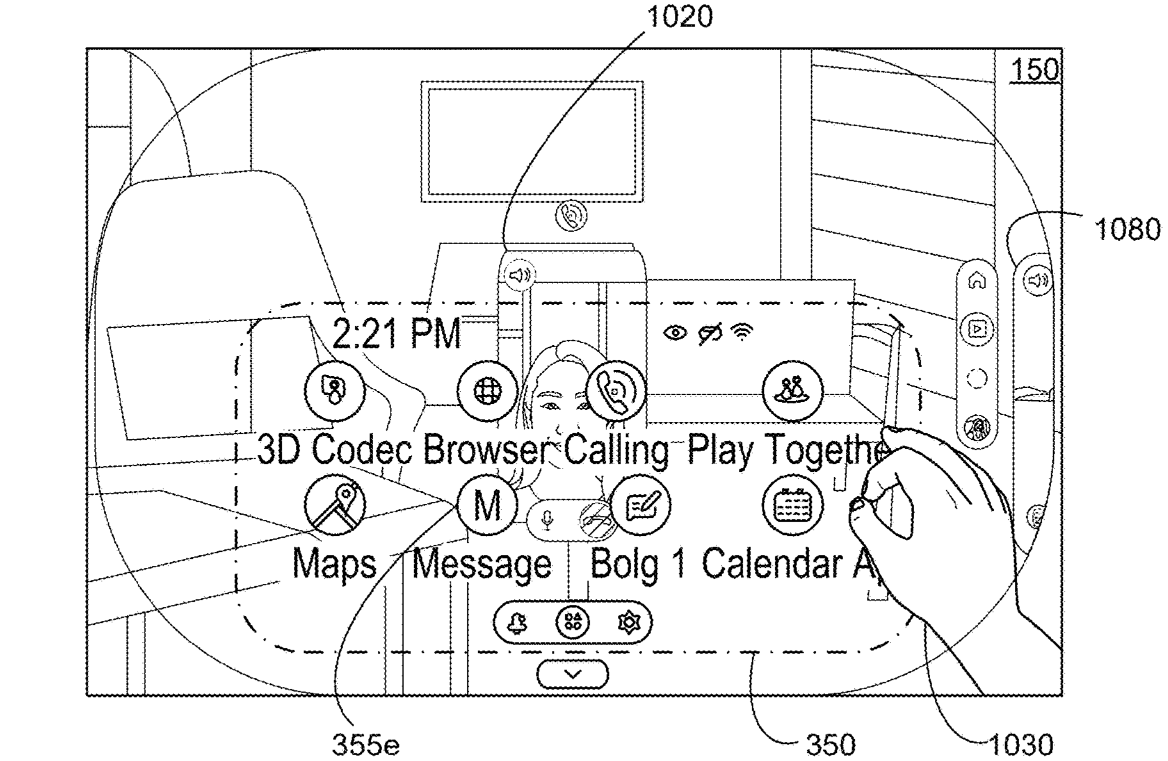
Figure 10H:
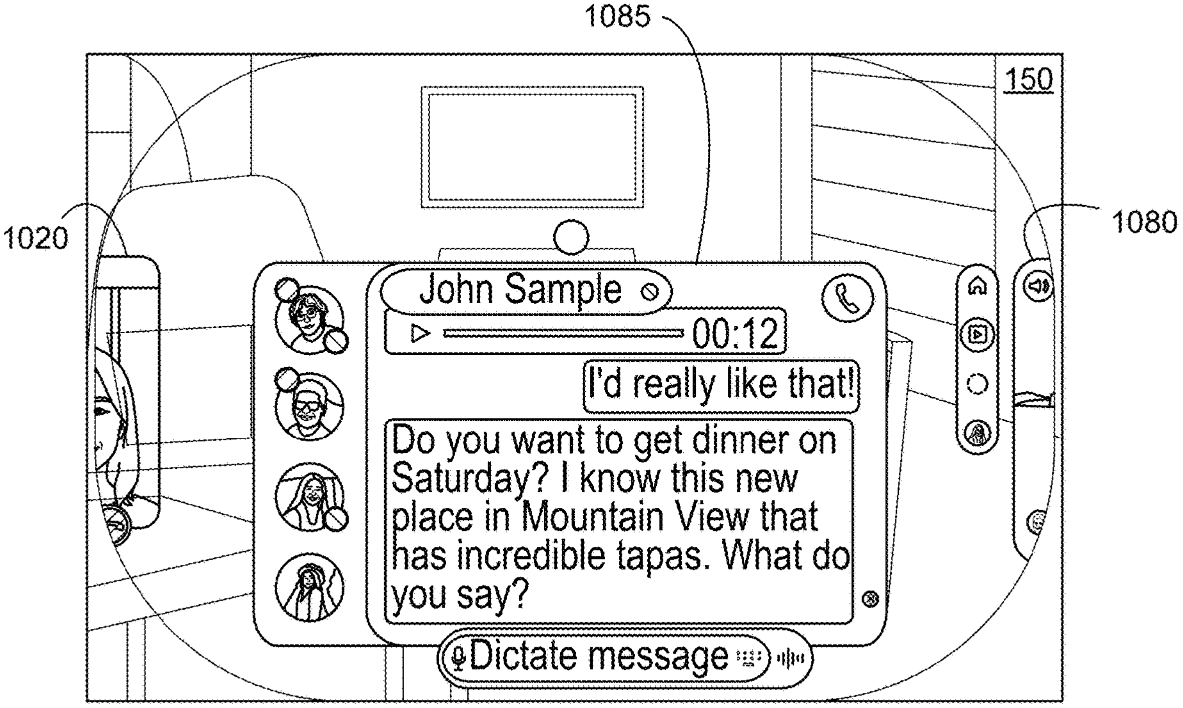

FIG. 10G illustrates the user 101 selecting a fifth application icon 355*e*, associated with a fifth application (e.g., a messaging application), from the plurality of application icons 355*a*-355*h* at the launcher menu 350, in accordance with some embodiments. In some embodiments, the user 101 selects the fifth application icon 355*e* by performing an application icon select gesture 1030 (e.g., an index finger pinch gesture directed at the fifth application icon 355*e*). In response to the user 101 selecting the fifth application icon 355*e*, the video call application XR augment 1020 is moved from the first location in the field-of-view 150 to a third location in the field-of-view 150 (e.g., to a left side of the user 101 and/or to a left side of the first location). FIG. 10H illustrates a ninth application XR augment 1085, associated with the fifth application, displayed at the first location in response to the user 101 performing the application icon select gesture 1030, in accordance with some embodiments. In some embodiments, while the video call application XR augment 1020 is displayed at the third location, the incoming video call continues. In other embodiments, the video call application XR augment 1020 associated with the incoming video call is displayed at a natural location within the field-of-view 150 rather than the first location, the second location, and/or the third location (e.g., the video call application XR augment 1020 associated with the incoming video call is displayed such that the video call application XR augment 1020 appears over a table and/or desk, a blank space on a wall, and/or over a television screen within the field-of-view 150).

Figure 11A:
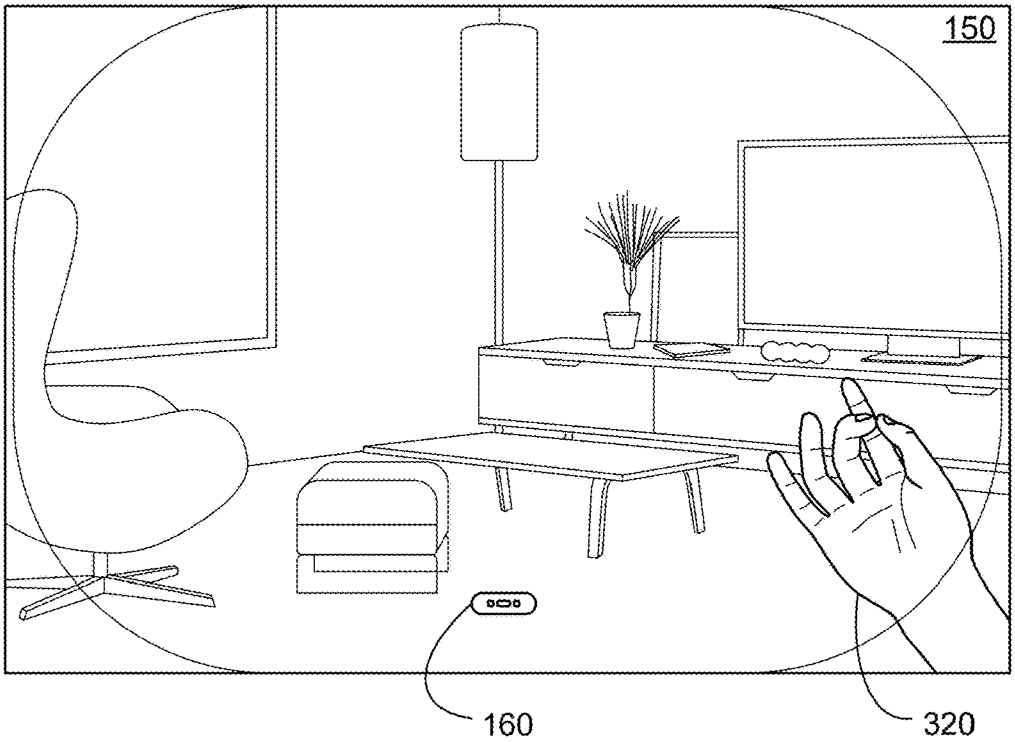
FIGS. 11A-11I illustrate a ninth sequence of a user interacting with video game XR content associated with a video game application in a fifth UI state, in accordance with some embodiments.
Figure 11B:
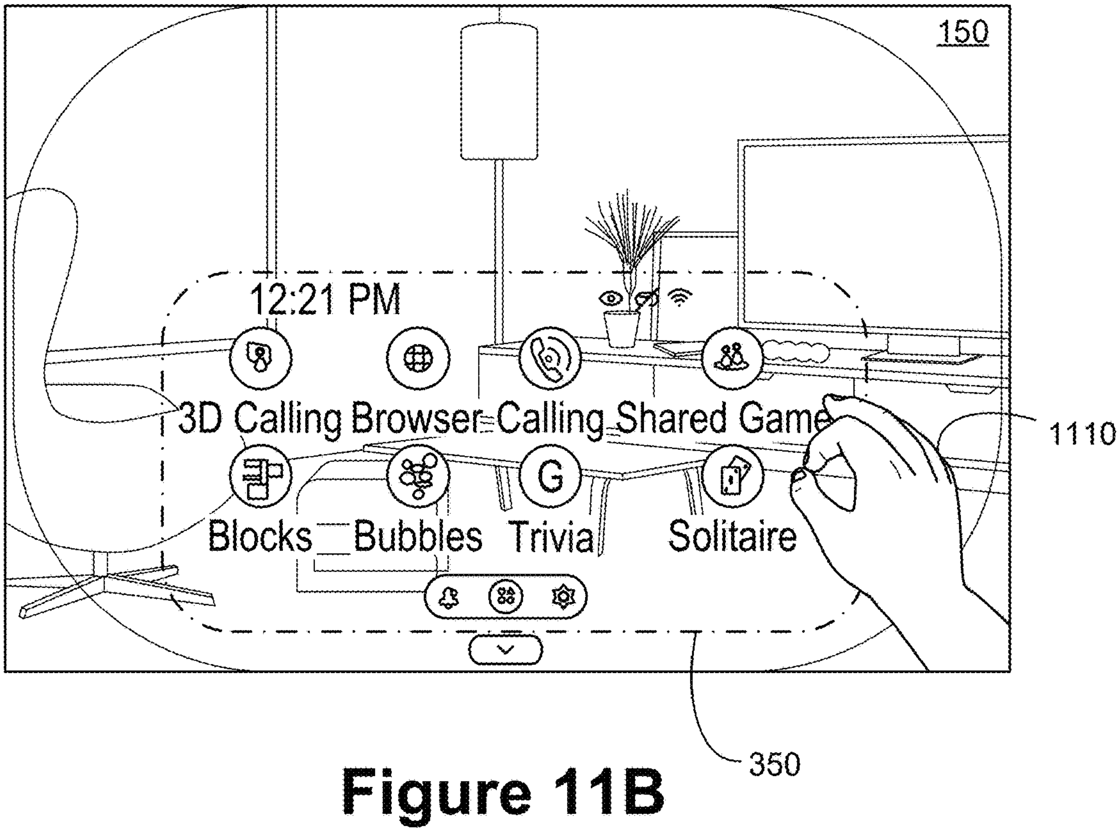

FIGS. 11A-11I illustrate a ninth sequence of the user 101 interacting with video game XR content associated with a video game application in the fifth UI state, in accordance with some embodiments. FIG. 11A illustrates the user 101 switching from the second UI state to the launcher menu in the fourth UI state by performing the menu gesture 320 (e.g., a middle finger double-pinch gesture), in accordance with some embodiments. The head-wearable device 110 displays the glance XR augment 160 while in the fifth UI state. In response to the user 101 performing the menu gesture 320, the head-wearable device 110 presents the launcher menu 350 including a plurality of application icons 355*a*-355*h*. FIG. 11B illustrates the user 101 selecting a fourth application icon 355*d*, of the plurality of application icons 355*a*-355*h*, associated with the video game application, in accordance with some embodiments. In some embodiments, the user 101 selects the fourth application icon 355*d* by performing another application icon select gesture 1110 (e.g., the index finger pinch gesture).

Figure 11C:
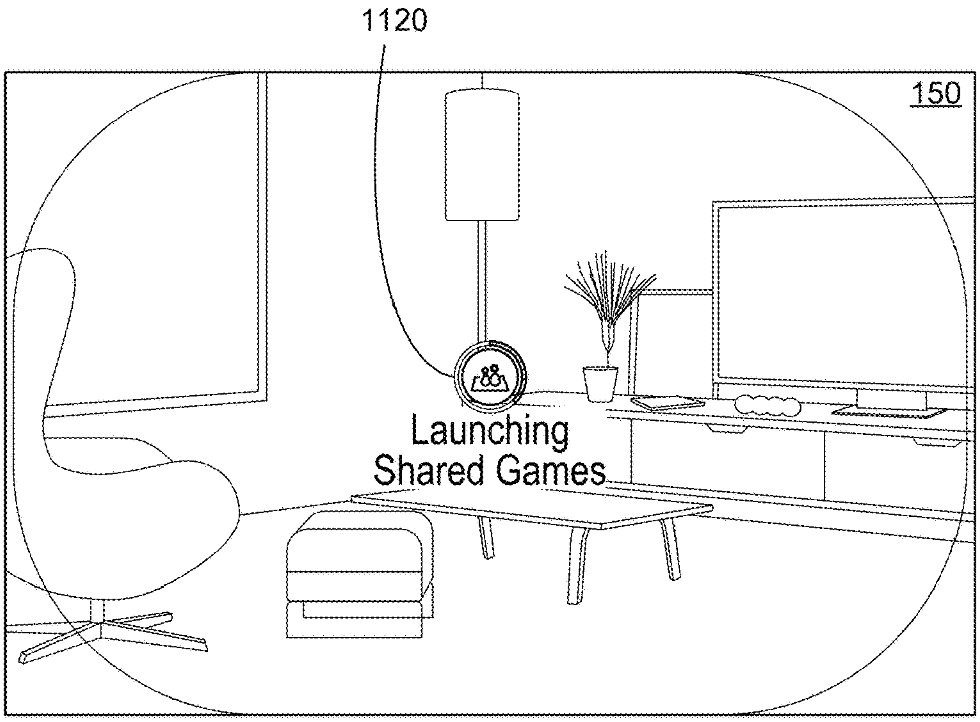
Figure 11D:
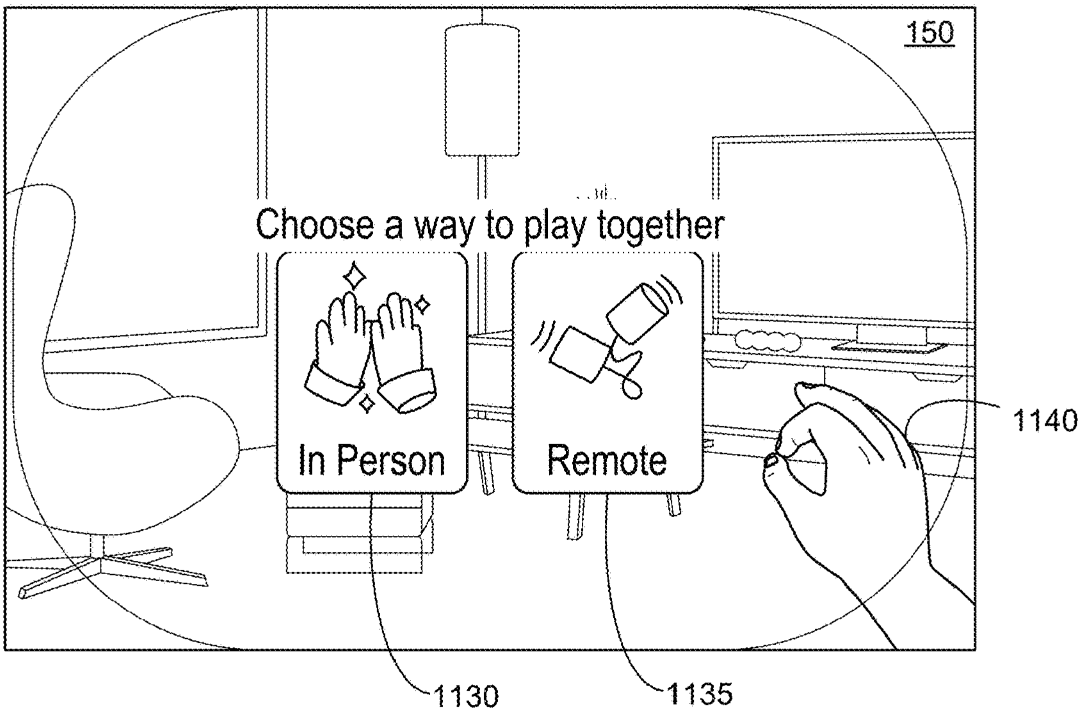

FIG. 11C illustrates a loading XR augment 1120 associated with the video game application displayed at the head-wearable device 110 while the video game application prepares to display the video game XR content, in accordance with some embodiments. The loading XR augment 1120 indicates to the user 101 that the video game application is preparing the video game XR content. FIG. 11D illustrates a multiplayer option menu associated with the video game application, in accordance with some embodiments. The user selects a first multiplayer option 1130 and/or a second multiplayer option 1135 from the multiplayer option menu by performing a multiplayer option menu select gesture 1140 (e.g., an index finger pinch gesture directed at the first multiplayer option 1130 and/or the second multiplayer option 1135). The first multiplayer option 1130 causes the video game application to enter a local multiplayer mode, wherein the user 101 and another user both play a multiplayer video game, associated with the video game application, within a same area (e.g., within a same room). The second multiplayer option 1135 causes the video game application to enter an online multiplayer mode, wherein the user 101 plays the multiplayer video game with the head-wearable device 110 in a first area (e.g., a home of the user 101), and the other user plays the multiplayer video game with another device associated with the other user in a second area (e.g., a home of the other user).

Figure 11E:
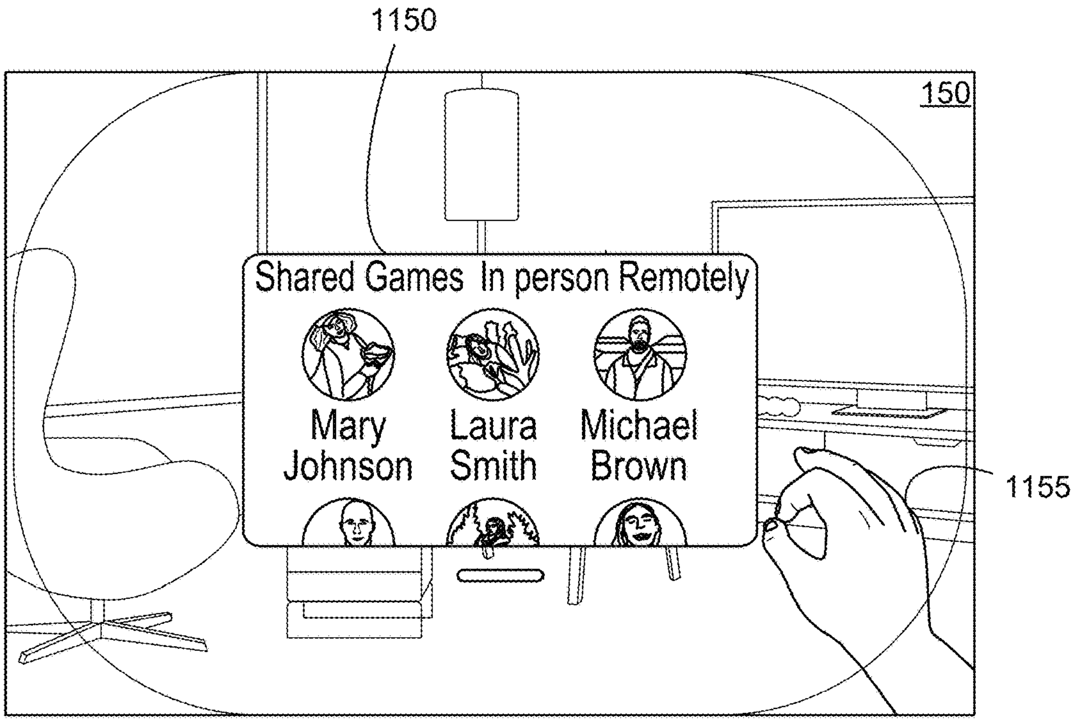
Figure 11F:
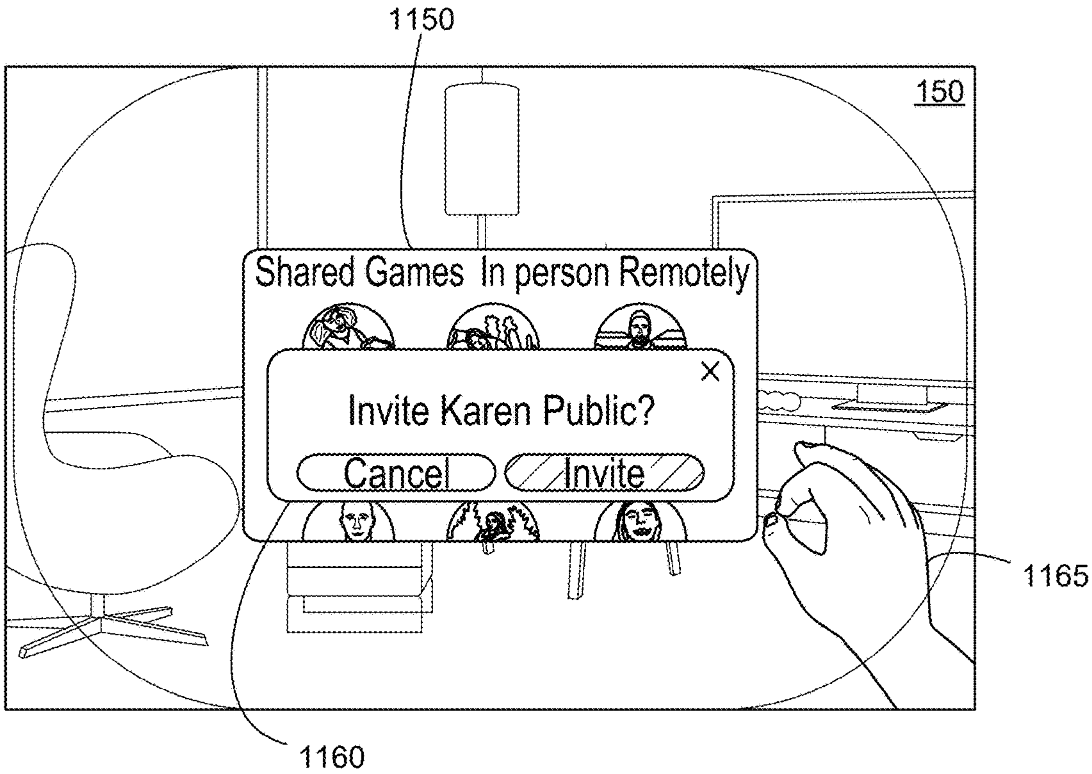

FIG. 11E illustrates a player select menu 1150 associated with the video game application displayed in response to the user 101 selecting the second multiplayer option 1135, in accordance with some embodiments. The player select menu 1150 includes a plurality of user icons, each user icon associated with another user that the user 101 can select to invite to play the multiplayer video game. In some embodiments, the player select menu 1150 is based on a friends list of the user 101 and/or a list of players who are currently online. In some embodiments, the user 101 selects the other user from the player select menu 1150 by performing a player select gesture 1155 (e.g., an index finger pinch gesture directed at a respective user icon of the plurality of user icons). FIG. 11F illustrates an invite confirmation dialogue 1160 displayed in response to the user 101 selecting another user icon associated with the other user, in accordance with some embodiments. The invite confirmation dialogue 1160 includes a first option to send a game invite to the other user and a second option to decline sending the game invite to the other user and return to the player select menu 1150. In some embodiments, the user 101 may select the first option to send the game invite to the other user and/or the second option to decline sending the game invite to the other user by performing an invite select gesture 1165 (e.g., an index finger pinch gesture directed at the first option to send the game invite to the other user and/or the second option to decline sending the game invite to the other user).

Figure 11G:
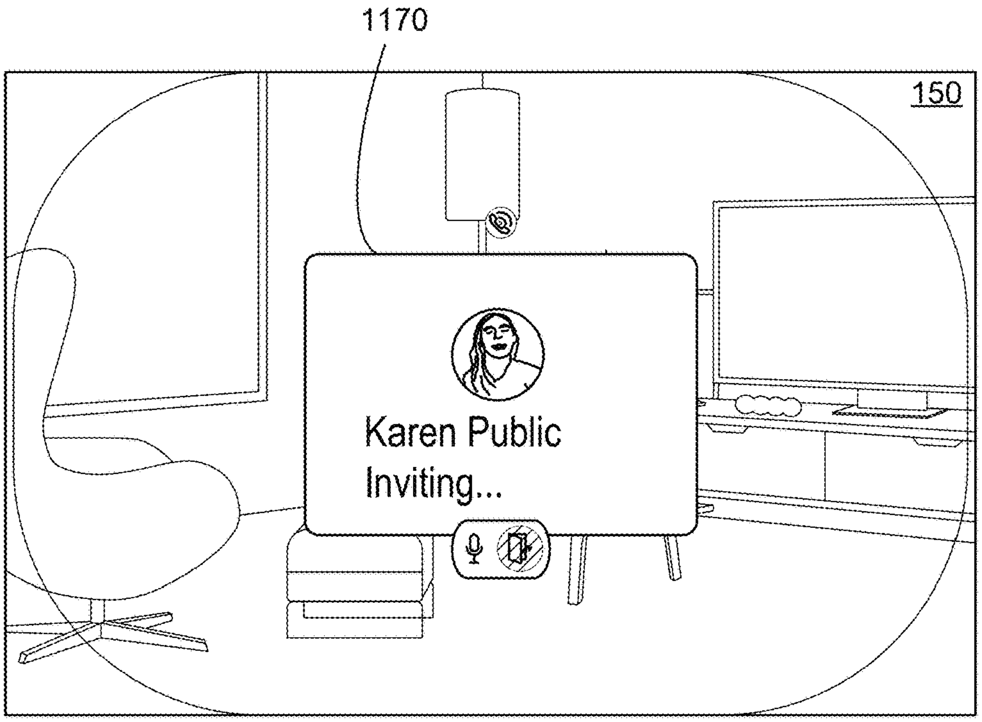
Figure 11H:
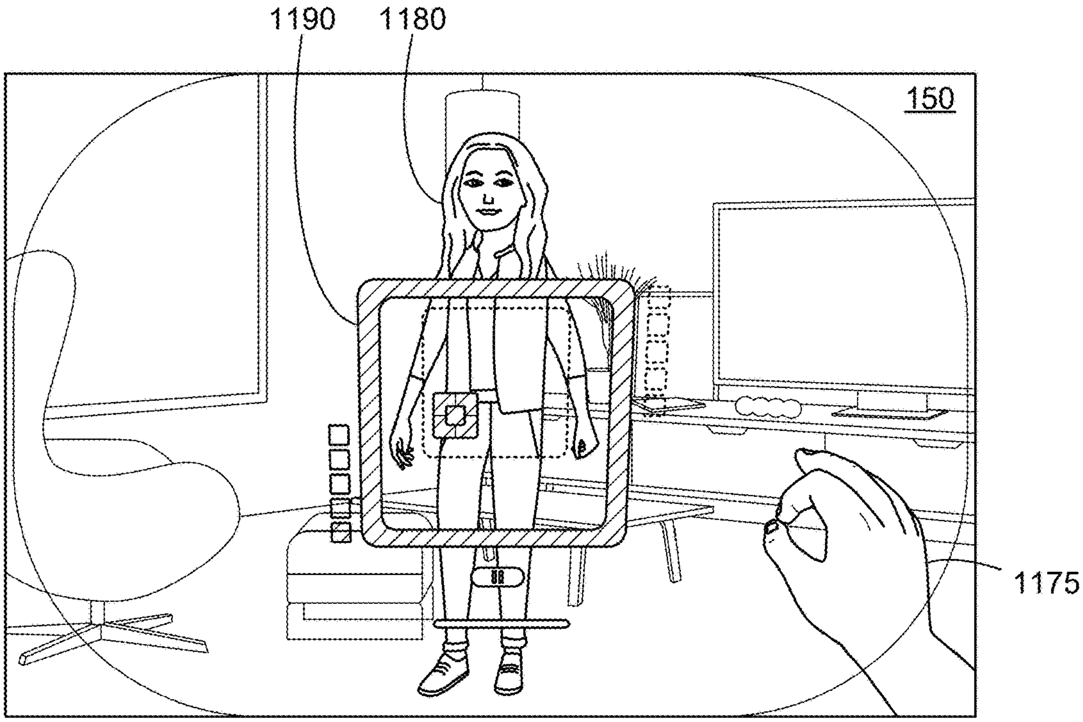
Figure 11I:
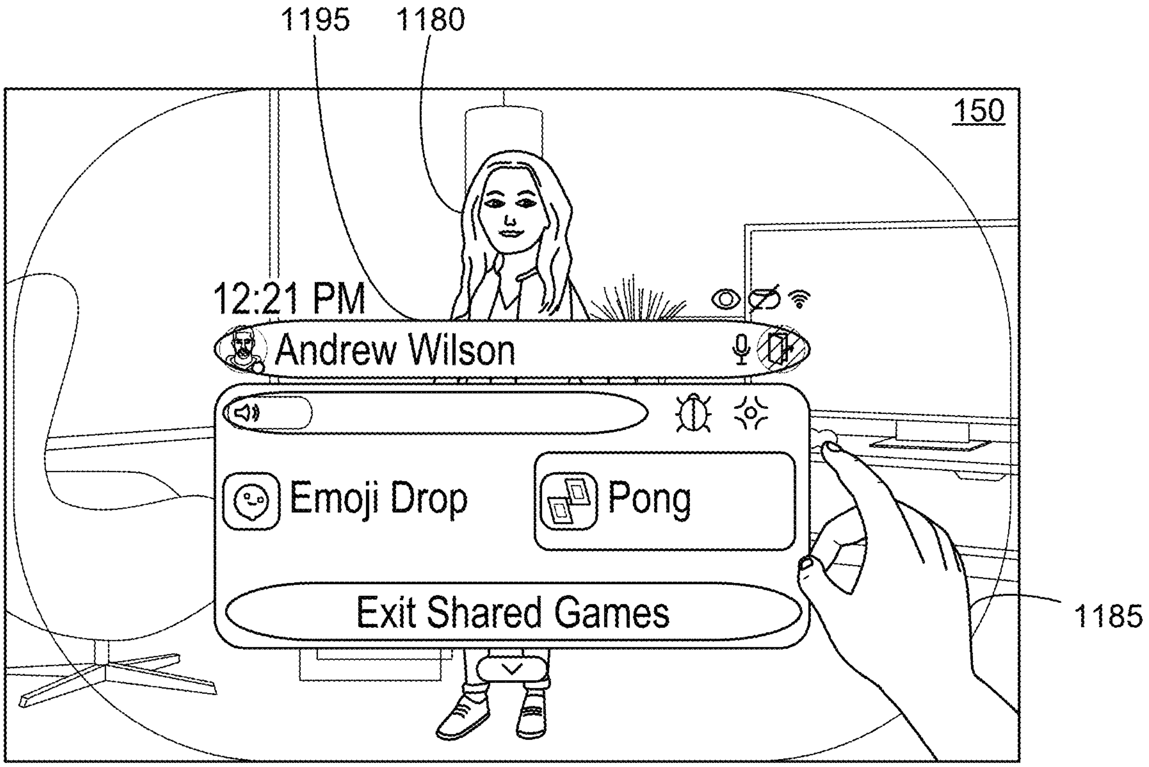

FIG. 11G illustrates an invite call XR augment 1170 associated with the video game application displayed while the other user responds to the video game invite, in accordance with some embodiments. The invite call XR augment 1170 is presented after the user 101 selects the first option to send the game invite to the other user. FIG. 11H illustrates the user 101 interacting with the video game XR content 1190 associated with the video game application with the other user, represented by a user avatar 1180, in accordance with some embodiments. In some embodiments, the user 101 interacts with the video game XR content 1190 by performing a plurality of hand gestures 1175. FIG. 11I illustrates the user 101 interacting with a video game menu 1195 of the video game application, in accordance with some embodiments. In some embodiments, the user 101 performs a video game menu gesture 1185 to cause the head-wearable device 110 to present the video game menu 1195 while the user 101 is interacting with the video game XR content 190. In some embodiments, the video game menu 1195 includes an in-game chat, a brightness setting, a game-switch setting, and/or an exit game option. The user 101 interacts with the video game menu by performing a plurality of hand gestures.

Figure 12A:
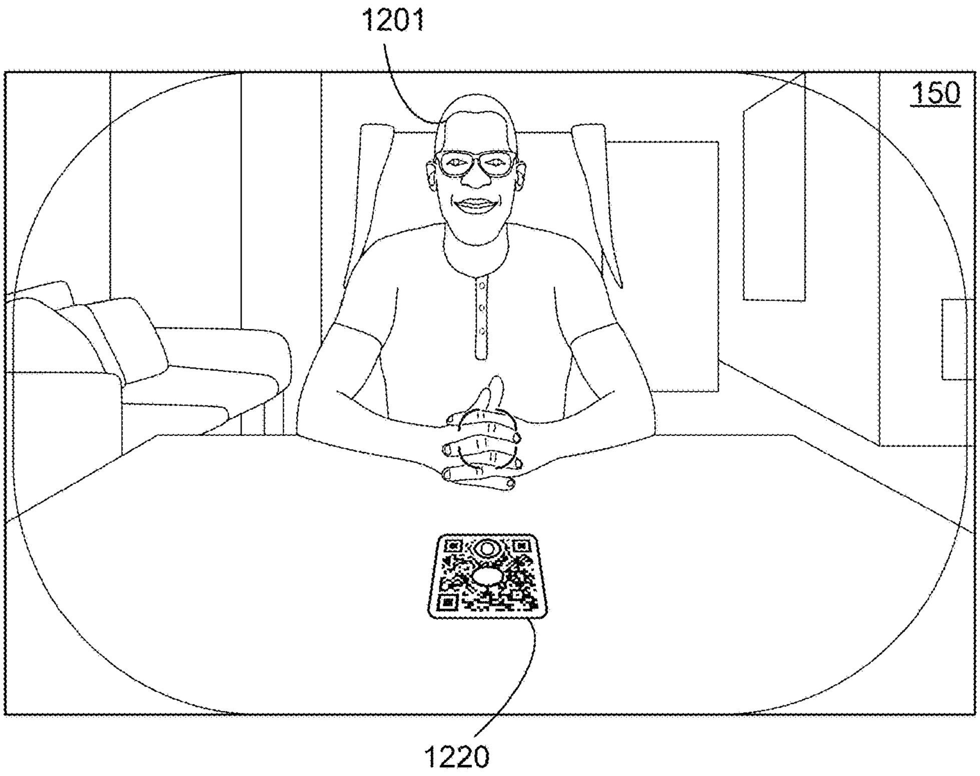
FIGS. 12A-12C illustrate a tenth sequence of a user starting a second video game application via an indicator associated with another user, in accordance with some embodiments.
Figure 12B:
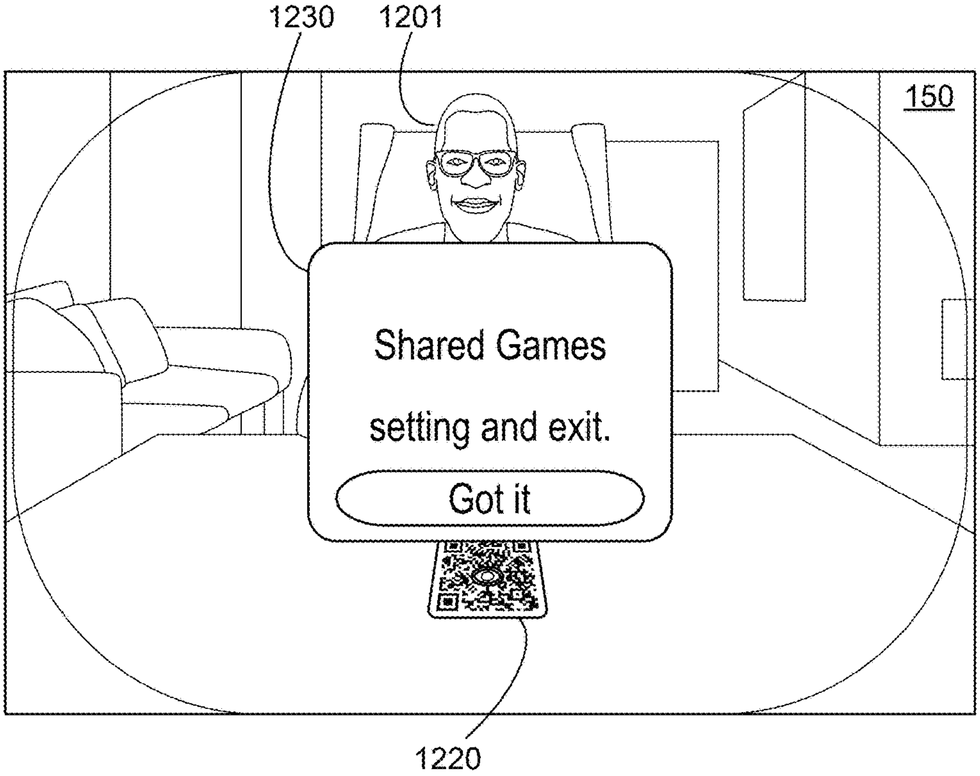
Figure 12C:
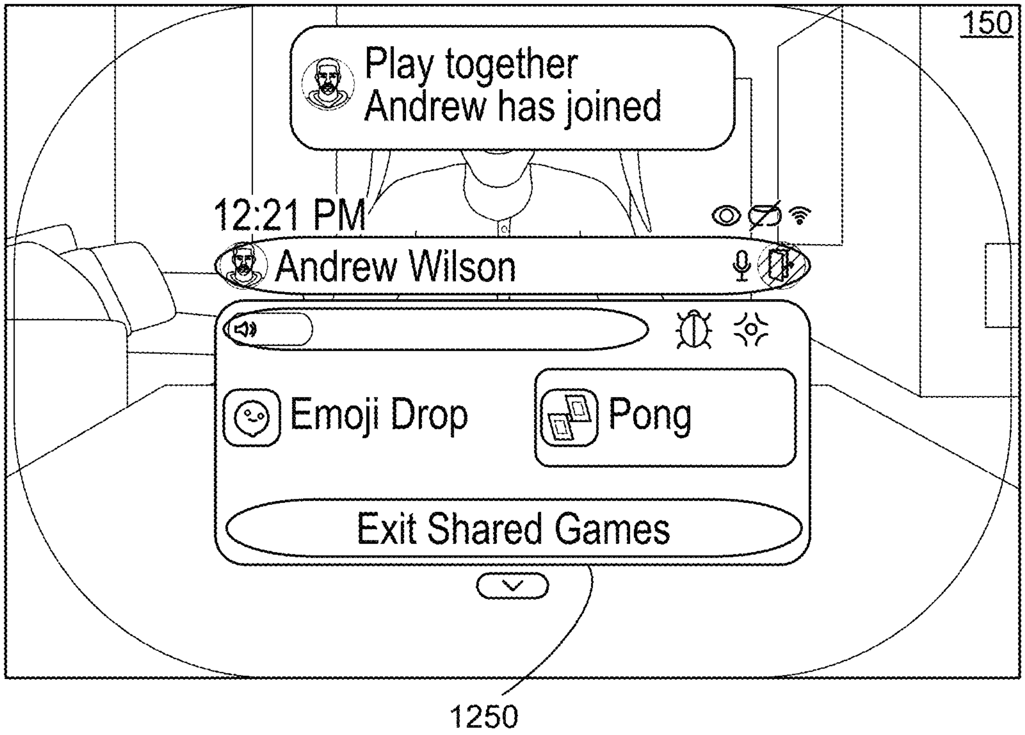

FIGS. 12A-12C illustrate a tenth sequence of the user 101 starting a second video game application via an indicator 1220 (e.g., a quick response (QR) code) associated with the other user 1201, in accordance with some embodiments. FIG. 12A illustrates the user 101 viewing the indicator 1220 associated with the other user 1201, in accordance with some embodiments. In response to detecting the indicator 1220 in image data of the field-of-view 150 captured at the imaging device of the head-wearable device 110, the head-wearable device 110 launches the second video game application associated with the indicator 1220. In some embodiments, in response to the head-wearable device 110 detecting that the indicator 1220 is present in the image data but cannot read information stored in the indicator 1220, the head-wearable device 110 requests that the user 101 center the indicator 1220 in the image data, as illustrated in FIG. 12A. FIG. 12B illustrates a multiplayer session notification 1230 displayed in response to the head-wearable device 110 detecting and/or scanning the indicator 1220, in accordance with some embodiments. The multiplayer session notification 1230 indicates to the user 101 that the user 101 is playing a second video game with the other user 1201. FIG. 12C illustrates the user 101 interacting with a second video game menu 1250 of the second video game application, in accordance with some embodiments. In some embodiments, the second video game menu 1250 includes an in-game chat, a brightness setting, a game-switch setting, an exit game option, and/or information regarding the other user 1201.

One example technique for employing the concepts described herein in the context of an XR system will now be described. A first wearer of a pair of XR glasses initiates an action requesting an XR game with another wearer of a different pair of XR glasses (the first wearer's XR glasses, or XR devices associated therewith such as a paired smartwatch and/or a paired handheld intermediary processing device (HIPD), detect a trigger condition that causes the same action). In response to that initiation of the action, a determination is made as to whether or not the first wearer and the other wearer are within a colocation threshold distance of one another (e.g., within such a distance so that a camera of the first wearer's XR glasses detects the other wearer). If the determination is a positive one, then an XR game session is started between the two users and each user plays the game while viewing the counterpart user in pass-through (a physical view of the counterpart user). If the determination is a negative one, then an avatar representation is caused to be presented such that the XR game session is started between the two users and each of the users plays the game while viewing the counterpart user as an avatar representation, as illustrated in FIGS. 11H-11I.

Figure 13A:
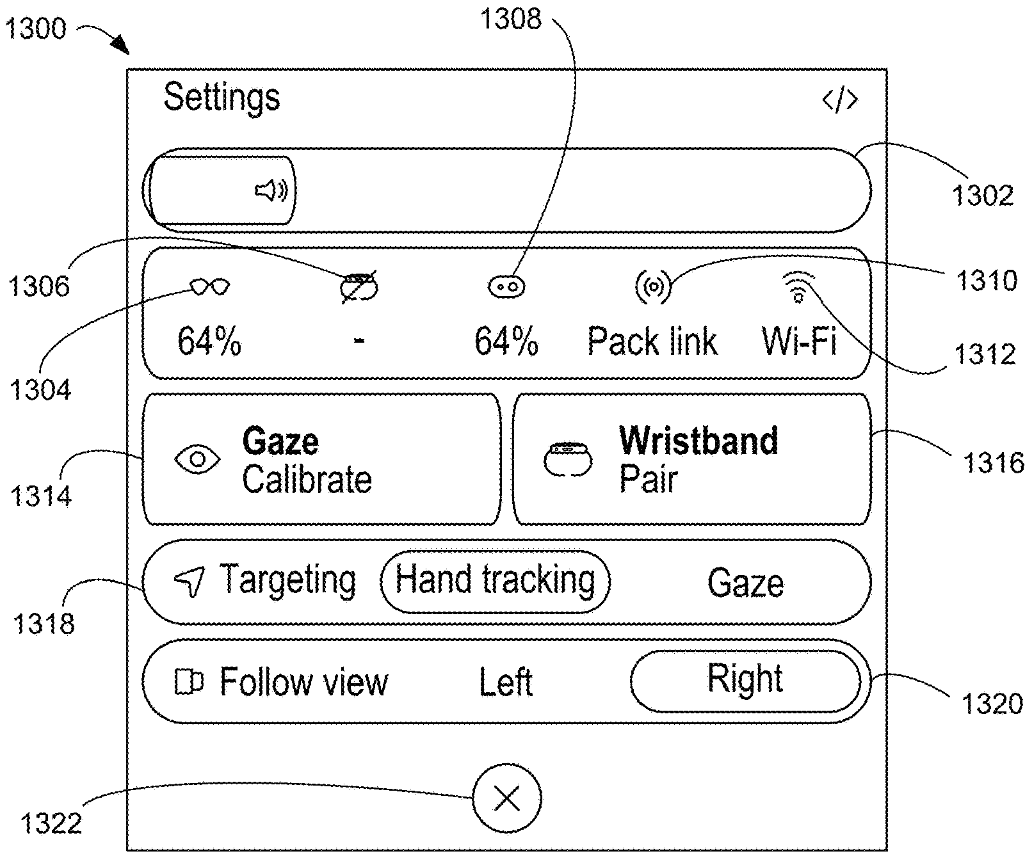
FIGS. 13A-13D illustrate an XR configuration UI for an XR system presented at a head-wearable device to configure the head-wearable device and/or to configure at least one communicatively coupled device, in accordance with some embodiments.

FIGS. 13A-13D illustrate an XR configuration UI for an XR system presented at the head-wearable device 110 to configure the head-wearable device 110 and/or to configure at least one communicatively coupled device, in accordance with some embodiments. FIG. 13A illustrates the XR configuration UI 1300 for the XR system, in accordance with some embodiments. In some embodiments, the XR configuration UI 1300 includes a volume slider 1302 which allows the user to adjust a volume level of a speaker of the head-wearable device 110. In some embodiments, the XR configuration UI 1300 includes a head-wearable device battery indicator 1304 that indicates a battery level of the head-wearable device 110, a wrist-wearable device battery indicator 1306 that indicates a battery level of a wrist-wearable device (e.g., a smartwatch) communicatively coupled to the head-wearable device 110, and a handheld intermediary processing device (HIPD) battery indicator 1308 that indicates a battery level of an HIPD communicatively coupled to the head-wearable device 110. In some embodiments, the XR configuration UI 1300 includes a HIPD connection indicator 1310 that indicates a connectivity level between the HIPD and the head-wearable device 110 and a WiFi connection indicator 1312 that indicates a connectivity level between a wireless network (e.g., a WiFi network and/or a mobile network) and the head-wearable device 110. In some embodiments, the XR configuration UI 1300 includes gaze calibration indicator 1314 that indicates a gaze detection status of a gaze tracking program of the head-wearable device 110. In some embodiments, the XR configuration UI 1300 includes a wrist-wearable device status indicator 1316 that indicates a status of the wrist-wearable device. In some embodiments, the XR configuration UI 1300 includes a targeting option selector 1318 that allows the user 101 to select between a hand-tracking option and a gaze-tracking option for selecting XR augments displayed at the head-wearable device 110. In some embodiments, the XR configuration UI 1300 includes a follow XR augment location selector 1320 that allows the user 110 to select between displaying the follow XR augment at a left-side portion of the display of the head-wearable device 110 and a right-side portion of the display of the head-wearable device 110. In some embodiments, the XR configuration UI 1300 includes an exit button 1322 to allow the user to exit the XR configuration UI.

Figure 13B:
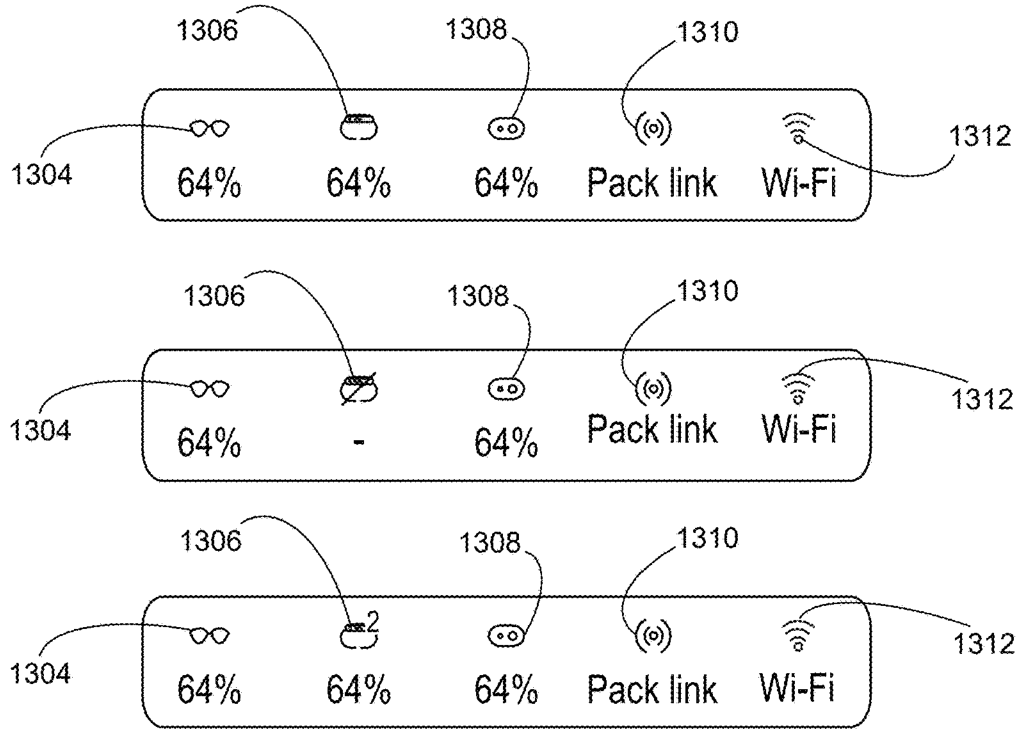

FIG. 13B illustrates the HIPD battery indicator 1304 displaying a plurality of statuses, in accordance with some embodiments. In some embodiments, the HIPD battery indicator 1306 displays a "on" status indicator that indicates that the HIPD is currently on in addition to the battery level of the HIPD and a number of wrist-wearable devices (e.g., one or two wrist-wearable devices) communicatively coupled to the head-wearable device 110. In some embodiments, the HIPD battery indicator 1308 displays a "disconnected" status indicator that indicates that the HIPD is currently disconnected from the head-wearable device. In some embodiments, the HIPD battery indicator 1308 displays a "sleep" status indicator that indicates that the HIPD is currently in a sleep mode in addition to the battery level of the HIPD.

Figure 13C:
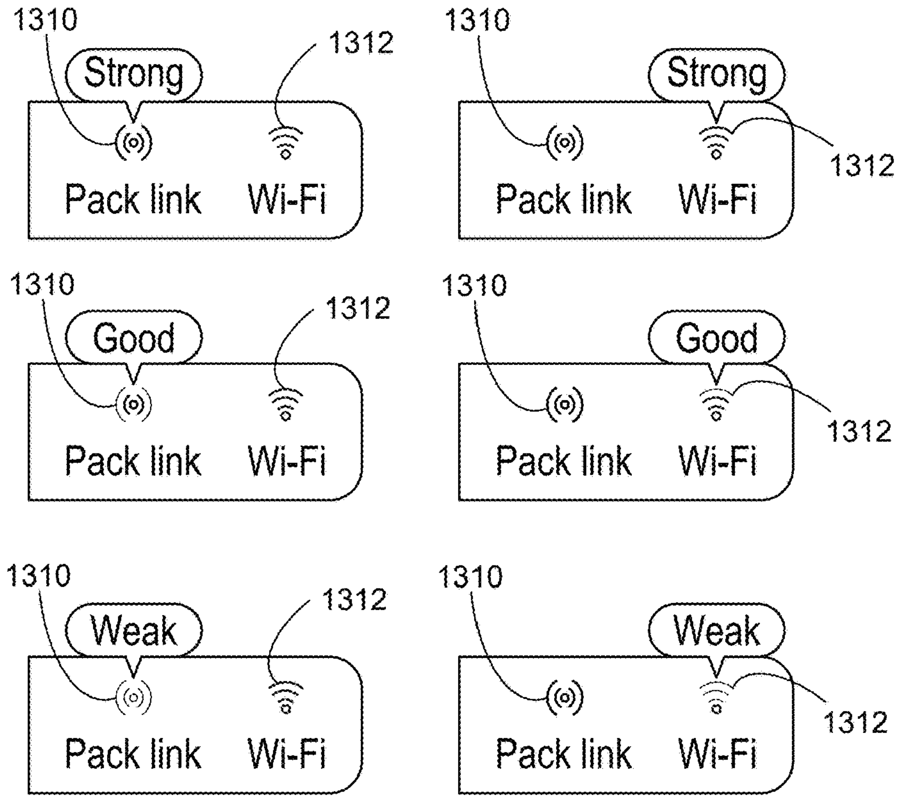

FIG. 13C illustrates the HIPD connection indicator 1310 indicating a plurality of connectivity levels and the WiFi connection indicator indicating a plurality of connectivity levels, in accordance with some embodiments. In some embodiments, the HIPD connection indicator 1310 displays a strong HIPD connection indicator that indicates that the connectivity level between the HIPD and the head-wearable device 110 is currently high. In some embodiments, the HIPD connection indicator 1310 displays a good HIPD connection indicator that indicates that the connectivity level between the HIPD and the head-wearable device 110 is currently medium. In some embodiments, the HIPD connection indicator 1310 displays a weak HIPD connection indicator that indicates that the connectivity level between the HIPD and the head-wearable device 110 is currently low. In some embodiments, the WiFi connection indicator displays a strong WiFi connection indicator 1312 that indicates that the connectivity level between a wireless network and the head-wearable device 110 is currently high. In some embodiments, the WiFi connection indicator 1312 displays a good WiFi connection indicator that indicates that the connectivity level between a wireless network and the head-wearable device 110 is currently medium. In some embodiments, the WiFi connection indicator 1312 displays a weak WiFi connection indicator that indicates that the connectivity level between a wireless network and the head-wearable device 110 is currently low.

Figure 13D:
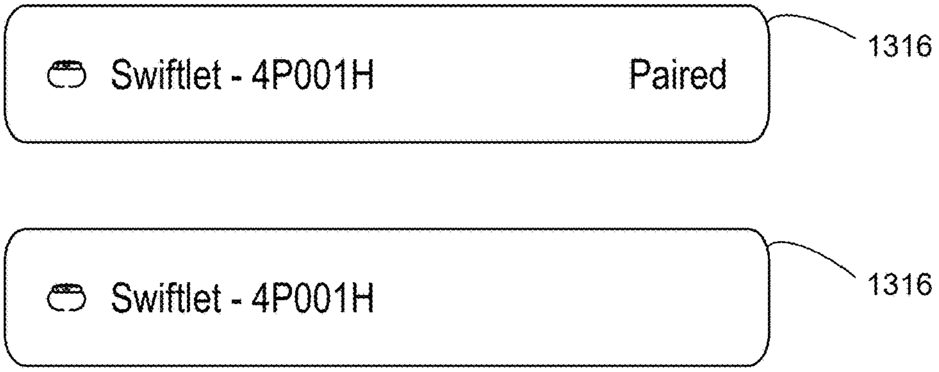

FIG. 13D illustrates the wrist-wearable device status indicator 1316 indicating a plurality of statuses of the wrist-wearable device, in accordance with some embodiments. In some embodiments, the wrist-wearable device status indicator 1316 displays a paired wrist-wearable device status that indicates to the user 101 that the wrist-wearable device is connected to the head-wearable device 110. In some embodiments, the wrist-wearable device status displays an unpaired wrist-wearable device status that indicates to the user 101 that the wrist-wearable device is not connected to the head-wearable device 110. In some embodiments, the user 101 can select the wrist-wearable device status to connect and/or disconnect the wrist-wearable device from the head-wearable device 110.

One example technique for employing the concepts described herein in the context of an XR system will now be described. XR glasses can present (or cause to be presented, such as via instructions from a paired electromyography (EMG) wristwatch and/or an HIPD) an XR configuration UI, in which selectable elements are presented for configuring options associated with the XR including calibrating eye-gaze tracking (or sensor data used as a proxy for head position), pairing of associated XR devices (e.g., an EMG control device and/or an HIPD), selecting of targeting input options (including via hand tracking or gaze), battery-status and level indicators for multiple different associated XR devices (e.g., the XR glasses, EMG control wristwatch, HIPD, or others), and a signal-strength indicator as to the connection strength between the XR glasses and the HIPD).

Figure 14B:
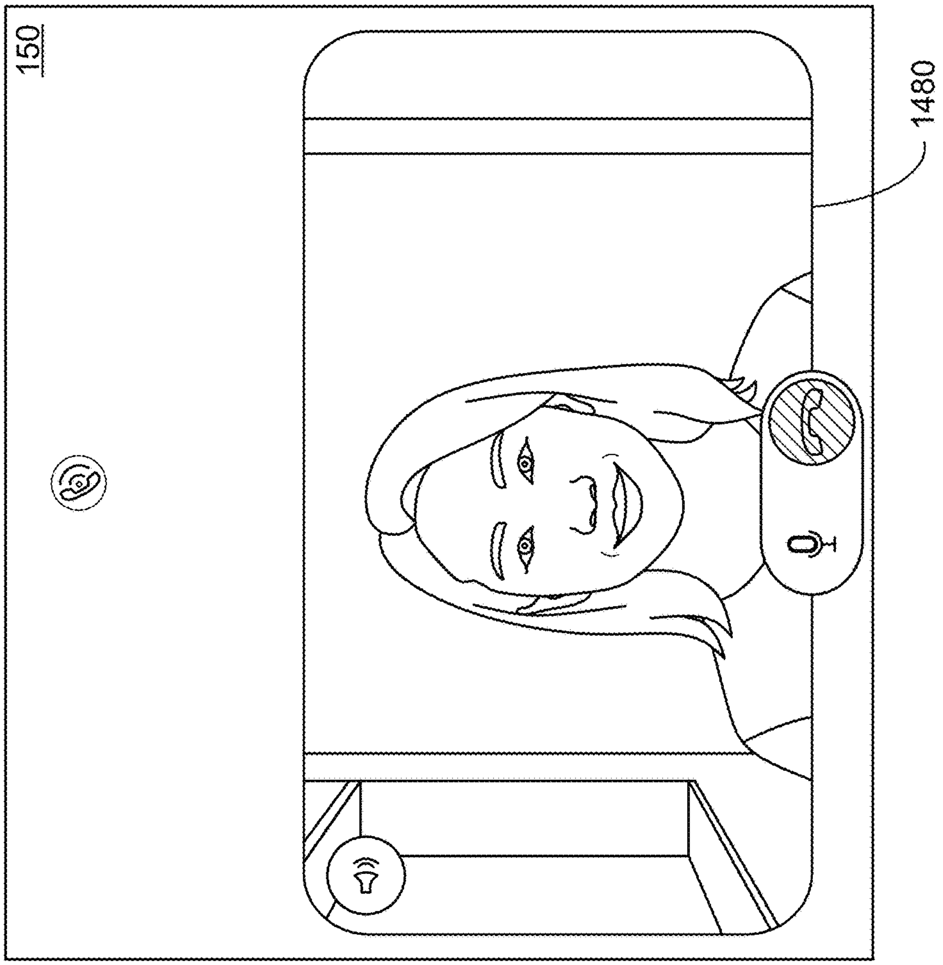
FIGS. 14A-14D illustrate an eleventh sequence of a user receiving incoming calls at a head-wearable device, in accordance with some embodiments.
Figure 14A:
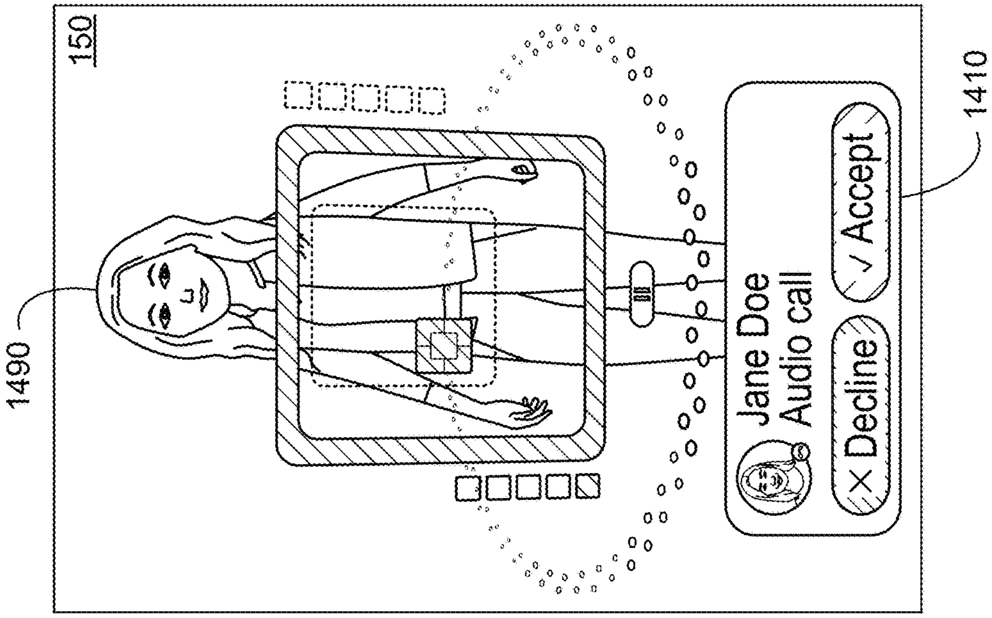

FIGS. 14A-14D illustrate an eleventh sequence of the user 101 receiving incoming calls at the head-wearable device 110, in accordance with some embodiments. In some embodiments, the incoming calls are video calls and/or voice calls. FIG. 14A illustrates the user 101 interacting with second exclusive XR content 1490 (e.g., exclusive XR content 190, such as exclusive XR content associated with a video game application) in the fifth UI state. In response to receiving a first incoming call, the head-wearable device 110 displays a first incoming call XR augment 1410 (e.g., the incoming call XR augment 1010), in accordance with some embodiments. The first incoming call XR augment 1410 includes a first option to decline the first incoming call and a second option to accept the first incoming call. In accordance with a determination that the user 101 declines the first incoming call (e.g., by selecting the first option to decline the first incoming call), the head-wearable device 110 ceases displaying the first incoming call XR augment 1410 and continues displaying the second exclusive XR content 1490. In some embodiments, the head-wearable device 110 continues to display the second exclusive XR content 1490 while presenting the first incoming call XR augment 1410. FIG. 14B illustrates the head-wearable device 110, in response to the user 101 selecting the second option to accept the first incoming call, switching from the fifth UI state to the fourth UI state and displaying a first call application XR augment 1480 associated with the first incoming call, in accordance with some embodiments. In response to the head-wearable device 110 switching from the fifth UI state to the fourth UI state, the head-wearable device 110 ceases displaying the second exclusive XR content 1490.

Figure 14C:
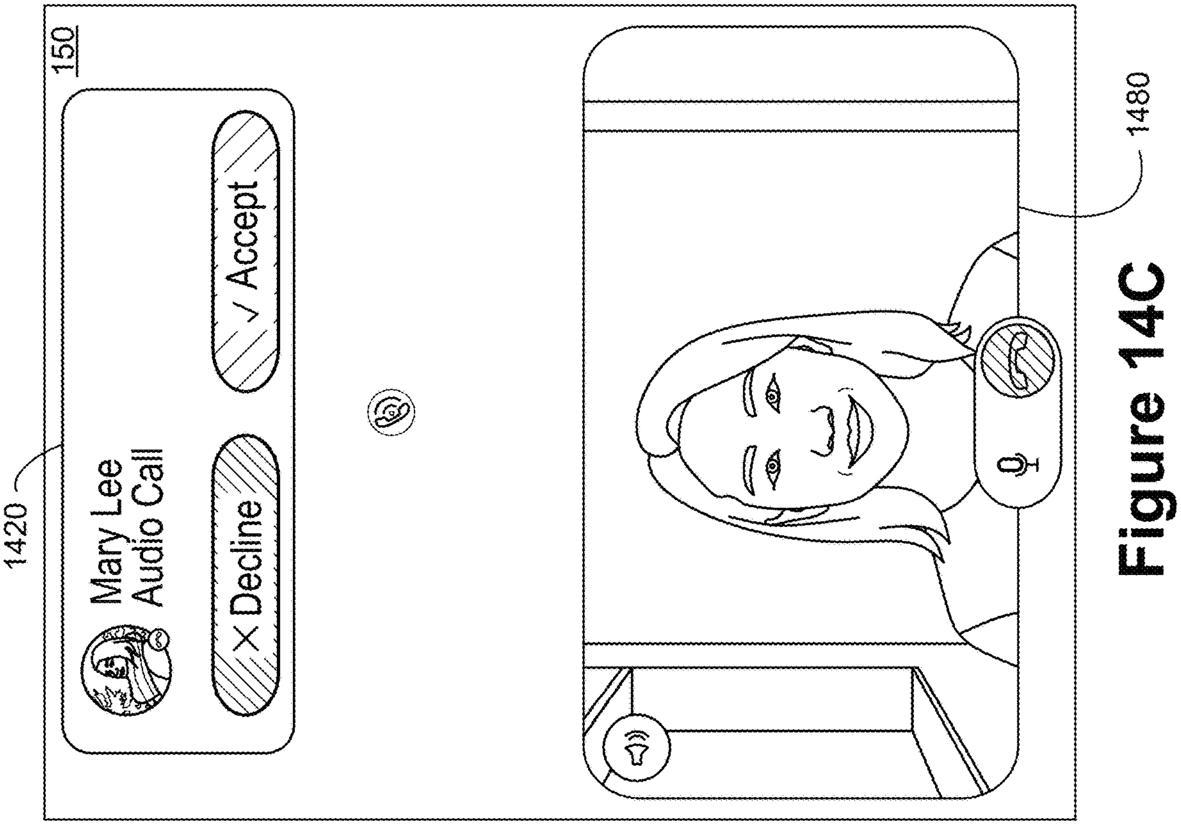
Figure 14D:
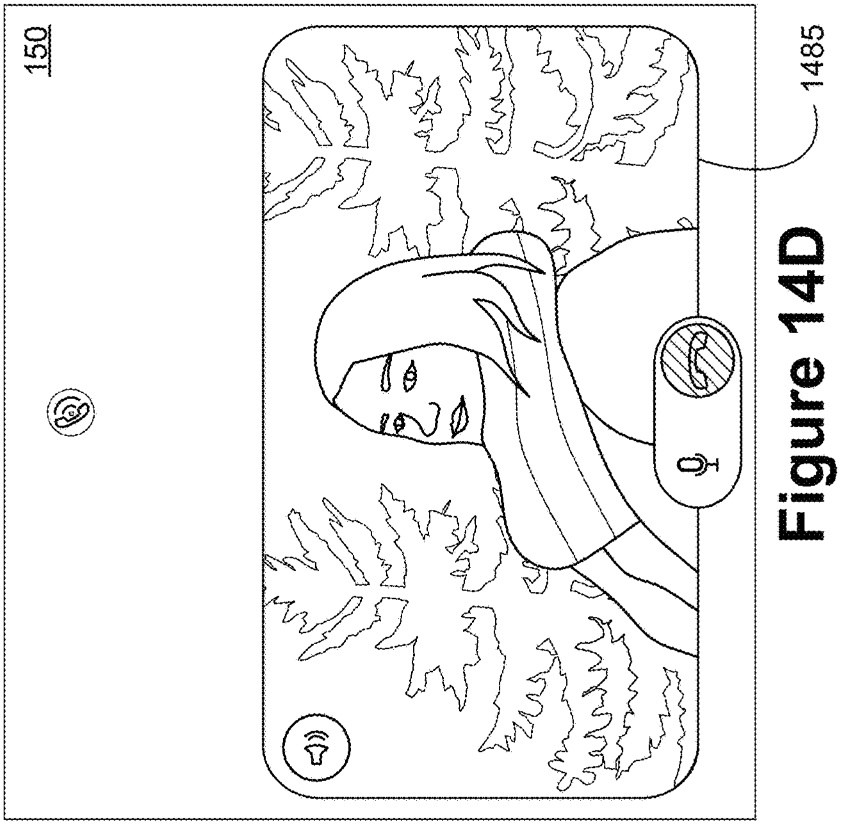

FIG. 14C illustrates the user 101 interacting with the first call application XR augment 1410 associated with the first incoming call in the fourth UI state and receiving a second incoming call, in accordance with some embodiments. In response to receiving the second incoming call, the head-wearable device 110 presents a second incoming call XR augment 1410. The second incoming call XR augment 1420 includes a first option to decline the second incoming call and a second option to accept the second incoming call. FIG. 14D illustrates the head-wearable device 110, in response to the user 101 selecting the second option to accept the second incoming call, switching from displaying the first call application XR augment 1410 associated with the first incoming call to displaying a second call application XR augment 1485 associated with the second incoming call, in accordance with some embodiments. In some embodiments, in response to the user 101 selecting the second option to accept the second incoming call, the first incoming call is ended. In some embodiments, in response to the user 101 selecting the second option to accept the second incoming call, the first incoming call is put on hold.

Figure 15A:
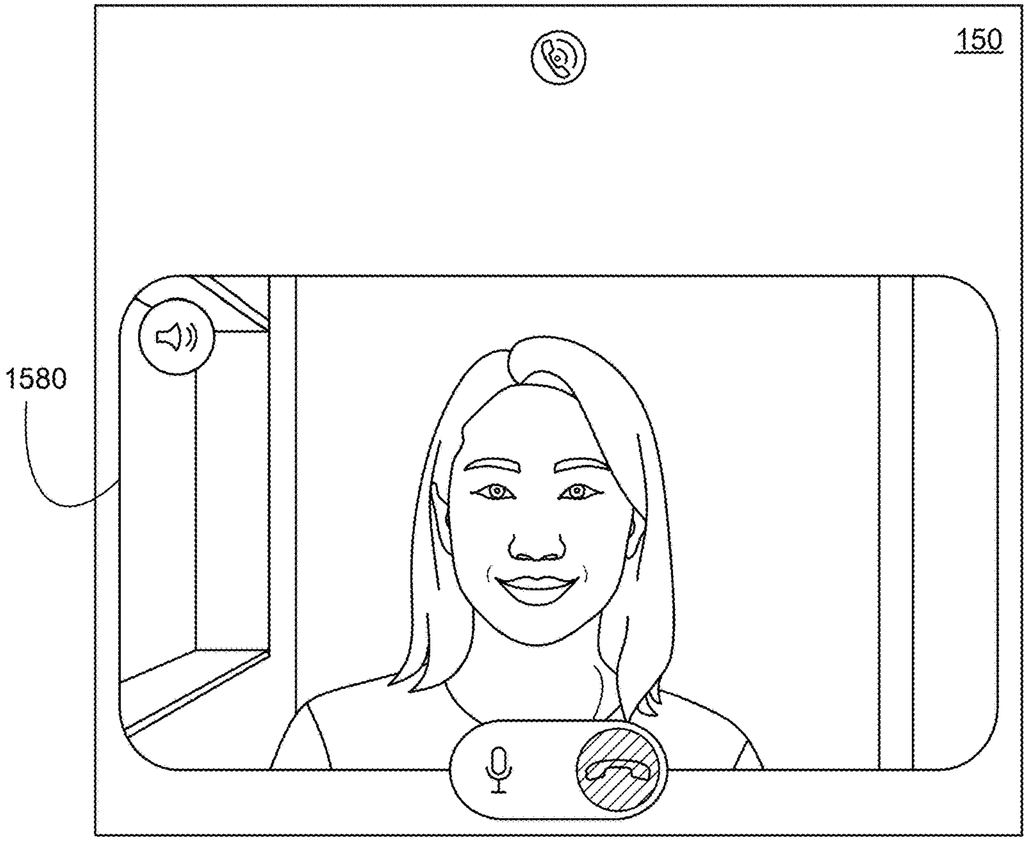
FIGS. 15A-15C illustrate a twelfth sequence of a user exiting a call at a head-wearable device, in accordance with some embodiments.
Figure 15B:
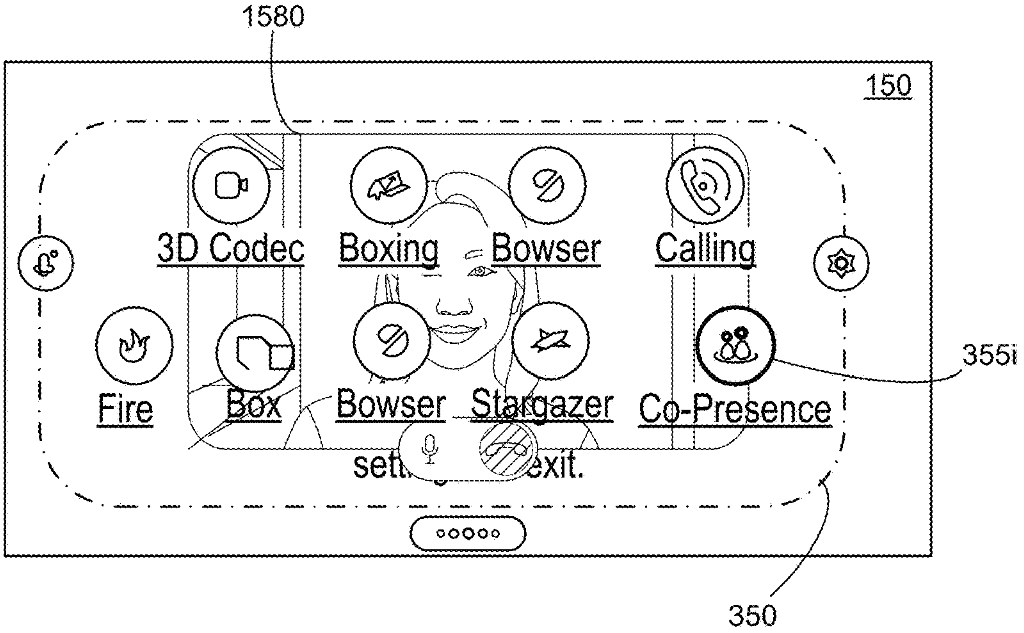
Figure 15C:
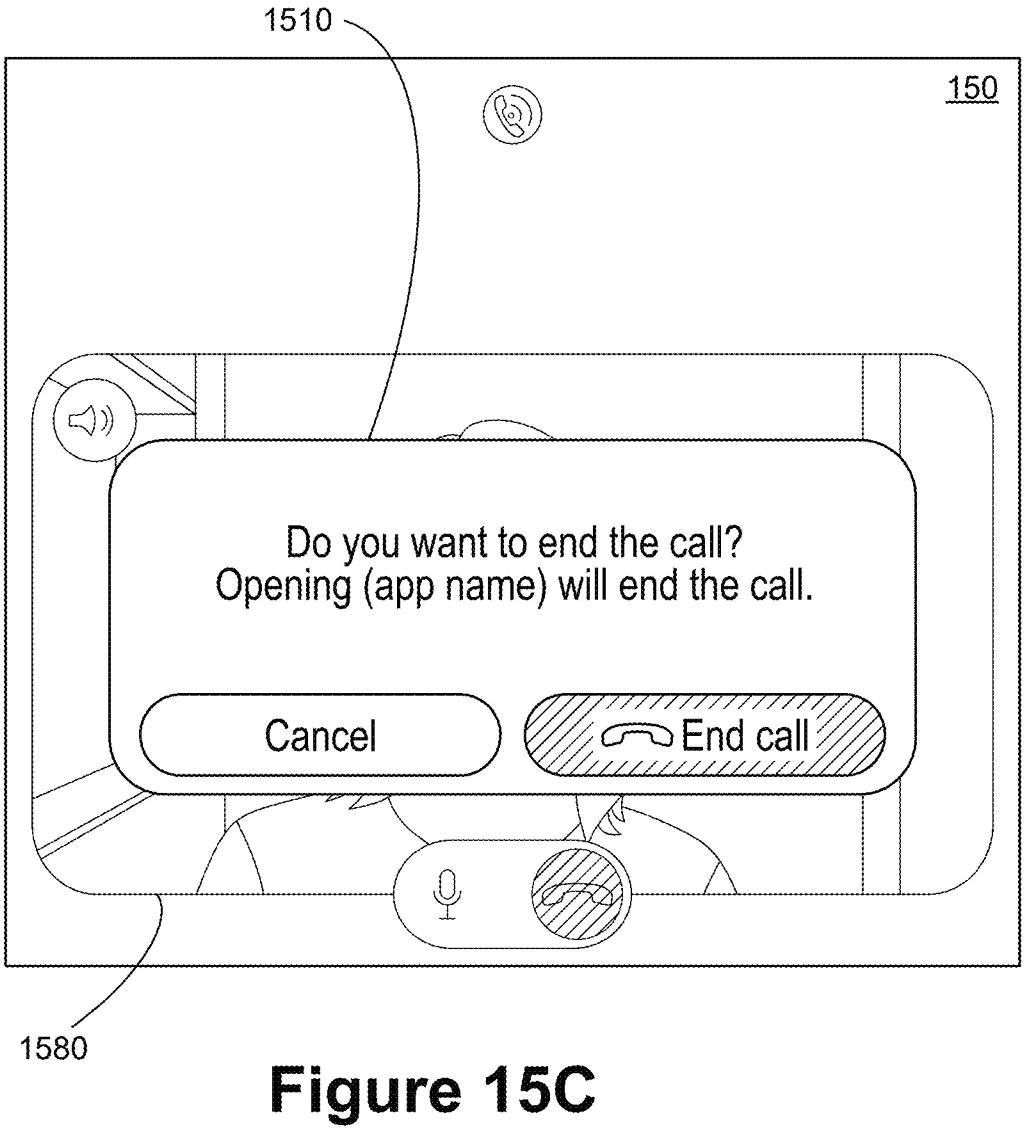

FIGS. 15A-15C illustrate a twelfth sequence of the user 101 exiting a call at the head-wearable device 110, in accordance with some embodiments. FIG. 15A the user 101 interacting with a third call application XR augment 1580 associated with a third call in the fourth UI state, in accordance with some embodiments. FIG. 15B illustrates the head-wearable device 110 presenting the launcher menu 350, in accordance with some embodiments. In some embodiments, the head-wearable device 110 presents the launcher menu 350 in response to the user 101 performing menu gesture 320 while interacting with the third call application XR augment 1580. In some embodiments, while the launcher menu 350 is displayed, the third call continues in the background of the field-of-view 150 (e.g., the third call application XR augment 1580 is displayed to appear behind the launcher menu 350), as illustrated in FIG. 15B. The launcher menu 350 includes a plurality of application icons 355*a*-355*i* including an eighth application icon 355*i* associated with an eighth application that includes eighth exclusive XR content. FIG. 15C illustrates the head-wearable device 110 presenting a call exit dialogue 1510 in response to the user 101 selecting the eighth application icon 355*i* including the eighth exclusive XR content, in accordance with some embodiments. When the user 101 switches from the fourth UI state including the third call application XR augment 1580 associated with the third call to the fifth UI state including the eighth exclusive XR content, the third call is ended. In some embodiments, in response to the user 101 selecting the eighth application icon 355*i*, the head-wearable 110 displays a switching XR augment 1510 that includes a first option to not switch to the eighth exclusive XR content and continue the third call and a second option to switch to the eighth exclusive XR content and end the third call, as illustrated in FIG. 15C.

Figure 16A:
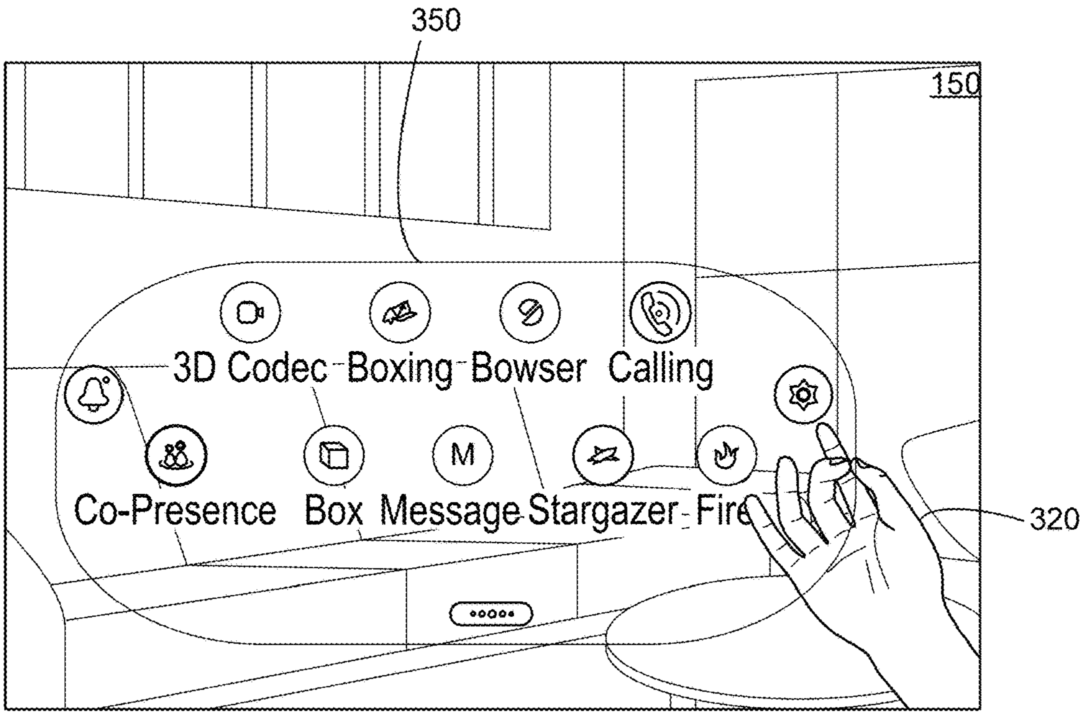
FIGS. 16A-16K illustrate a thirteenth sequence of a user performing a second call at a head-wearable device, in accordance with some embodiments.
Figure 16B:
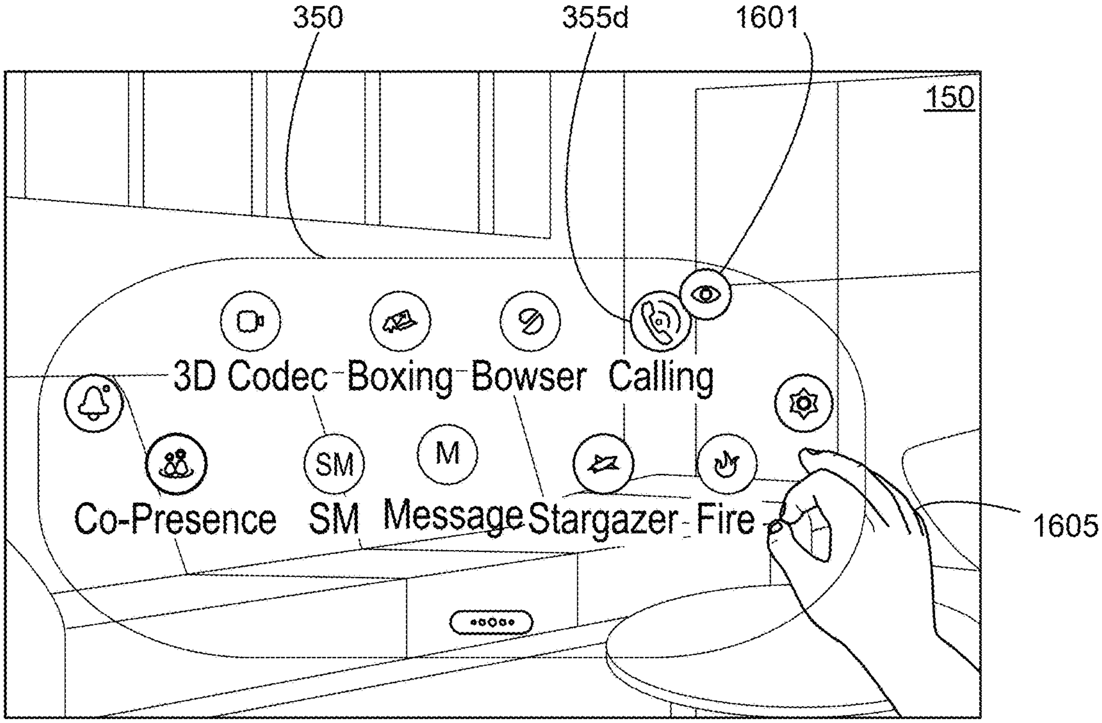

FIGS. 16A-16K illustrate a thirteenth sequence of the user 101 performing a second video call (and/or a voice call in accordance with some embodiments) at the head-wearable device 110, in accordance with some embodiments. FIG. 16A illustrates the user 101 interacting with the launcher menu 350 in the fourth UI state displayed at the head-wearable device 110, in accordance with some embodiments. In some embodiments, the head-wearable device 110 displays the launcher menu 350 in response to the user 101 performing the menu gesture 320. The launcher menu 350 includes a plurality of application icons 355*a*-355*i* including a fourth application icon 355*d* associated with a calling application (e.g., an audio calling application and/or a video calling application). FIG. 16B illustrates the user 101 selecting the fourth application icon 355*d*, associated with the calling application from the launcher menu 350, in accordance with some embodiments. In some embodiments, the user 101 selects the fourth application icon 355*d* by performing another select gesture. For example, as illustrated in FIG. 16B, the other select gesture includes the user 101 targeting the fourth application icon 355*d* with a gaze of the user 101 (e.g., the user 101 looks at the fourth application icon 355*d*), as indicated by a gaze indicator 1601, and performing another select hand gesture 1605 (e.g., an index finger pinch gesture). The head-wearable device 110 displays the gaze indicator 1601 to indicate to the user 101 a gaze location, in the field-of-view 150, that the user 101 is targeting with the gaze.

Figure 16C:
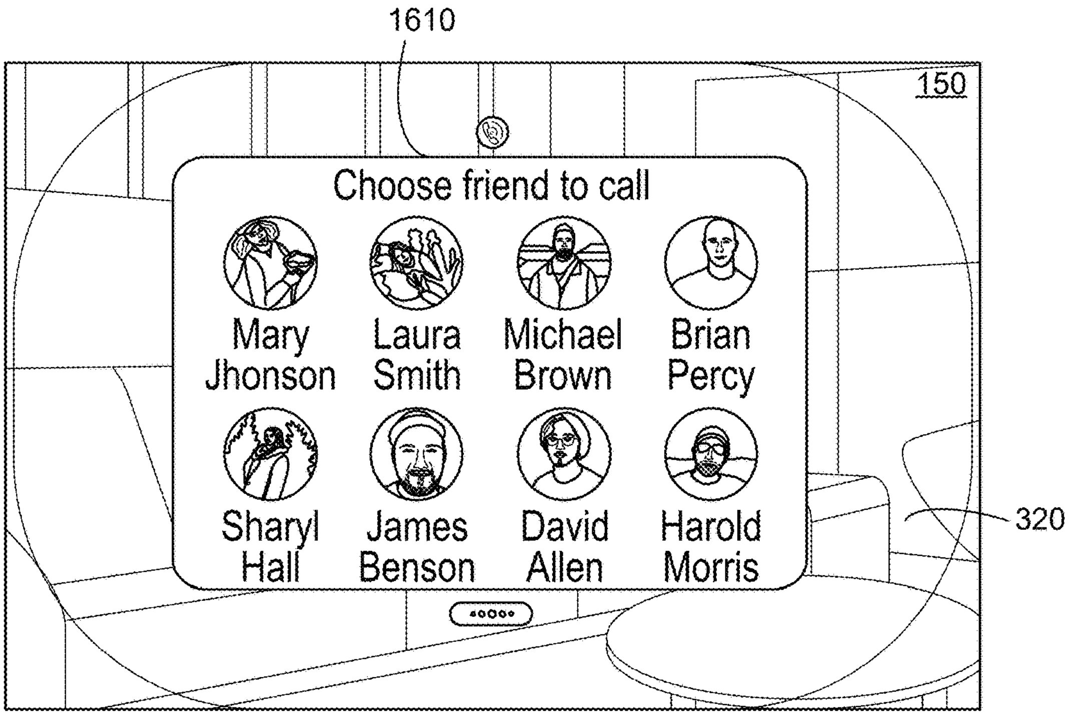
Figure 16D:
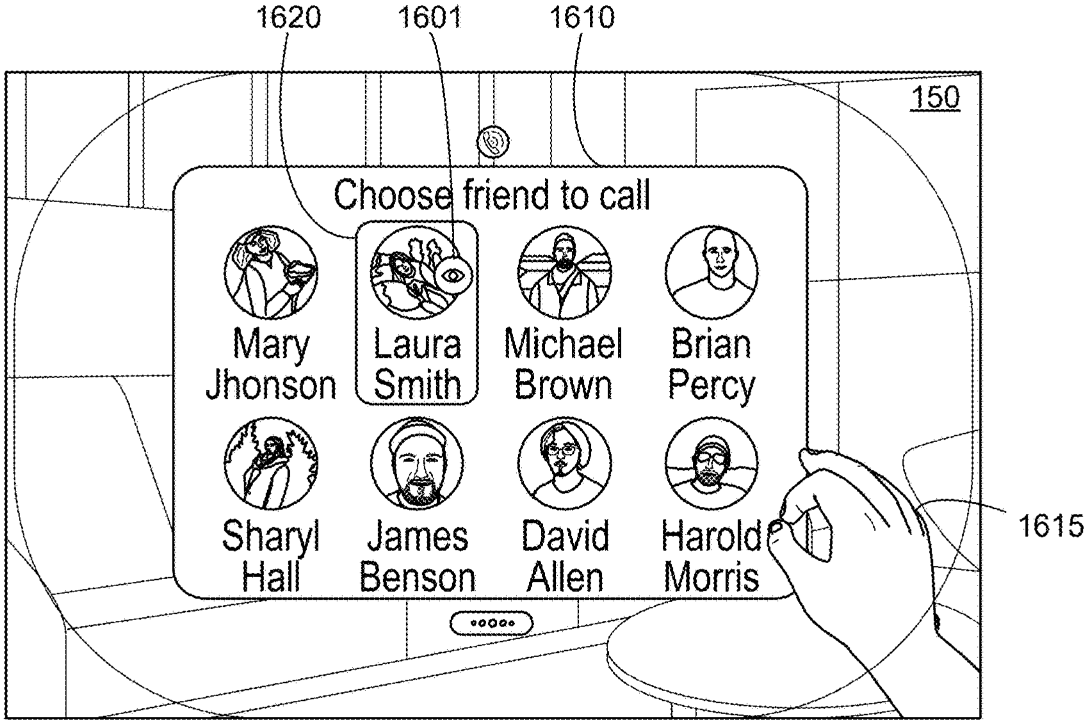

FIG. 16C illustrates the head-wearable device 110 displaying, in response to the user 101 selecting the fourth application icon 355*d*, a contact list XR augment 1610 associated with the user 101 and/or the calling application, in accordance with some embodiments. The contact list XR includes a plurality of contacts that the user 101 may select to initiate a call with a respective contact. FIG. 16D illustrates the user 101 selecting a second contact 1620 associated with a second user, from the contact list XR augment 1610, to call via the calling application, in accordance with some embodiments. The user 101 selecting the second contact 1620 from the contact list XR augment 1610 causes the calling application to call the second user. In some embodiments, the user 101 selects the second contact 1620 by performing an additional select gesture. For example, as illustrated in FIG. 16D, the additional select gesture includes the user 101 targeting the second contact 1620 with an additional gaze of the user 101 (e.g., the user 101 looks at the second contact 1620), as indicated by the gaze indicator 1601, and performing an additional select hand gesture 1615 (e.g., an index finger pinch gesture).

Figure 16E:
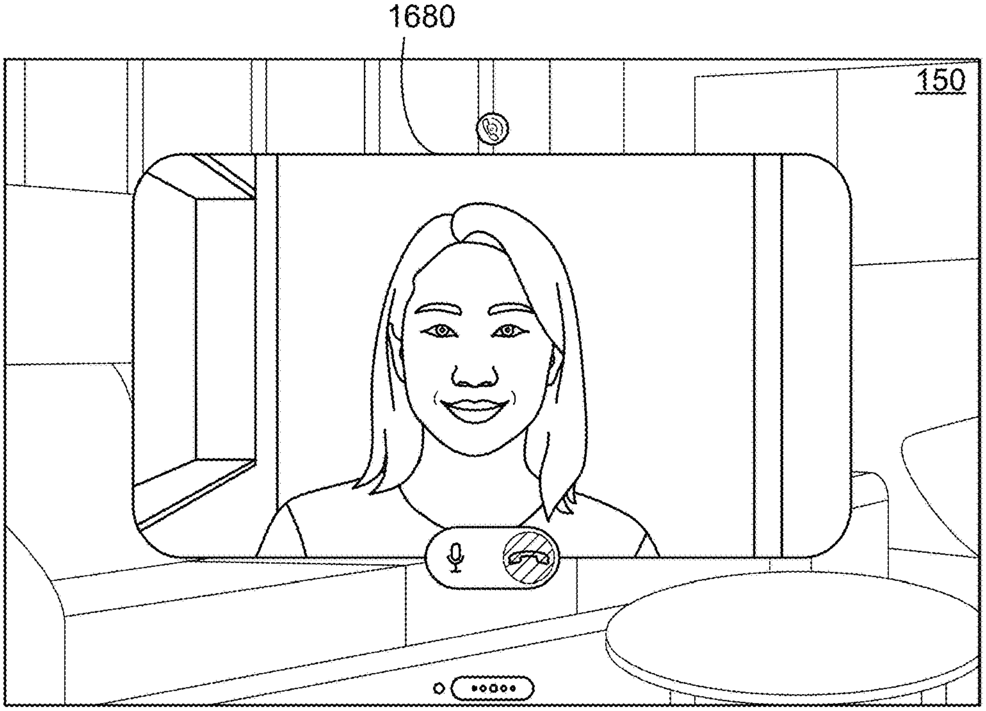
Figure 16F:
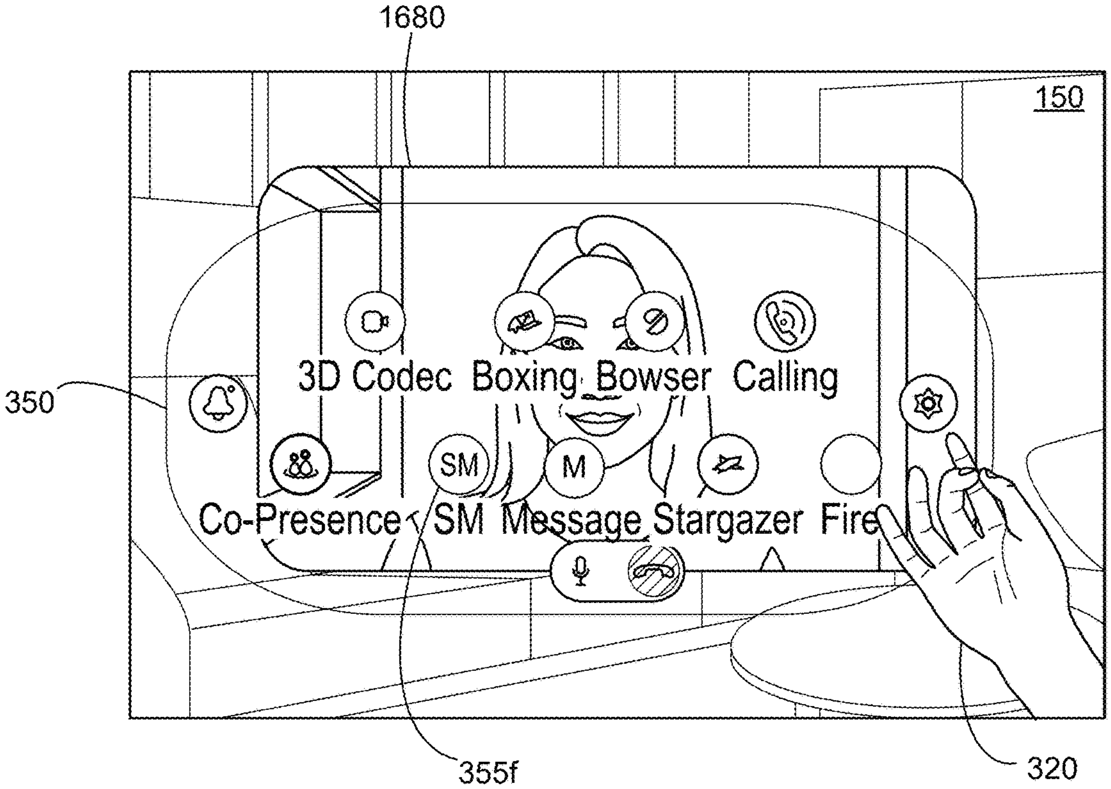

FIG. 16E illustrates the head-wearable device 110 displaying a second video call application XR augment 1680 associated with the second video call at the first location in the field-of-view 150, in accordance with some embodiments. FIG. 16F illustrates the head-wearable device 110 displaying the launcher menu 350 by performing the menu gesture 320 (e.g., the middle finger double-pinch gesture), in accordance with some embodiments. In some embodiments, while the launcher menu 350 is displayed, the incoming video call continues in the background (e.g., the second video call application XR augment 1680 is displayed to appear behind the launcher menu 350 in the field-of-view 150), as illustrated in FIG. 16F. The launcher menu 350 includes the plurality of application icons 355*a*-355*i* which further includes a sixth application icon 355*f* associated with a sixth application (e.g., a social media application).

Figure 16G:
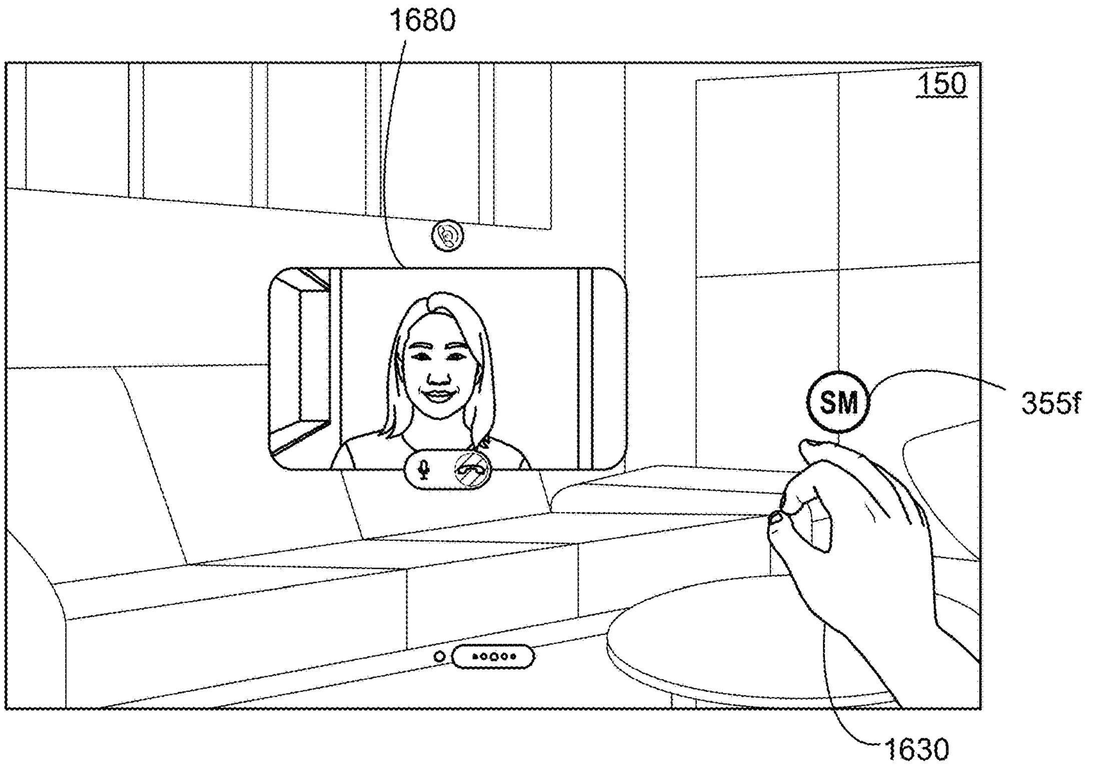
Figure 16H:
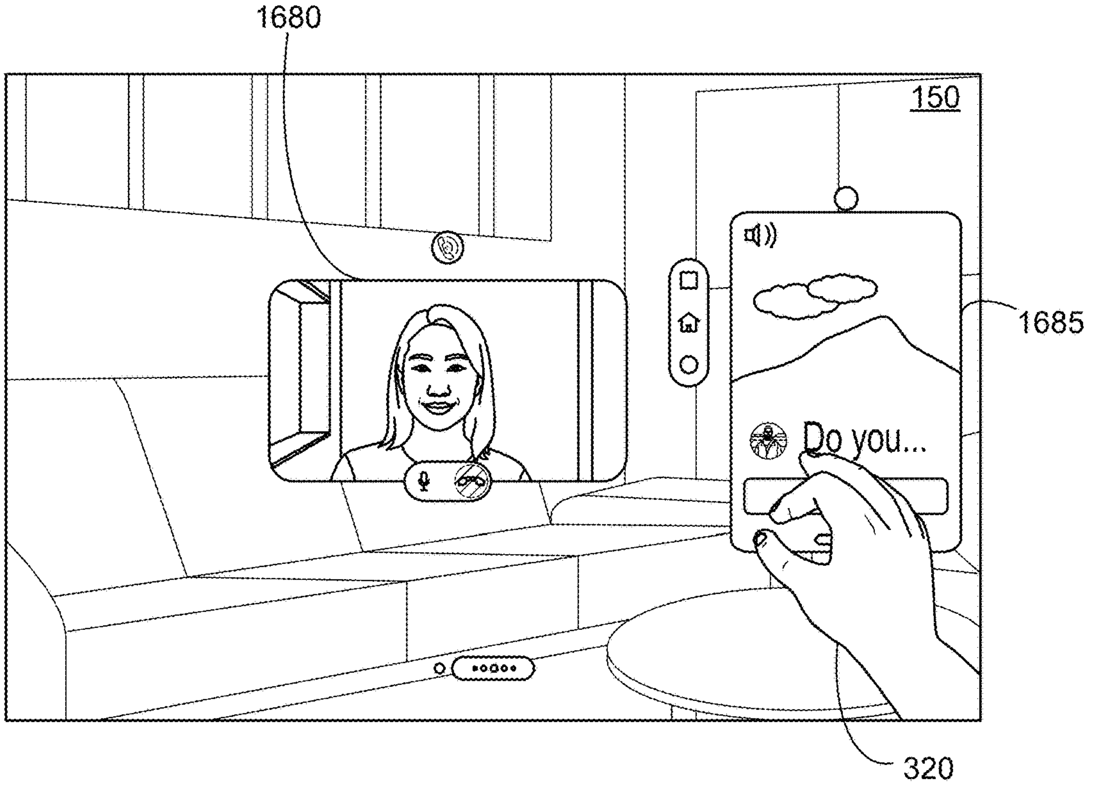

FIG. 16G illustrates the user 101 selecting a sixth application icon 355*f* associated with the sixth application from the launcher menu 350 by performing a sixth drag-and-drop gesture 1630 on the sixth application icon 355*f*, in accordance with some embodiments. The sixth drag-and-drop gesture 1630 includes the user 101 performing an index finger pinch gesture to select the sixth application icon 355*f*, dragging the sixth application icon 355*f* to the second location in the field-of-view 150, and releasing the index finger pinch gesture. While the user 101 is performing the third drag-and-drop gesture 1630, the second video call application XR augment 1680 remains at the first location, as illustrated in FIG. 16G. FIG. 16H illustrates a sixth application XR augment 1685 associated with the sixth application displayed at the second location in response to the user 101 completing the sixth drag-and-drop gesture 1630 (e.g., the user 101 releasing the index finger pinch gesture), in accordance with some embodiments. In response to the user 101 completing the sixth drag-and-drop gesture 1630, the head-wearable device 110 simultaneously presents the second video call application XR augment 1680 at the first location and the sixth application XR augment 1685 at the second location, as illustrated in FIG. 16H.

Figure 16I:
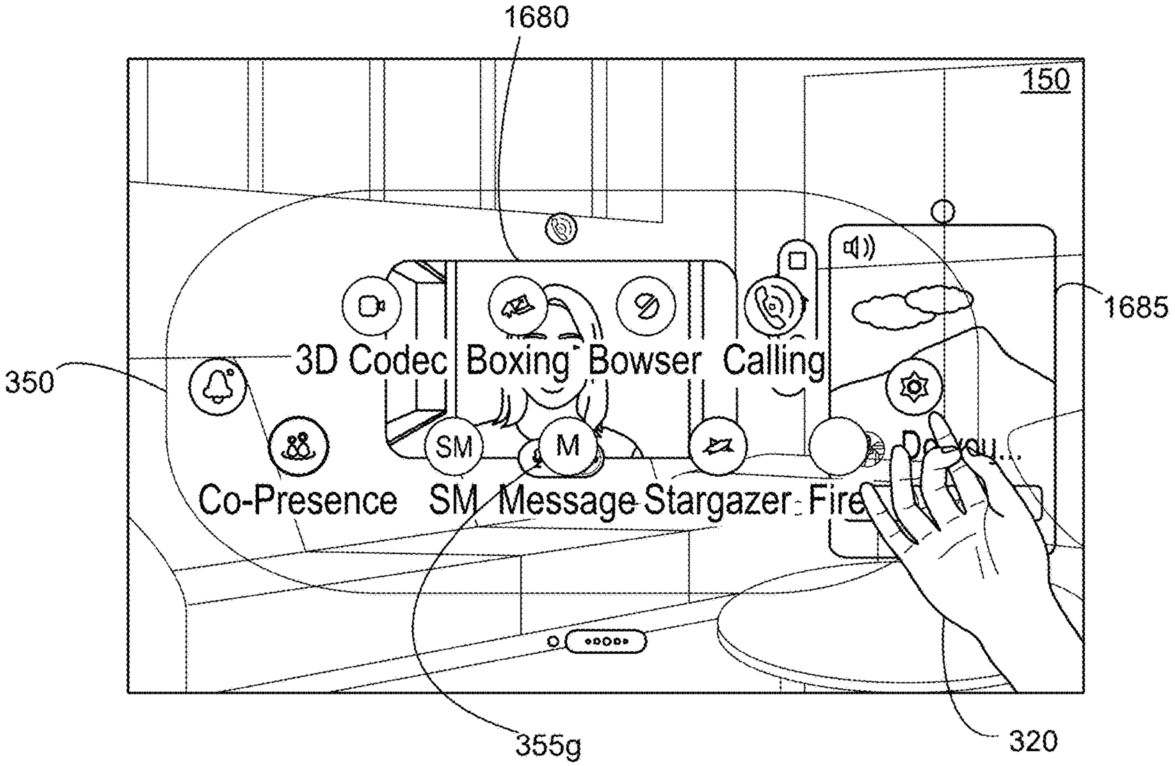
Figure 16J:
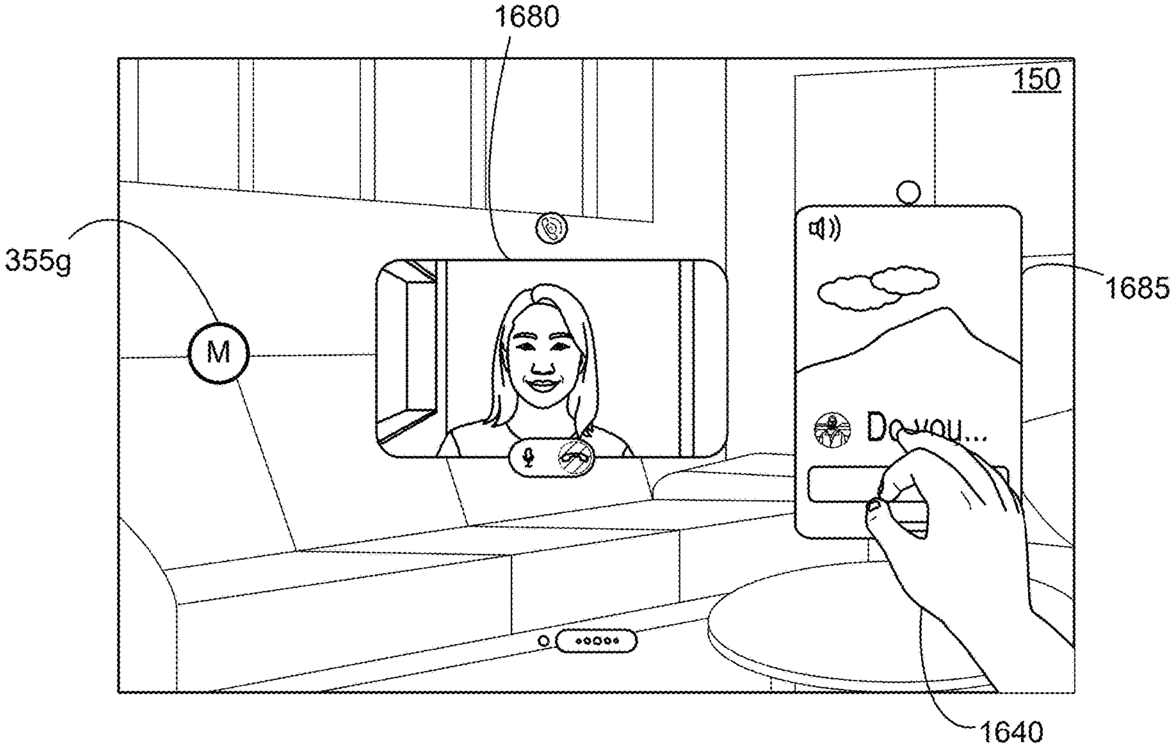
Figure 16K:
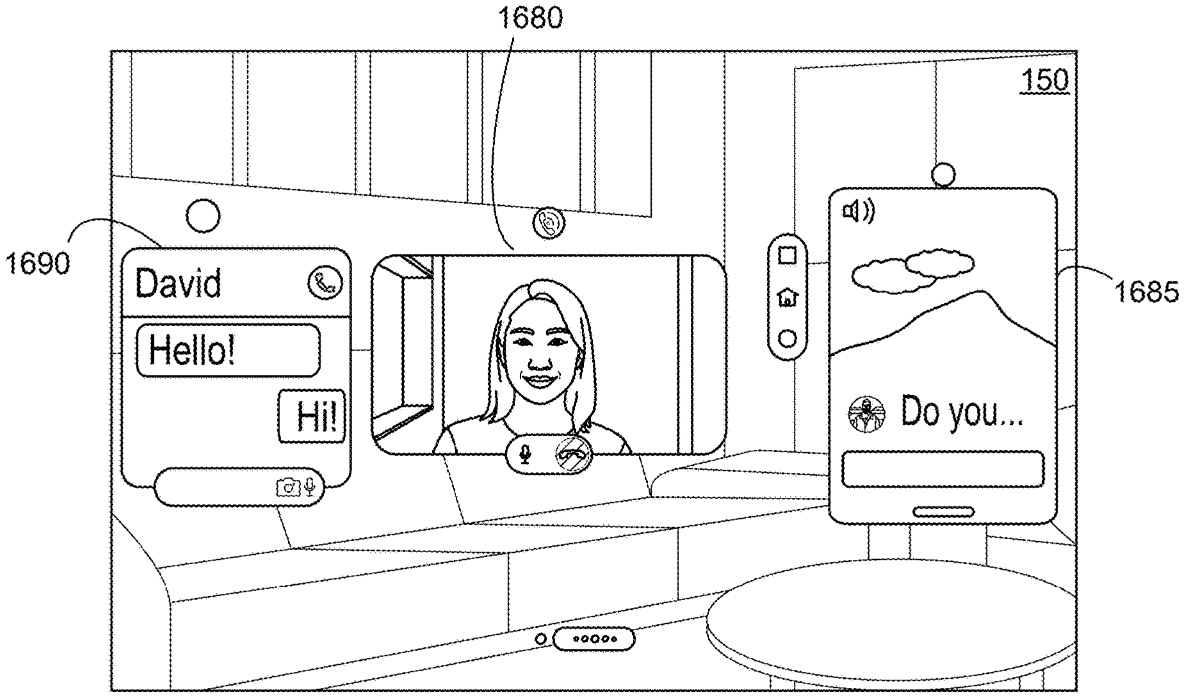

FIG. 16I illustrates the user 101 performing the menu gesture 320 to cause the head-wearable device 110 to present the launcher menu 350 again, in accordance with some embodiments. The launcher menu 350 includes the plurality of application icons 355*a*-355*i* which further includes a seventh application icon 355*g* associated with a seventh application (e.g., a messaging application). FIG. 16J illustrates the user 101 performing a seventh drag-and-drop gesture 1640 on the seventh application icon 355*g* associated with the seventh application, in accordance with some embodiments. The seventh drag-and-drop gesture 1640 includes the user 101 performing an index finger pinch gesture to select the seventh application icon 355*g*, dragging the seventh application icon 355*g* to the third location in the field-of-view 150, and releasing the index finger pinch gesture. While the user 101 is performing the seventh drag-and-drop gesture 1640, the second video call application XR augment 1680 remains at the first location and the sixth application XR augment 1685 remains at the second location, as illustrated in FIG. 16J. FIG. 16K illustrates a seventh application XR augment 1690 associated with the seventh application displayed at the third location in response to the user 101 completing the seventh drag-and-drop gesture 1640 (e.g., the user 101 releasing the index finger pinch gesture), in accordance with some embodiments. In response to the user 101 completing the seventh drag-and-drop gesture 1640, the head-wearable device 110 simultaneously presents the second video call application XR augment 1680 at the first location, the sixth application XR augment 1685 at the second location, and the seventh application XR augment 1690 at the third location, as illustrated in FIG. 16H.

Figure 17A:
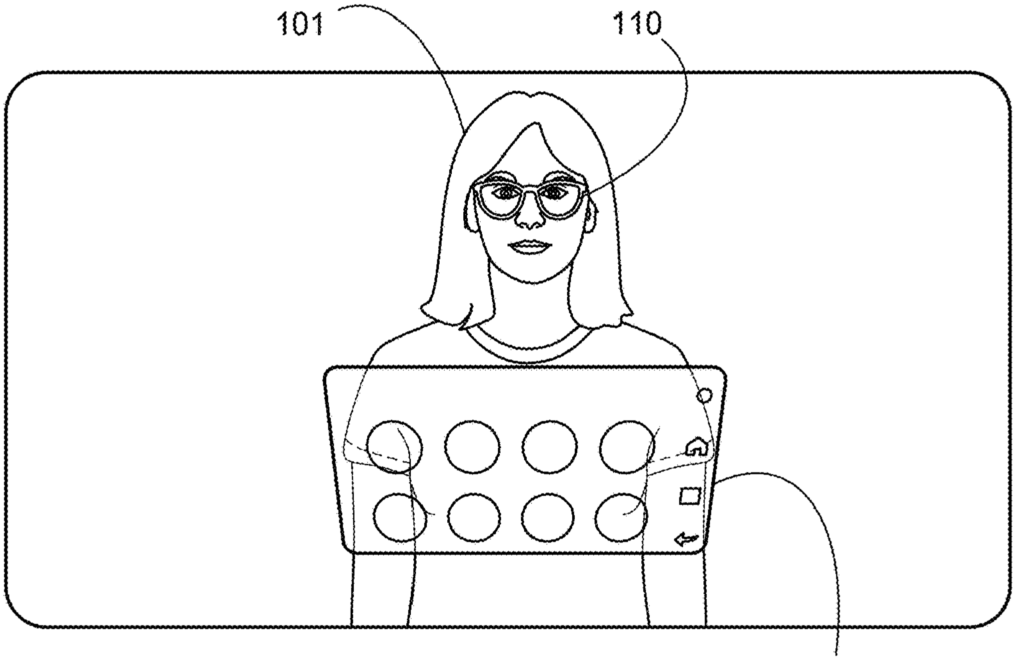
FIGS. 17A-17E illustrate a user interacting with an XR environment displayed at a display of a head-wearable device, in accordance with some embodiments.
Figure 17B:
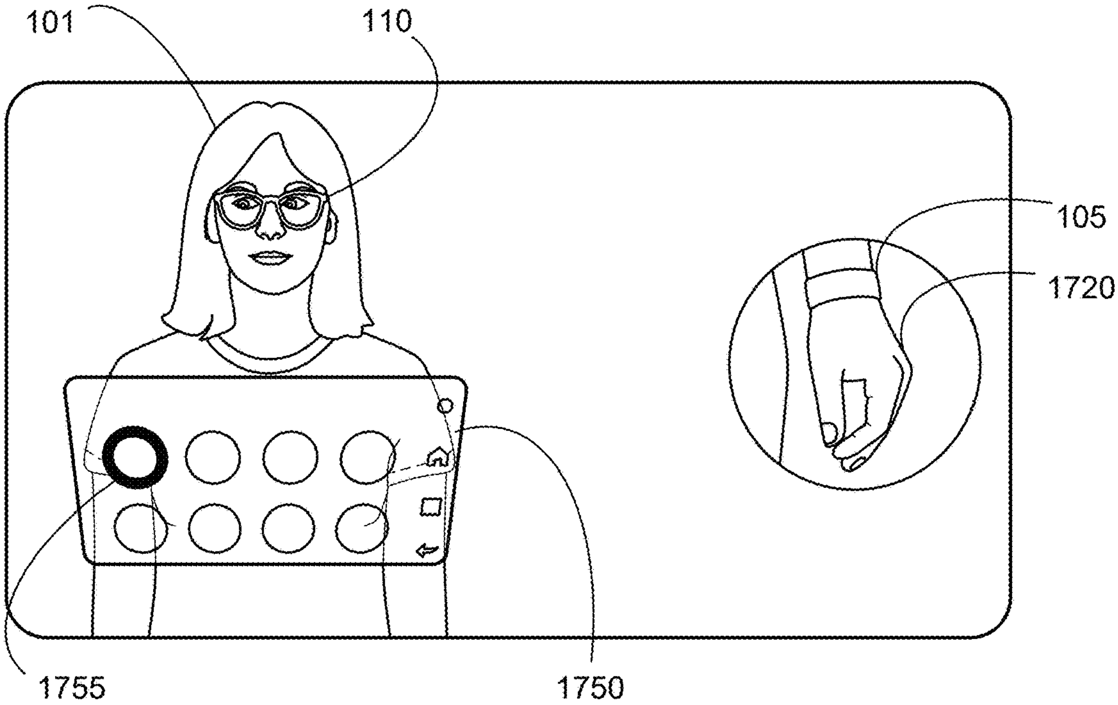

FIGS. 17A-17E illustrate the user 101 interacting with an interactable XR augment 1750 (e.g., a menu) in an XR environment displayed at the one or more displays of the head-wearable device 110, in accordance with some embodiments. FIG. 17A illustrates the user 101 targeting in the XR environment using the gaze of the user 101 (e.g., a gaze location acts as a cursor for the user 101 to select objects and/or perform actions in the XR environment), in accordance with some embodiments. In some embodiments, the user 101 targets in the XR environment by pointing in the XR environment (e.g., a pointing gesture, detected by the one or more cameras of the head-wearable device 110 and/or a neuromuscular sensor of the wrist-wearable device 105 communicatively coupled to the head-wearable device 110, acts as a cursor for the user 101 to select objects and/or perform actions in the XR environment). FIG. 17B illustrates the user 101 selecting a first XR object 1755 of the interactable XR augment 1750 by targeting the XR object 1755 with the gaze of the user and performing an additional select gesture 1720 (e.g., an index finger pinch gesture), in accordance with some embodiments. In some embodiments, the additional select gesture 1720 is detected by the neuromuscular sensor of e wrist-wearable device 105 communicatively coupled to the head-wearable device 110 (e.g., an electromyography (EMG) sensor of a smartwatch). In some embodiments, the user 101 performs an additional drag-and-drop gesture to move the XR object 1755 in the XR environment. For example, the user 101 targets the XR object 1755 by looking at the XR object 1755, selects the XR object 1755 by performing the additional select gesture 7120, moves the XR object 1755 by moving their hand while holding the additional select gesture 1720, and releasing the XR object 1755 in place by releasing the additional select gesture 1720. In some embodiments, the user 101 scrolls at the interactable XR augment 1750 (e.g., a social media feed XR augment, a web article XR augment, etc.) by performing the additional select gesture 1720 and moving their arm up (e.g., to scroll up) and/or moving their arm down (e.g., to scroll down).

Figure 17C:
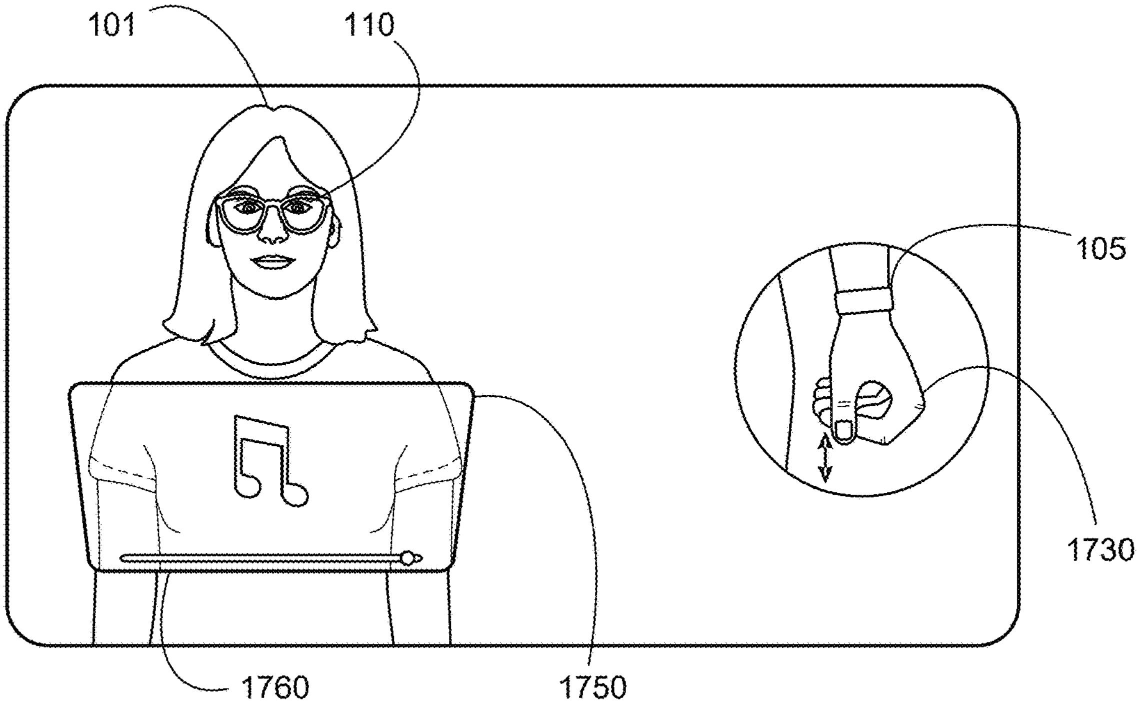
Figure 17D:
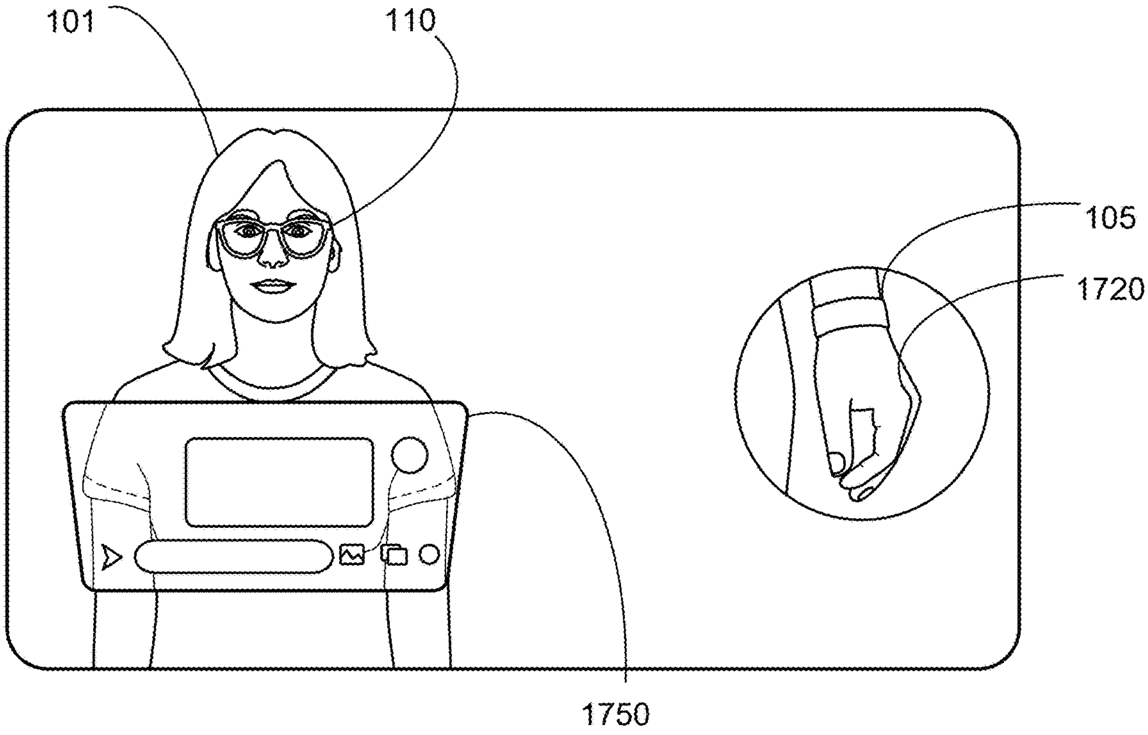
Figure 17E:
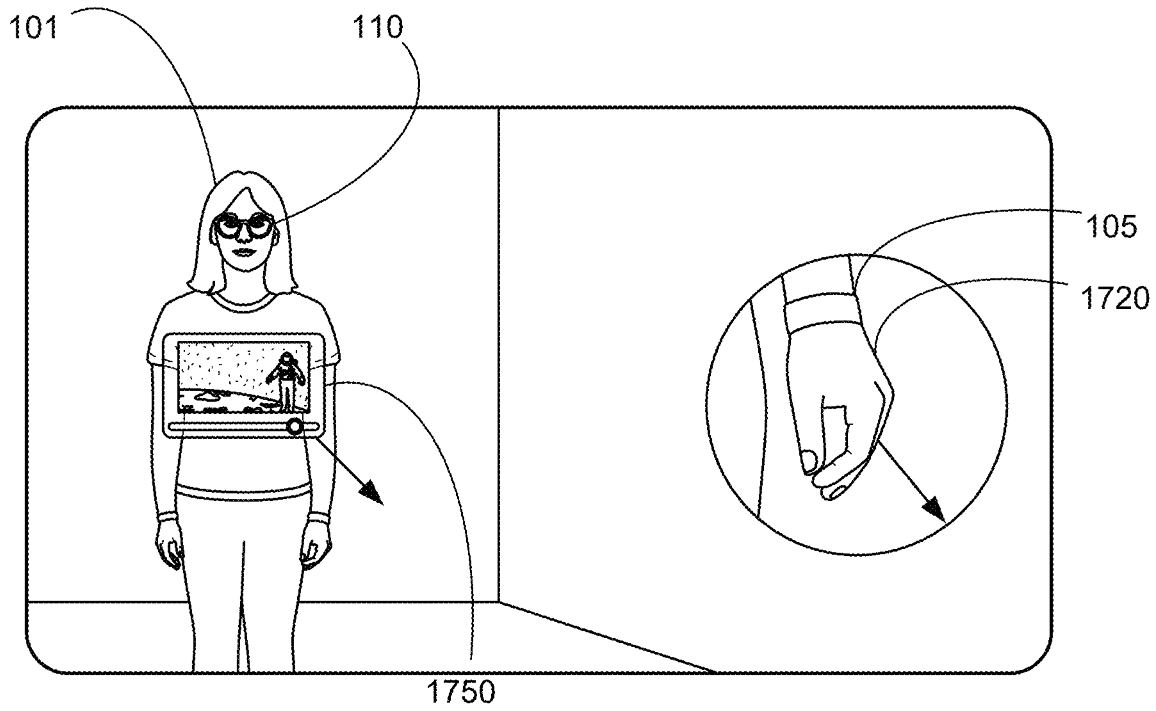

FIG. 17C illustrates the user 101 scrolling at the interactable XR augment 1750 by performing a thumb-swipe gesture 1730 (e.g., the user 101 swipes their thumb over their closed index finger, as illustrated in FIG. 17C), in accordance with some embodiments. In some embodiments, the user 101 scrolling (e.g., by performing the additional select gesture 1720 and moving their arm up and/or performing the thumb-swipe gesture 1730) the interactable XR augment 1750 includes moving a slider 1760 of the interactable XR augment 1750 (e.g., changing a volume at a volume slider and/or scrubbing a video at a video timeline). FIG. 17D illustrates the user 101 panning at the interactable XR augment 1750 (e.g., a two-dimensional interactable XR augment such as a map XR augment) by performing the additional pinch-and-drag gesture (e.g., the user 101 performs the additional select gesture 1720, moves their hand in the XR environment while holding the additional select gesture 1720, and releases the additional select gesture 1720), in accordance with some embodiments. FIG. 17E illustrates the user 101 moving the XR augment 1750 in three dimensions in the XR environment (e.g., up/down, left/right, toward the user/away from the user) relative to the user 101, in accordance with some embodiments. In some embodiments, the user 101 performs the additional drag-and-drop gesture (e.g., the user 101 performs the additional select gesture 1720, moves their hand in the XR environment while holding the additional select gesture 1720, and releases the additional select gesture 1720) to move the XR augment 1750 in three dimensions in the XR environment.

Figure 18A:
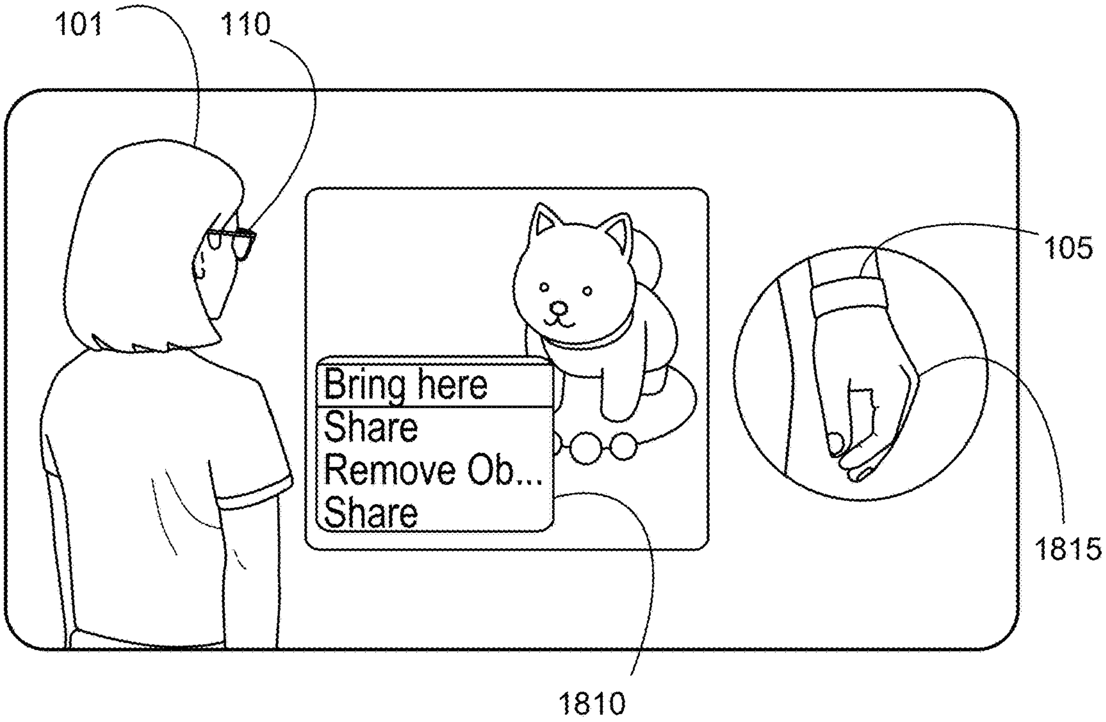
FIGS. 18A-18E illustrate a user causing a head-wearable device to display a plurality of menus, in accordance with some embodiments.
Figure 18B:
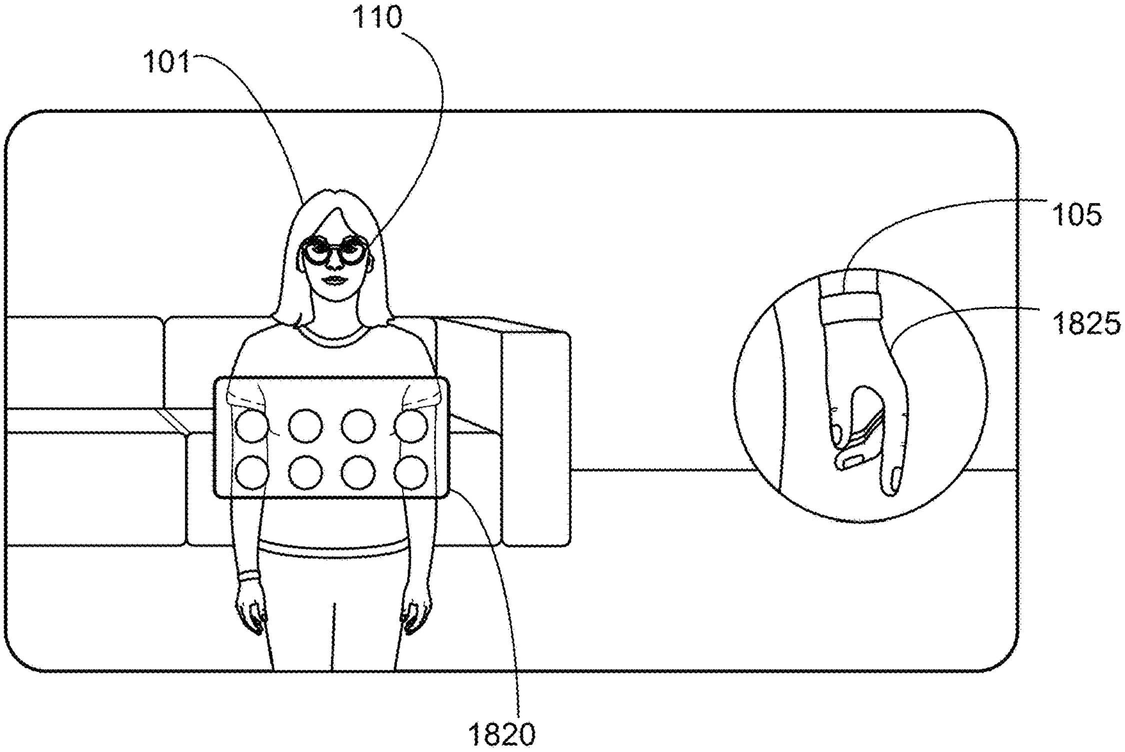

FIGS. 18A-18E illustrate the user 101 causing the head-wearable device 110 to display a plurality of menus, in accordance with some embodiments. FIG. 18A illustrates the user 101 causing the head-wearable device 110 to display a context menu 1810 by performing a context menu gesture 1815, in accordance with some embodiments. In some embodiments, the context menu 1810 displays a plurality of available options for an item (e.g., an XR item and/or a physical item) (e.g., move the item to the user, share the item with one or more other users, and/or remove the item from the XR environment, as illustrated in FIG. 18A). In some embodiments, the context menu gesture 1815 is a long index finger pinch gesture (e.g., an index finger pinch gesture held for two seconds). FIG. 18B illustrates the user 101 causing the head-wearable device 110 to display another launcher menu 1820 (e.g., the launcher menu 350) by performing the launcher menu gesture 1825 (e.g., a middle finger double-pinch gesture), in accordance with some embodiments.

Figure 18C:
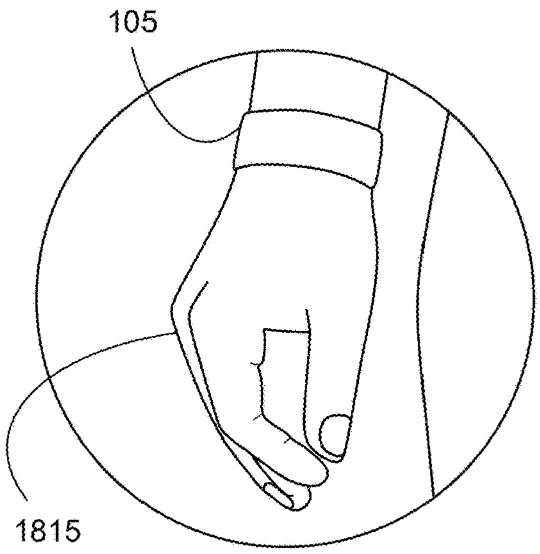
Figure 18D:
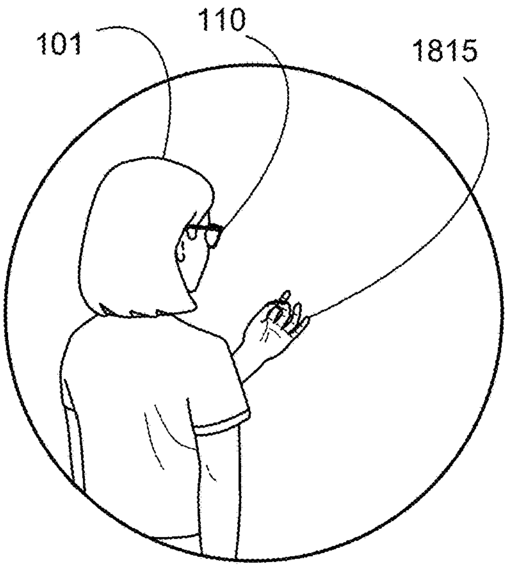
Figure 18E:
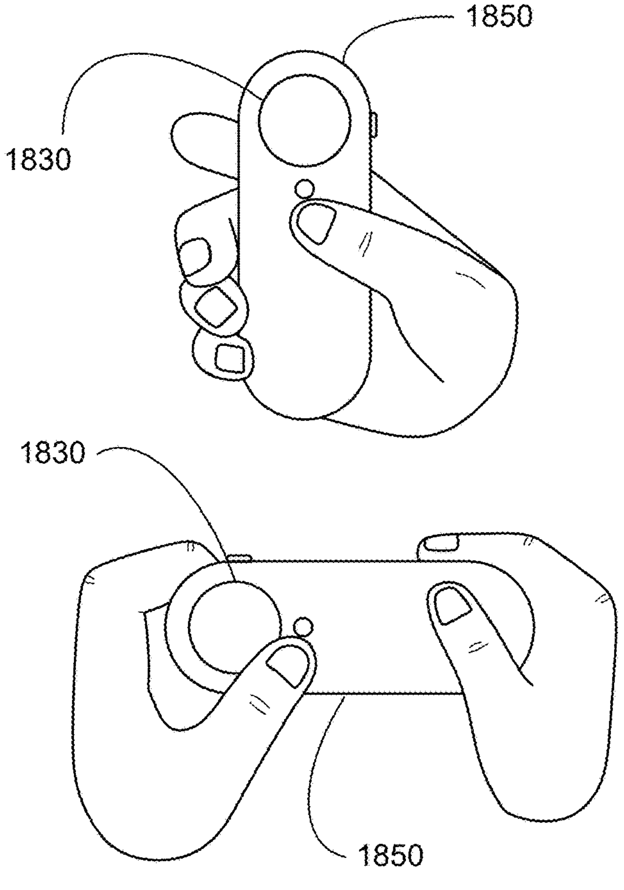

FIG. 18C illustrates the user 101 performing the context menu gesture 1815 and/or the launcher menu gesture 1825 at a side of the user 101 (e.g., such that the hand of the user 101 is not within the field-of-view 150 of the user 101) to cause the head-wearable device 110 to display the context menu 1810 and/or the launcher menu 1820, respectively, in accordance with some embodiments. In some embodiments, the context menu gesture 1815 and/or the launcher menu gesture 1825 is detected by the neuromuscular sensor of the wrist-wearable device 105 communicatively coupled to the head-wearable device 110 (e.g., an electromyography (EMG) sensor of a smartwatch). FIG. 18D illustrates the user 101 performing the context menu gesture 1815 and/or the launcher menu 1825 gesture in front of the head-wearable device 110 to cause the head-wearable device 110 to display the context menu 1810 and/or the launcher menu 1820, respectively, in accordance with some embodiments. In some embodiments, the context menu gesture 1815 and/or the launcher menu gesture 1825 is detected by the one or more cameras of the head-wearable device 110 (e.g., one or more forward-facing cameras of the head-wearable device 110). FIG. 18E illustrates the user 101 performing a button press at a button 1830 of a controller 1850 communicatively coupled to the head-wearable device 110 to cause the head-wearable device 110 to display the context menu 1810 and/or the launcher menu 1820, respectively, in accordance with some embodiments. In some embodiments, the controller 1850 communicatively coupled to the head-wearable device 110 is the HIPD. In some embodiments, the user 101 performs a voice command (e.g., detected by a microphone of the head-wearable device 110) to cause the head-wearable device 110 to display the context menu 1810 and/or the launcher menu 1820, respectively.

Figure 19A:
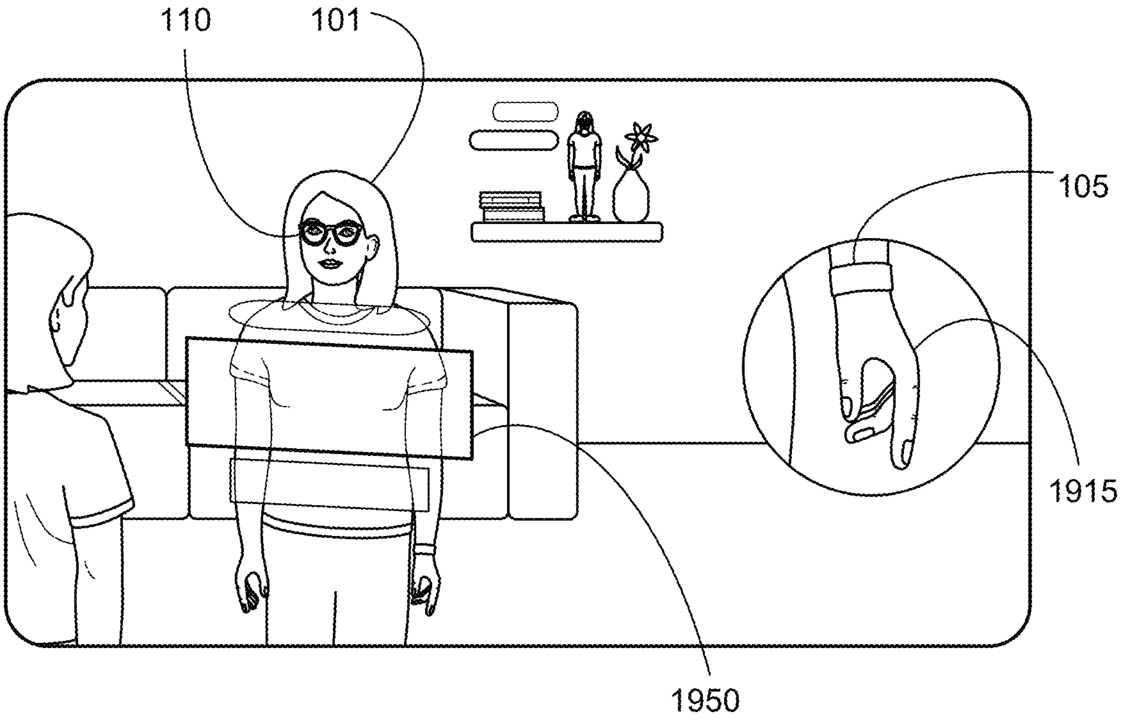
FIGS. 19A-19C illustrate a user causing a head-wearable device to enter a sleep mode and/or exit a sleep mode, in accordance with some embodiments.
Figure 19B:
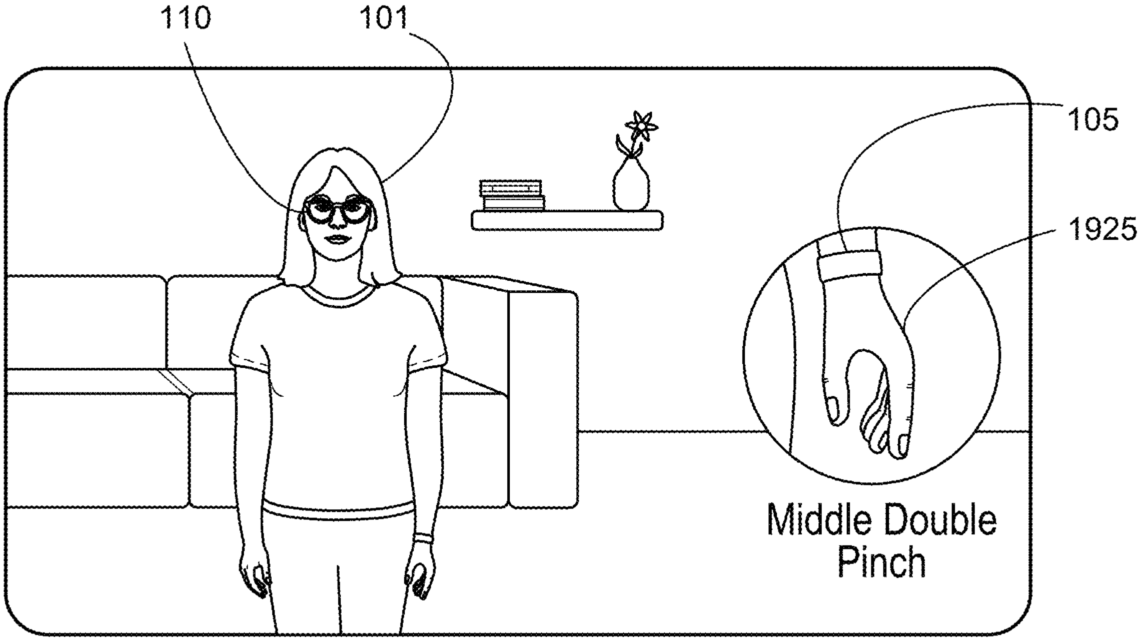
Figure 19C:
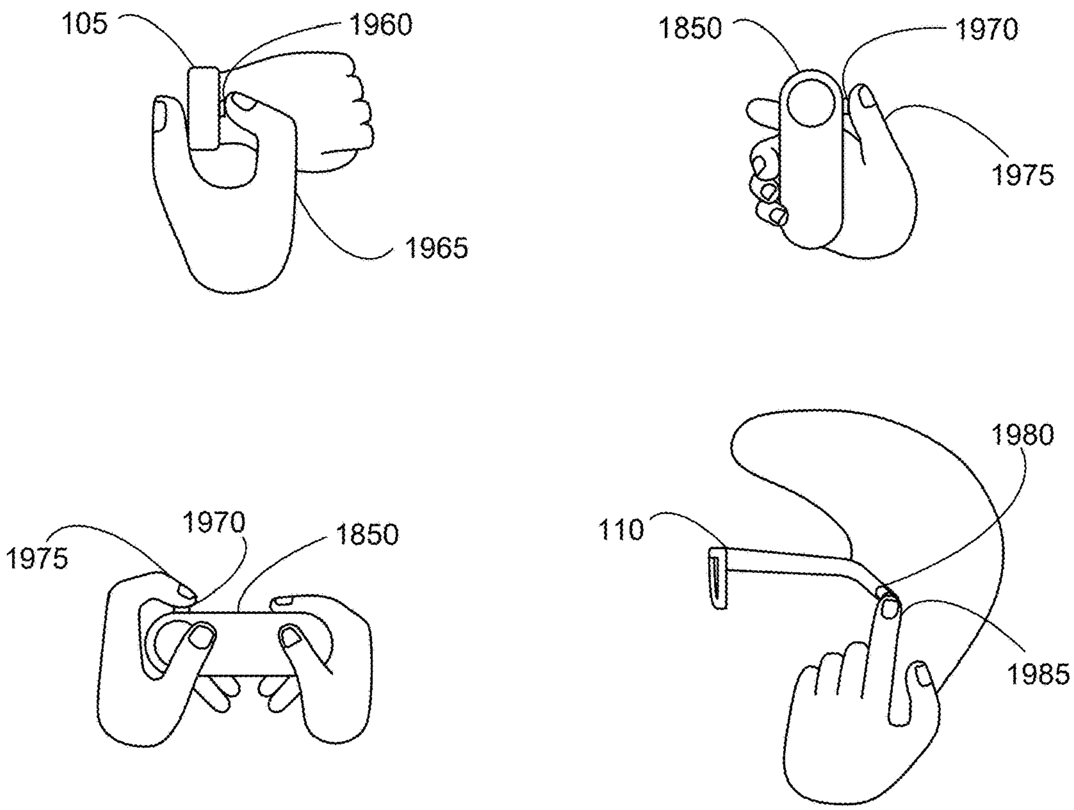

FIGS. 19A-19C illustrate the user 101 causing the head-wearable device 110 to enter a sleep mode and/or exit a sleep mode, in accordance with some embodiments. FIG. 19A illustrates the user 101 causing the head-wearable device 110 to enter the sleep mode by performing a sleep gesture 1915 (e.g., a middle finger double-pinch gesture), in accordance with some embodiments. While the head-wearable device 110 is in the sleep mode, the head-wearable device 110 does not present any of a plurality of XR augments 1950 at the display of the head-wearable device 110. FIG. 19B illustrates the user 101 causing the head-wearable device 110 to exit the sleep mode by performing a wake gesture 1925 (e.g., a middle finger double-pinch gesture), in accordance with some embodiments. In some embodiments, the sleep gesture 1915 and the wake gesture 1925 are a same hand gesture.

FIG. 19C illustrates a plurality of button inputs that the user 101 may perform to cause the head-wearable device 110 to enter the sleep mode and/or exit the sleep mode, in accordance with some embodiments. In some embodiments, the user 101 performs a wrist button press 1965 at a wrist button 1960 of the wrist-wearable device 110 to cause the head-wearable device 110 to enter the sleep mode and/or exit the sleep mode. In some embodiments, the user 101 performs a controller button press 1975 at a controller button 1970 of the controller 1850 to cause the head-wearable device 110 to enter the sleep mode and/or exit the sleep mode. In some embodiments, the user 101 performs a head button press 1985 at a head button 1980 of the head-wearable device 110 to cause the head-wearable device 110 to enter the sleep mode and/or exit the sleep mode.

Figure 20:
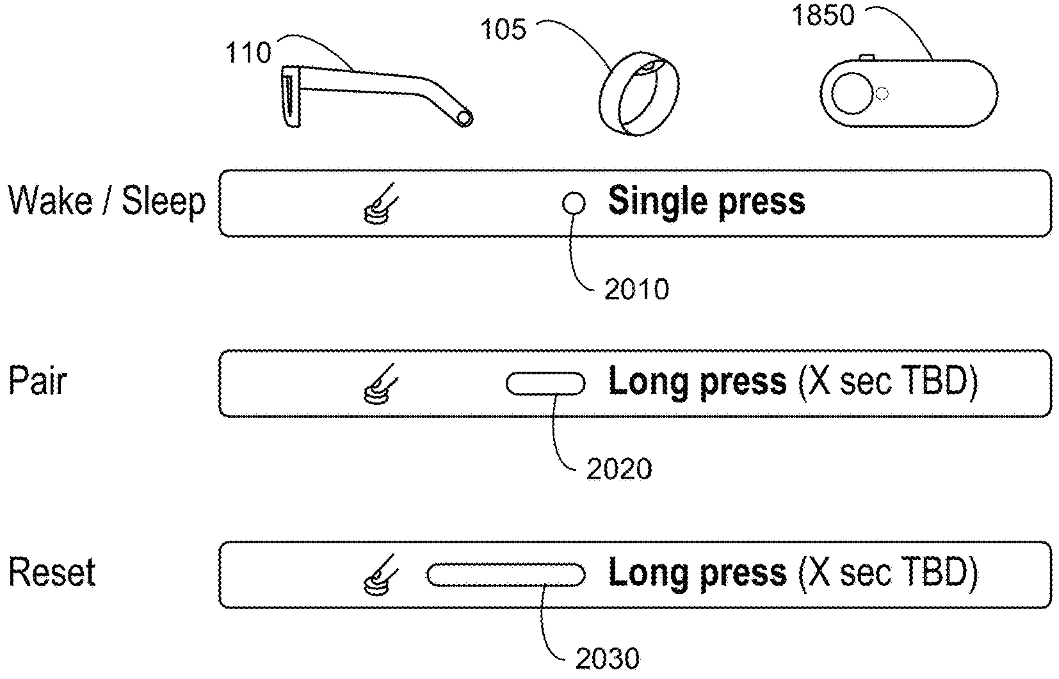
FIG. 20 illustrates different button press inputs that can be performed at a button of a head-wearable device, a button of a wrist-wearable device communicatively coupled to the head-wearable device, and/or a button of a controller communicatively coupled to the head-wearable device, in accordance with some embodiments.

FIG. 20 illustrates different button press inputs that can be performed at the head button 1980 of the head-wearable device 110, a wrist button 1960 of the wrist-wearable device 105 communicatively coupled to the head-wearable device 110, and/or the controller button 1970 of the controller 1850 communicatively coupled to the head-wearable device 110, in accordance with some embodiments. In some embodiments, a single press 2010 (e.g., a tap press for 0.25 seconds) at one of the three buttons (e.g., the head button 1980, the wrist button 1960, and/or the controller button 1970) causes the head-wearable device 110 to enter the sleep mode and/or exit the sleep mode. In some embodiments, a long press 2020 (e.g., a press for two seconds) at one of the three buttons causes the head-wearable device 110 to pair with the wrist-wearable device 105 and/or the controller 1850. In some embodiments, a longer press 2030 (e.g., a press for five seconds) at one of the three buttons causes the head-wearable device 110 to reset and/or restart an operating system executed at the head-wearable device 110, the wrist-wearable device 105 and/or the controller 1850.

Figure 21:
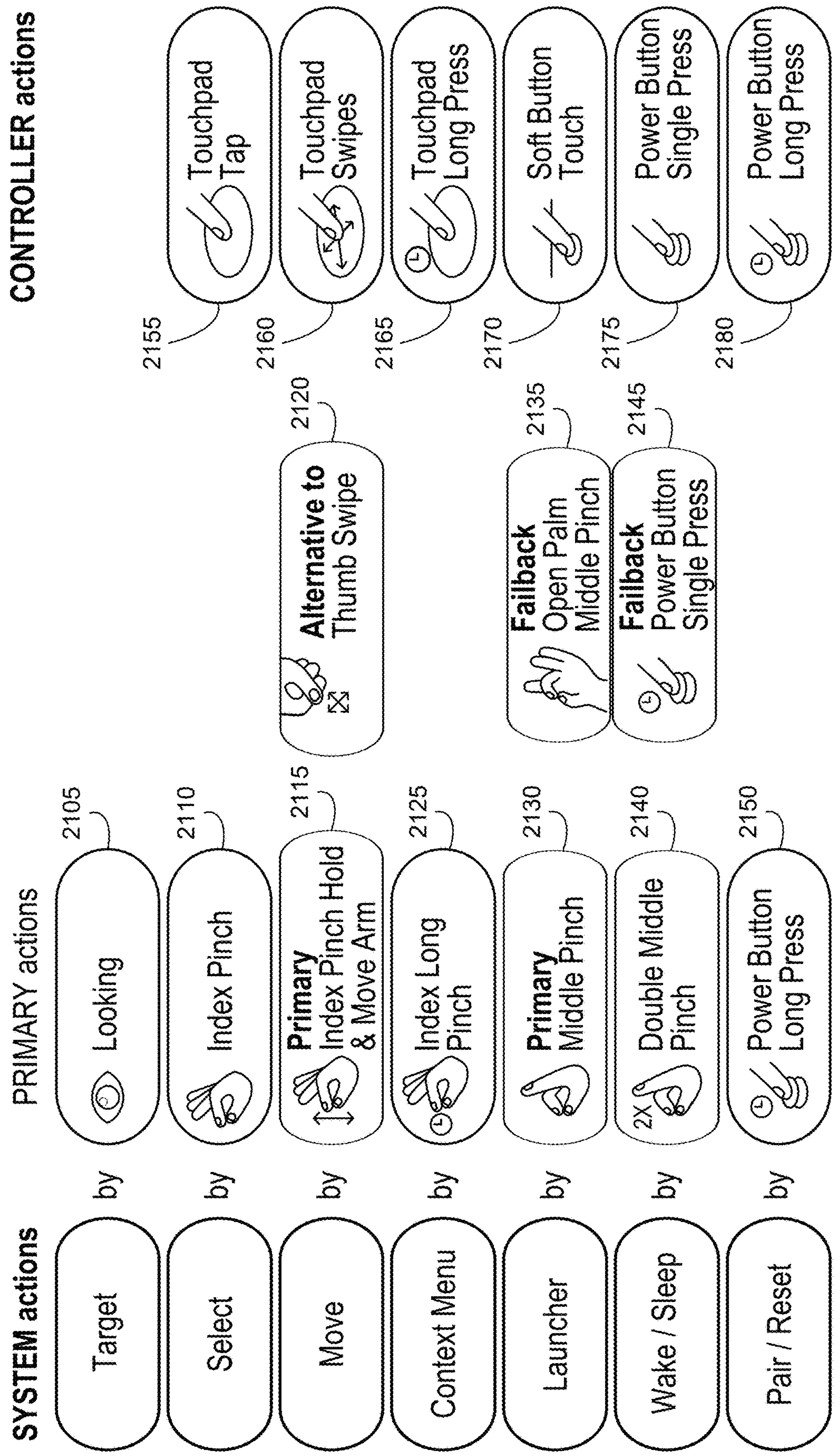
FIG. 21 illustrates a plurality of input options for interacting with an XR environment at a head-wearable device, in accordance with some embodiments.

FIG. 21 illustrates a plurality of input options for interacting with another XR environment (e.g., as described in reference to any of FIGS. 1A-19C) at the head-wearable device 110, in accordance with some embodiments. In some embodiments, the user 101 targets objects (e.g., XR objects and/or physical objects) in the other XR environment by performing one or more gaze gestures 2105 detected at the eye-tracking camera of the head-wearable device 110. In some embodiments, the user 101 selects XR objects and/or XR elements in the other XR environment by performing an index finger pinch gesture 2110. In some embodiments, the user 101 moves the XR objects and/or the XR elements in the other XR environment by performing a pinch-and-hold gesture 2115 and/or a thumb swipe gesture 2120. In some embodiments, the user 101 causes the head-wearable device 110 to display the context menu 1810 by performing a long index finger pinch gesture 2125 (e.g., performing the index finger pinch 2110 gesture for two seconds). In some embodiments, the user 101 causes the head-wearable device 110 to display the launcher menu 350 by performing the middle finger pinch gesture 2130 and/or an open-palm middle finger pinch gesture 2135. In some embodiments, the user 101 causes the head-wearable device 110 to enter the sleep mode and/or exit the sleep mode by performing the double middle finger pinch gesture 2140. In some embodiments, hand gestures are detected by the neuromuscular sensor of the wrist-wearable device 105 communicatively coupled to the head-wearable device 110 (e.g., the EMG sensor of the smartwatch) and/or the imaging device of the head-wearable device 110 (e.g., the forward-facing camera of the head-wearable device 110).

In some embodiments, the user 101 causes the head-wearable 110 to turn on and/or turn off by performing a power button press 2145 at a power button of the head-wearable device 110, in accordance with some embodiments. In some embodiments, the user 101 causes the head-wearable 110 to communicatively couple to another device (e.g., the wrist-wearable device 105 and/or the controller 1850) by performing a long pairing button press 2145 at a pairing button of the head-wearable device 110, in accordance with some embodiments.

In some embodiments, the user 101 selects the XR objects and/or XR elements in the other XR environment by performing a touchpad tap gesture 2155 at a touchpad of the controller 1850 communicatively coupled to the head-wearable device 110. In some embodiments, the user 101 moves the XR objects and/or the XR elements in the other XR environment by performing touchpad swipe gestures 2160 at the touchpad of the controller 1850 communicatively coupled to the head-wearable device 110. In some embodiments, the user 101 causes the head-wearable device 110 to display the context menu by performing a long touchpad press 2165 at the touchpad of the controller 1850 communicatively coupled to the head-wearable device 110. In some embodiments, the user 101 causes the head-wearable device 110 to display the launcher menu 350 by performing a soft touchpad button press 2170 at the button of the controller 1850 communicatively coupled to the head-wearable device 110. In some embodiments, the user 101 causes the head-wearable device 110 to enter the sleep mode and/or exit the sleep mode by performing a touchpad button press 2175 at the button of the controller 1850 communicatively coupled to the head-wearable device 110. In some embodiments, the user 101 causes the head-wearable device 110 to pair with the wrist-wearable device 105 and/or the controller 1850 by performing the long button press 2180 at the button the controller 1850 communicatively coupled to the head-wearable device 110.

FIGS. 22A-22D illustrate flow diagrams of methods of switching between UI states displayed at a head-wearable device, determining an AR game state to display at a head-wearable device, displaying an AR configuration UI at a head-wearable device, and receiving hand gesture command at a head-wearable device, respectively, in accordance with some embodiments. Operations (e.g., steps) of the method 2200, the method 2220, the method 2240, and/or the method 2260 can be performed by one or more processors (e.g., central processing unit and/or MCU) of an XR system. At least some of the operations shown in FIGS. 22A-22D correspond to instructions stored in a computer memory or computer-readable storage medium (e.g., storage, RAM, and/or memory) of the XR system. Operations of the method 2200, the method 2220, the method 2240, and/or the method 2260 can be performed by a single device alone or in conjunction with one or more processors and/or hardware components of another communicatively coupled device (e.g., the head-wearable device, the HIPD, and/or the wrist-wearable device) and/or instructions stored in memory or computer-readable medium of the other device communicatively coupled to the XR system. In some embodiments, the various operations of the methods described herein are interchangeable and/or optional, and respective operations of the methods are performed by any of the aforementioned devices, systems, or combination of devices and/or systems. For convenience, the method operations will be described below as being performed by particular component or device but should not be construed as limiting the performance of the operation to the particular device in all embodiments.

Figure 22A:
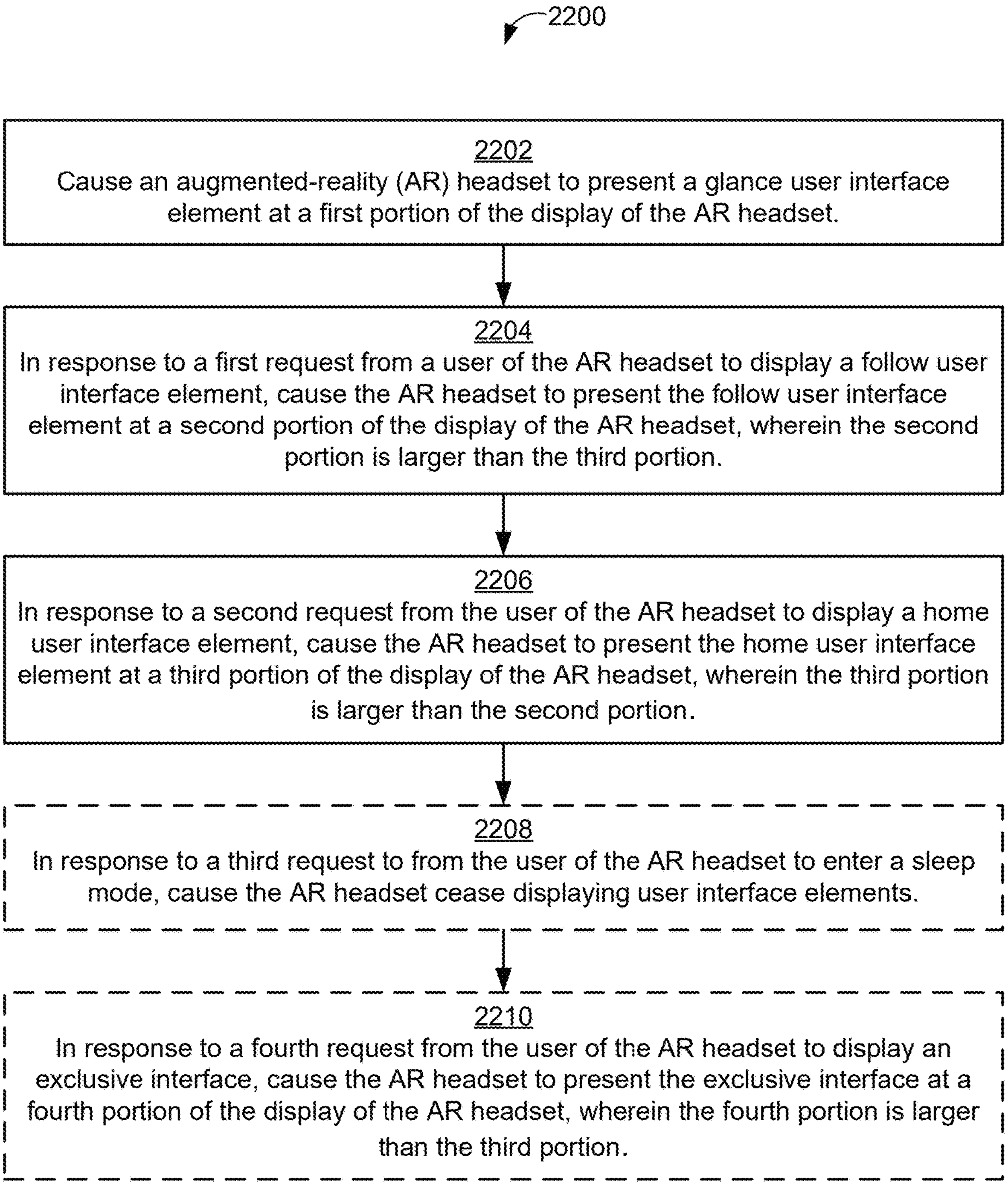
FIGS. 22A-22D illustrate example method flow charts for switching between UI states displayed at a head-wearable device, determining an AR game state to display at a head-wearable device, displaying an AR configuration UI at a head-wearable device, and receiving hand gesture command at a head-wearable device, respectively, in accordance with some embodiments.

(A1) FIG. 22A shows a flow chart of a method 2200 of switching between UI states displayed at a head-wearable device, in accordance with some embodiments.

The method 2200 occurs at a head-wearable device (e.g., the head-wearable device 110) with at least one display. In some embodiments, the method 2200 includes causing an extended-reality (XR) headset (e.g., the head-wearable device 110) to present a glance user interface element (e.g., the glance XR augment 160 and/or the bar glance XR augment 660) at a first portion (e.g., the small lower portion of the field-of-view 150) of the display of the XR headset (2202). The method 2200 further includes, in response to a first request (e.g., the glance select gesture 410 and/or the bar select gesture 620) from a user (e.g., the user 101) of the XR headset to display a follow user interface element (e.g., the follow XR augment 170 and/or the first follow XR augment 270), causing the XR headset to present the follow user interface element at a second portion (e.g., the lower portion of the field-of-view 150) of the display of the XR headset and cease presenting the glance user interface element, wherein the second portion is larger than the third portion (2204). The method 2200 further includes, in response to a second request (e.g., the fourth state-switch gesture 220) from the user of the XR headset to display an application user interface element (e.g., the plurality of home XR augments 180, the first application-view XR augment 280*a*-280*c*, the second application-view XR augment 380*a*-380*c*, the eighth application XR augment 1080, etc.), causing the XR headset to present the application user interface element at a third portion (e.g., the large portion of the field-of-view 150) of the display of the XR headset and cease presenting the glance user interface element, wherein the third portion is larger than the second portion (2206).

(A2) In some embodiments of A1, the method 2200 further includes, in response to a sleep mode request (e.g., the sleep gesture 1915) to from the user of the XR headset to enter a sleep mode, causing the XR headset cease displaying user interface elements (2208).

(A3) In some embodiments of any of A1-A2, the method 2200 further includes, in response to a third request from the user of the XR headset to display an exclusive interface (e.g., the exclusive XR content 190, the first exclusive XR content 590, the video game XR content 1190, etc.), causing the XR headset to present the exclusive interface at a fourth portion of the display of the XR headset and cease presenting the glance user interface element, wherein the fourth portion is larger than the third portion (2210).

(A4) In some embodiments of any of A1-A3, the glance user interface element indicates to the user that a notification has been received at the XR headset and/or another device communicatively coupled to the XR headset.

(A5) In some embodiments of any of A1-A4, the follow user interface element includes information from an application executed at the XR headset and/or another device communicatively coupled to the XR headset.

(A6) In some embodiments of any of A1-A5, the application user interface element includes one or more of application XR augments (e.g., the plurality of home XR augments 180, the first application-view XR augment 280*a*-280*c*, the second application-view XR augment 380*a*-380*c*, etc.), each application XR augment of the one or more XR augments including respective information from a respective application executed at the XR headset and/or another device communicatively coupled to the XR headset.

(A7) In some embodiments of any of A1-A6, the application user interface element includes a launcher menu (e.g., the launcher menu 350), the launcher menu includes a plurality of selectable application icons (e.g., the plurality of application icons 355*a*-355*h*), and each selectable application icon of the plurality of selectable application icons is associated with a respective application executable at the XR headset and/or another device communicatively coupled to the XR headset.

(A8) In some embodiments of any of A1-A7, the method 2200 further includes, while the XR headset is presenting one or more of the follow user interface element and the application user interface element and in response to a fourth request (e.g., the glance switch gesture 820) from the user of the XR headset to display the glance user interface, causing the XR headset to present the glance user interface element at the first portion of the display of the XR headset and cease presenting the one or more of the follow user interface element and the application user interface element.

(A9) In some embodiments of any of A1-A8, the method 2200 further includes, while the XR headset is presenting the application user interface element including the launcher menu and in response to an icon select user input (e.g., the first drag-and-drop gesture 325) directed at a first selectable application icon (e.g., the fifth application icon 355*f*) of the plurality of selectable application icons associated with a first application, causing the XR headset to present an application XR augment (e.g., the fifth application XR augment 380*b*) associated with the first application.

(A10) In some embodiments of any of A1-A9, the method 2200 further includes, while the XR headset is presenting the application user interface element including the launcher menu and in response to another icon select user input (e.g., the second drag-and-drop gesture 330) directed at a second selectable application icon (e.g., the third application icon 355*c*) of the plurality of selectable application icons associated with a second application, causing the XR headset to present a first application XR augment associated with the first application and a second application XR augment (e.g., the sixth application XR augment 380*c*) associated with the second application.

(A11) In some embodiments of any of A1-A10, the first application XR augment is displayed at a first subportion of the third portion of the display and the second application XR augment is displayed at a second subportion of the third portion of the display, distinct from the first subportion.

(A12) In some embodiments of any of A1-A11, the method 2200 further includes, while the XR headset is displaying the glance user interface element and in response to the user changing a position of their head, continuing to cause the XR headset to present the glance user interface element at the first portion of the display of the XR headset (e.g., as illustrates in FIGS. 4A-4C).

(A13) In some embodiments of any of A1-A12, the method 2200 further includes, while the XR headset is displaying the follow user interface element and in response to the user changing a position of their head, continuing to cause the XR headset to present the follow user interface element at the second portion of the display of the XR headset (e.g., as illustrated in FIGS. 2A-2C).

(A14) In some embodiments of any of A1-A13, while the XR headset presents the application user interface element, the application user interface element appears at a first location in an environment around the user. The method 2200 further includes, while the XR headset is displaying the application user interface element and in response to the user changing a position of their head, cause the XR headset to present the application user interface element such that the application user interface element continues to appear at the first location in the environment (e.g., the application XR elements do not follow the vision of the user 101 as the user 101 moves in the environment, but rather continue to appear at fixed locations in the environment, as illustrated in FIGS. 3A-3F).

(A15) In some embodiments of any of A1-A14, the method 2200 further includes, while the XR headset presents the application user interface element and in accordance with a determination that the user has changed the position of their head such that the first location in the environment is no longer within a field-of-view of the user, cause the XR headset to cease presenting the application user interface (e.g., as illustrated in FIGS. 7A-7B).

(A16) In some embodiments of any of A1-A15, the method 2200 further includes, in accordance with the determination that the user has changed the position of their head such that the first location in the environment is no longer within a field-of-view of the user, cause the XR headset to present the follow user interface element at the second portion of the display of the XR headset (e.g., as illustrated in FIGS. 7A-7B).

(A17) In some embodiments of any of A1-A16, the method 2200 further includes, while the XR headset is presenting the follow user interface element and in response to the second request from the user of the XR headset to display the application user interface element, cause the XR headset to present the application user interface element at the third portion of the display of the XR headset and cease presenting the follow user interface element.

(A18) In some embodiments of any of A1-A17, the method 2200 further includes, while the XR headset is presenting the application user interface element and in response to the first request from the user of the XR headset to display the follow user interface element, cause the XR headset to present the follow user interface element at the second portion of the display of the XR headset and cease presenting the application user interface element.

Figure 22B:
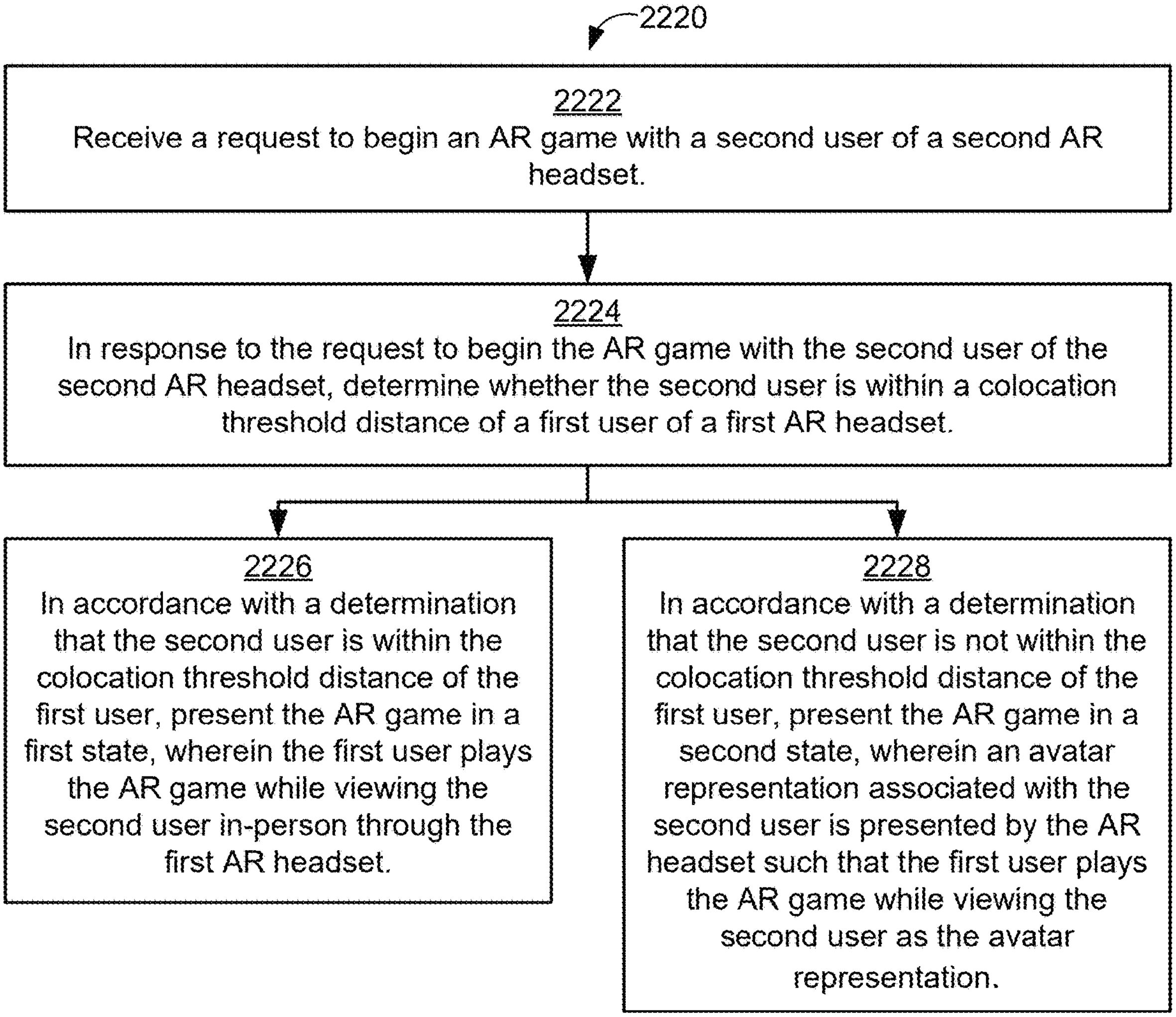

(B1) FIG. 22B shows a flow chart of a method 2220 of determining an XR game state to display at a head-wearable device, in accordance with some embodiments.

The method 2220 occurs at a head-wearable device with at least a display. In some embodiments, the method 2220 includes receiving a request to begin an XR game with a second user of a second XR headset (2222). The method 2220 further includes, in response to the request to begin the XR game with the second user of the second XR headset, determining whether the second user is within a colocation threshold distance of a first user of a first XR headset (2224). The method 2220 further includes, in accordance with a determination that the second user is within the colocation threshold distance of the first user, presenting the XR game in a first state, wherein the first user plays the XR game while viewing the second user in-person through the first XR headset (2226). The method 2220 further includes, in accordance with a determination that the second user is not within the colocation threshold distance of the first user, presenting the XR game in a second state, wherein an avatar representation associated with the second user is presented by the XR headset such that the first user plays the XR game while viewing the second user as the avatar representation (2228).

(B2) In some embodiments of B1, the colocation threshold distance is a such that a camera of the first XR headset detects the second user.

(B3) In some embodiments of any of B1-B2, the request to begin the XR game with the second user of the second XR headset is an input performed by the first user at the first XR headset and/or another device communicatively coupled to the XR headset.

(B4) In some embodiments of any of B1-B3, the request to begin the XR game with the second user of the second XR headset is a trigger condition detected by the first XR headset and/or another device communicatively coupled to the XR headset.

Figure 22C:
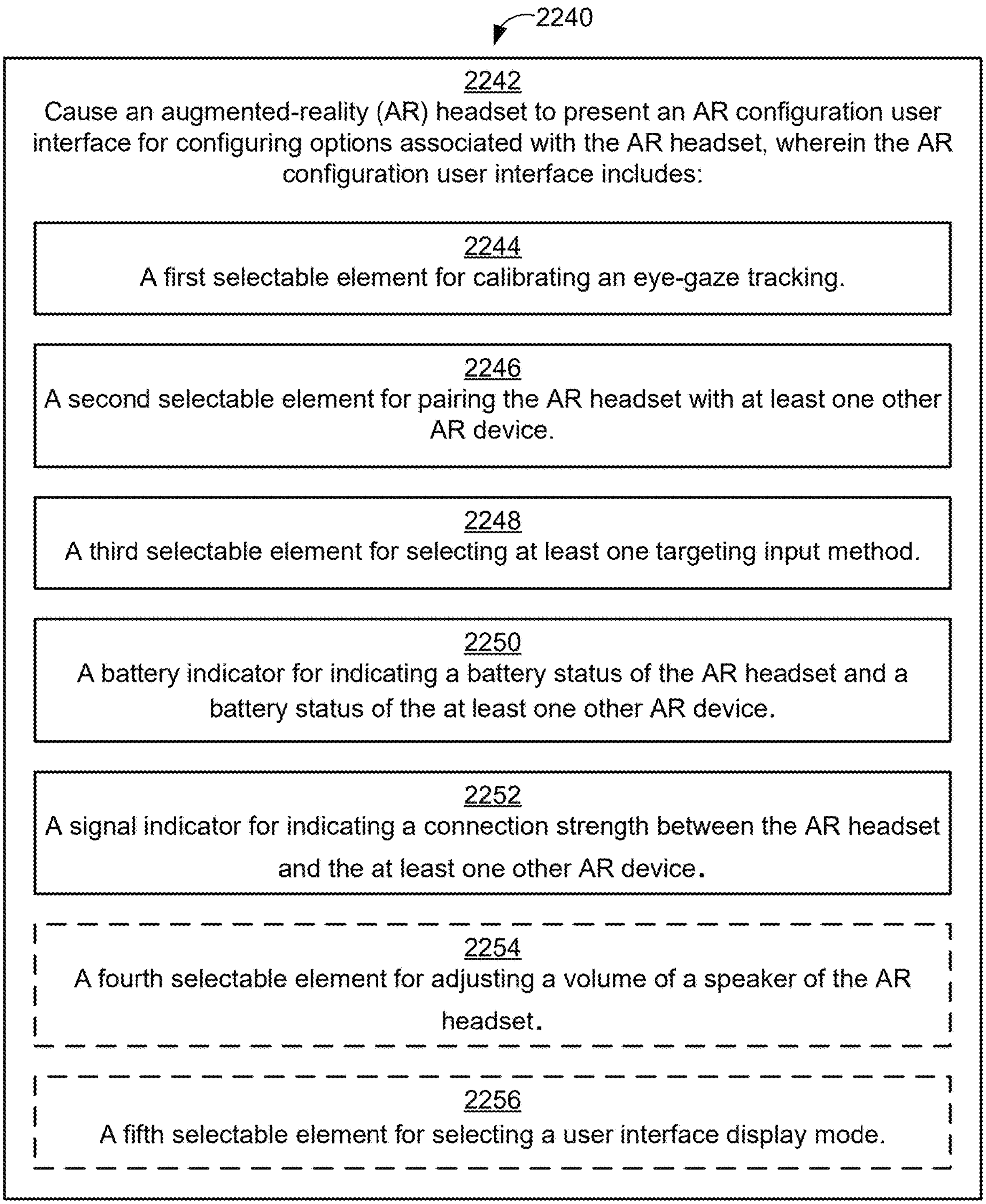

(C1) FIG. 22C shows a flow chart of a method 2240 of displaying an XR configuration UI at a head-wearable device, in accordance with some embodiments.

The method 2240 occurs at a head-wearable device with at least a display. In some embodiments, the method 2240 includes causing an extended-reality (XR) headset to present an XR configuration user interface for configuring options associated with the XR headset, wherein the XR configuration user interface includes (2242): (i) a first selectable element for calibrating an eye-gaze tracking (2244), (ii) a second selectable element for pairing the XR headset with at least one other XR device (2246), (iii) a third selectable element for selecting at least one targeting input method (2248), (iv) a battery indicator for indicating a battery status of the XR headset and a battery status of the at least one other XR device (2250), and (v) a signal indicator for indicating a connection strength between the XR headset and the at least one other XR device (2252).

(C2) In some embodiments of C1, the XR configuration user interface further includes a fourth selectable element for adjusting a volume of a speaker of the XR headset (2254).

(C3) In some embodiments of any of C1-C2, the XR configuration user interface further includes a fifth selectable element for selecting a user interface display mode (2256).

(C4) In some embodiments of any of C1-C3, the battery status of the XR headset indicates a battery level of the XR headset, and the battery status of the at least one other XR device indicates whether the at least one other device is communicatively coupled to the XR headset whether the at least one other XR device is communicatively coupled to the XR headset, whether the at least one other XR device is in a sleep mode, and a battery level of the at least one other XR device.

(C5) In some embodiments of any of C1-C4, the at least one targeting input method includes eye-gaze tracking and hand tracking.

(C6) In some embodiments of any of C1-C5, the at least one other XR device includes at least one of a wrist-wearable device and a handheld intermediary processing device (HIPD).

Figure 22D:
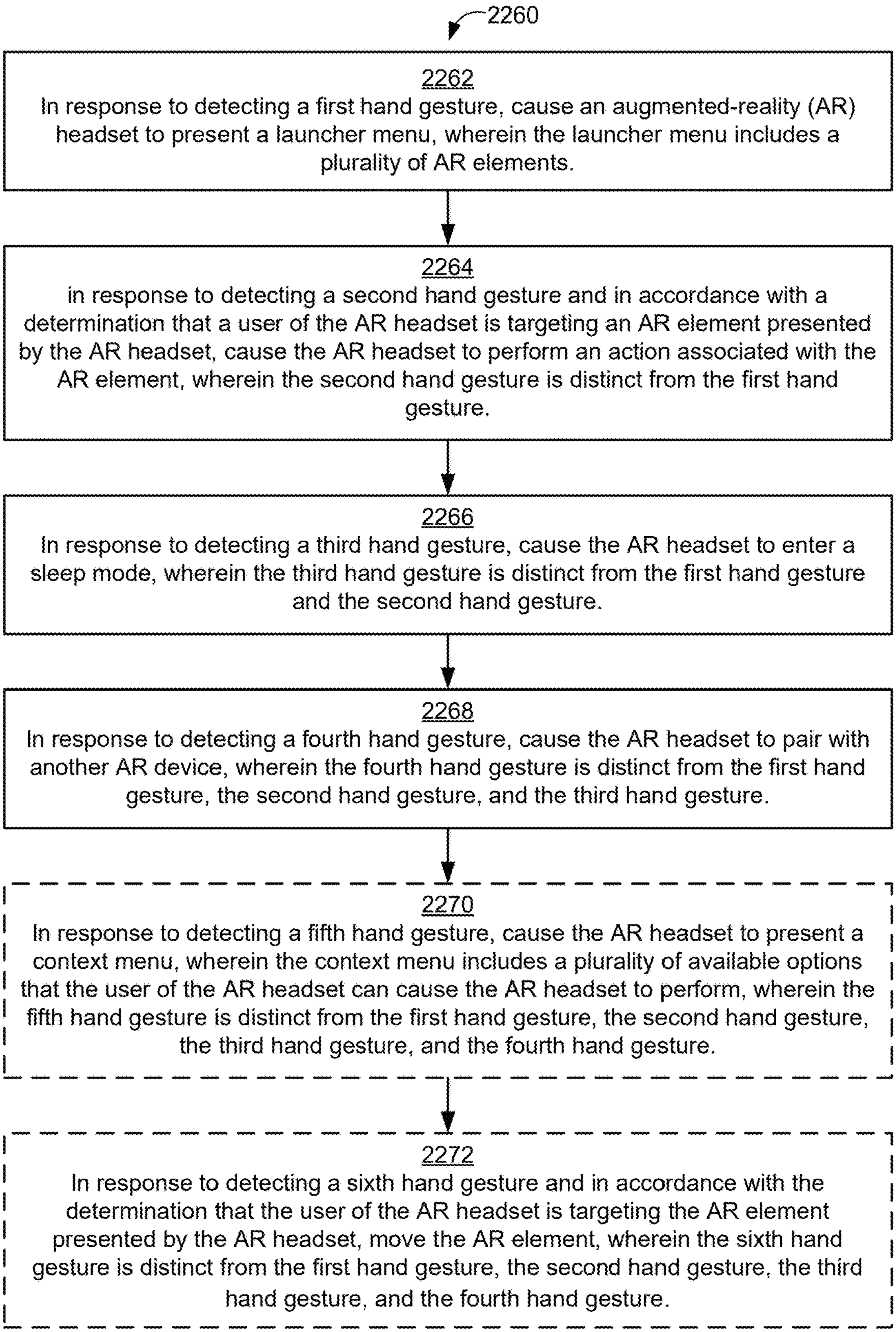

(D1) FIG. 22D shows a flow chart of a method 2260 of receiving hand gesture command at a head-wearable device, in accordance with some embodiments.

The method 2260 occurs at a head-wearable device with at least a display. In some embodiments, the method 2260 includes, in response to detecting a first hand gesture, causing an extended-reality (XR) headset to present a launcher menu, wherein the launcher menu includes a plurality of XR elements (2262). The method 2260 further includes, in response to detecting a second hand gesture and in accordance with a determination that a user of the XR headset is targeting an XR element presented by the XR headset, causing the XR headset to perform an action associated with the XR element, wherein the second hand gesture is distinct from the first hand gesture (2264). The method 2260 further includes, in response to detecting a third hand gesture, causing the XR headset to enter a sleep mode, wherein the third hand gesture is distinct from the first hand gesture and the second hand gesture (2266). The method 2260 further includes, in response to detecting a fourth hand gesture, causing the XR headset to pair with another XR device, wherein the fourth hand gesture is distinct from the first hand gesture, the second hand gesture, and the third hand gesture (2268).

(D2) In some embodiments of D1, the method 2260 further includes, in response to detecting a fifth hand gesture, causing the XR headset to present a context menu, wherein the context menu includes a plurality of available options that the user of the XR headset can cause the XR headset to perform, wherein the fifth hand gesture is distinct from the first hand gesture, the second hand gesture, the third hand gesture, and the fourth hand gesture (2270).

(D3) In some embodiments of any of D1-D2, the method 2260 further includes in response to detecting a sixth hand gesture and in accordance with the determination that the user of the XR headset is targeting the XR element presented by the XR headset, moving the XR element, wherein the sixth hand gesture is distinct from the first hand gesture, the second hand gesture, the third hand gesture, and the fourth hand gesture (2272).

(D4) In some embodiments of any of D1-D3, at least one of the first hand gesture, the second hand gesture, the third hand gesture, and the fourth hand gesture is a button-press gesture performed at a button of the XR headset.

(D5) In some embodiments of any of D1-D4, the first hand gesture is a middle finger pinch gesture, the second hand gesture is an index finger pinch gesture, the third hand gesture is a double middle finger pinch gesture, and the fourth hand gesture is a long button-press gesture performed at a button of the XR headset.

(E1) In accordance with some embodiments, a non-transitory computer readable storage medium including executable instructions that, when executed by one or more processors of an artificial-reality headset, cause the one or more processors to perform the methods corresponding to any of A1-D5.

(F1) In accordance with some embodiments, means for performing and/or causing performance of the methods corresponding to any of A1-D5.

(G1) In accordance with some embodiments, a wearable device (head-worn or wrist-worn) configured to perform or cause performance of the methods corresponding to any of A1-D5.

(H1) In accordance with some embodiments, an intermediary processing device (e.g., configured to offload processing operations for a head-worn device such as Augmented Reality glasses) configured to perform or cause performance of the methods corresponding to any of A1-D5.

Example Extended-Reality Systems

Figure 23A:
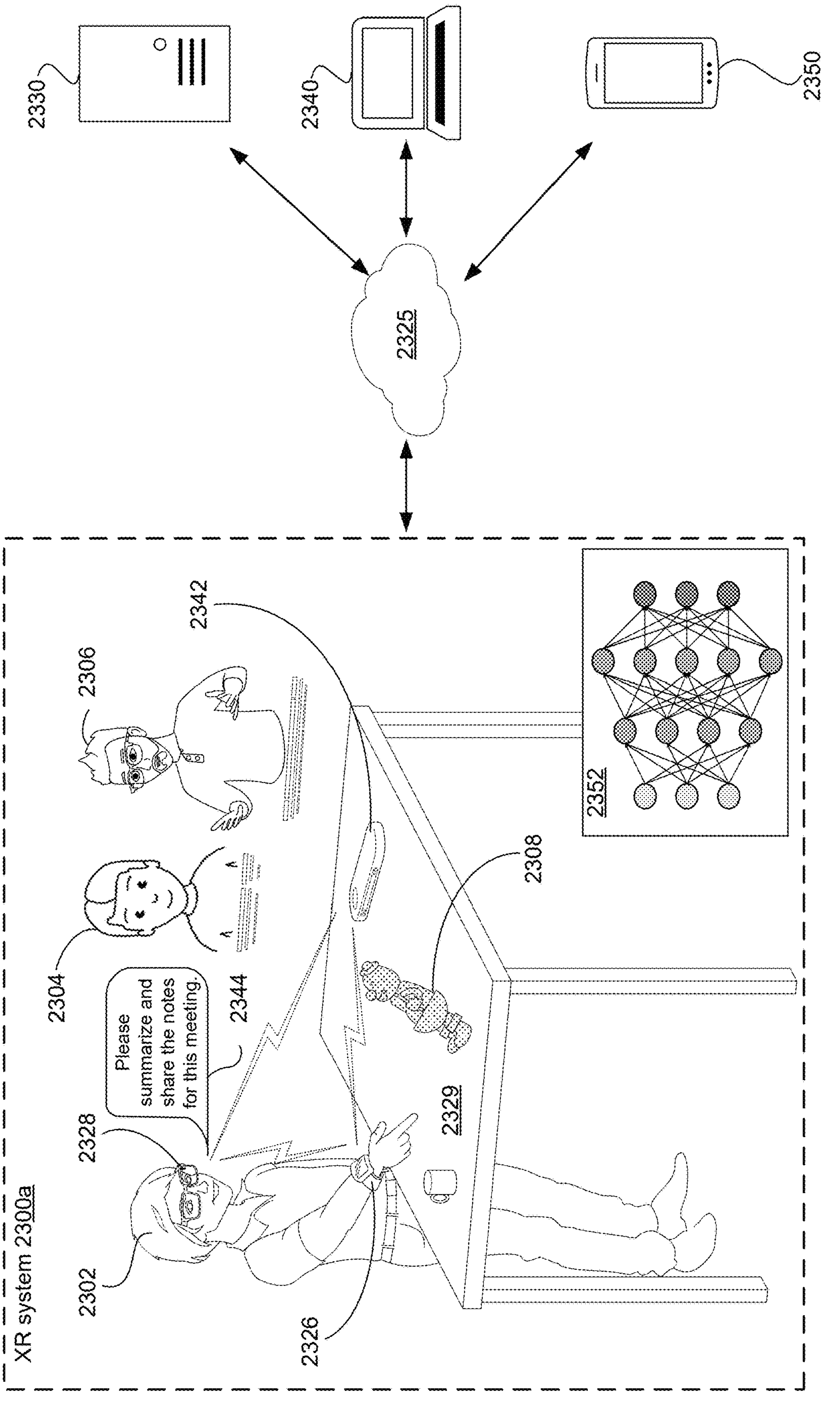
FIGS. 23A, 23B, and 23C-1 and 23C-2 illustrate example MR and AR systems, in accordance with some embodiments.
Figure 23B:
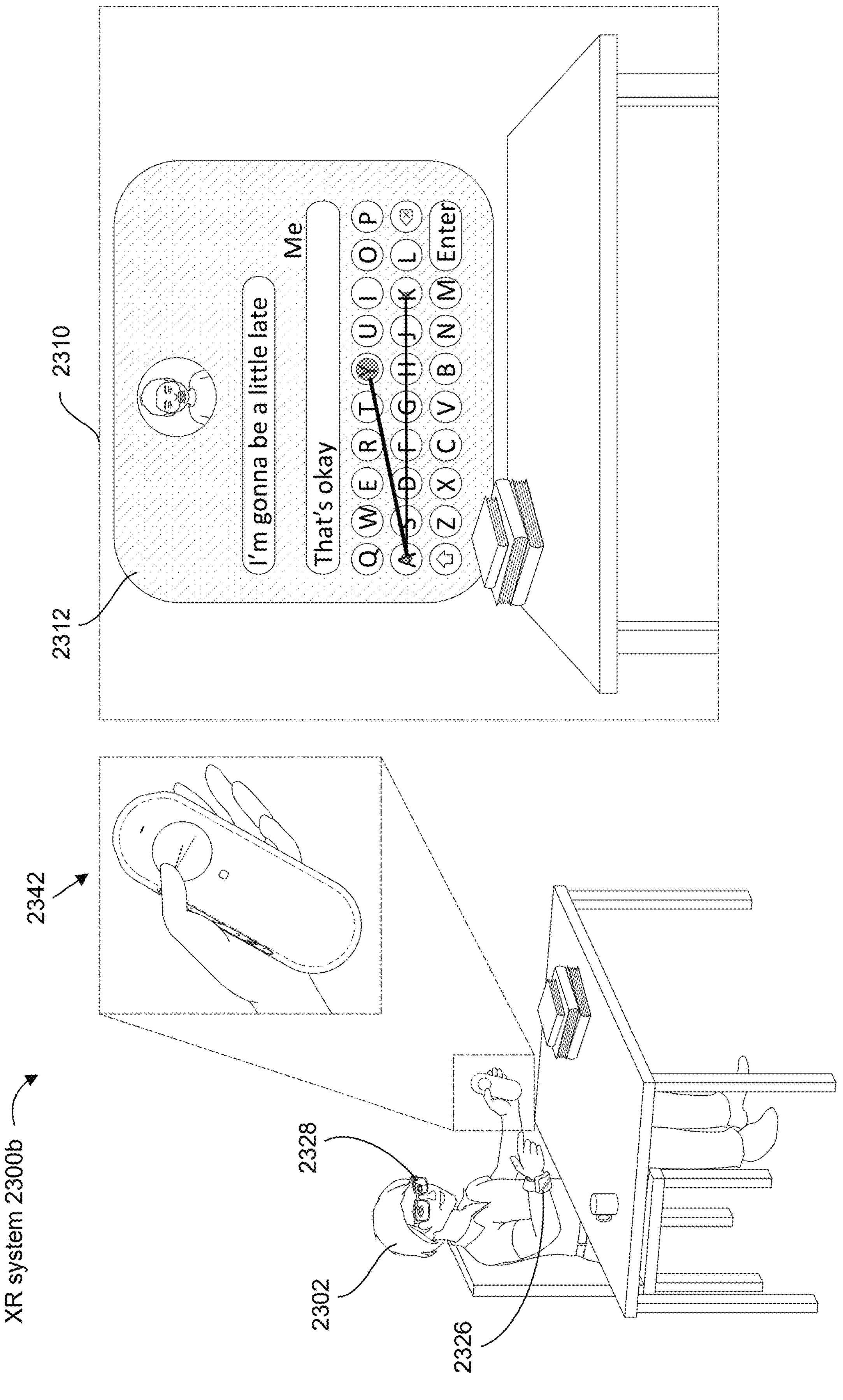
Figures 1, 23C:
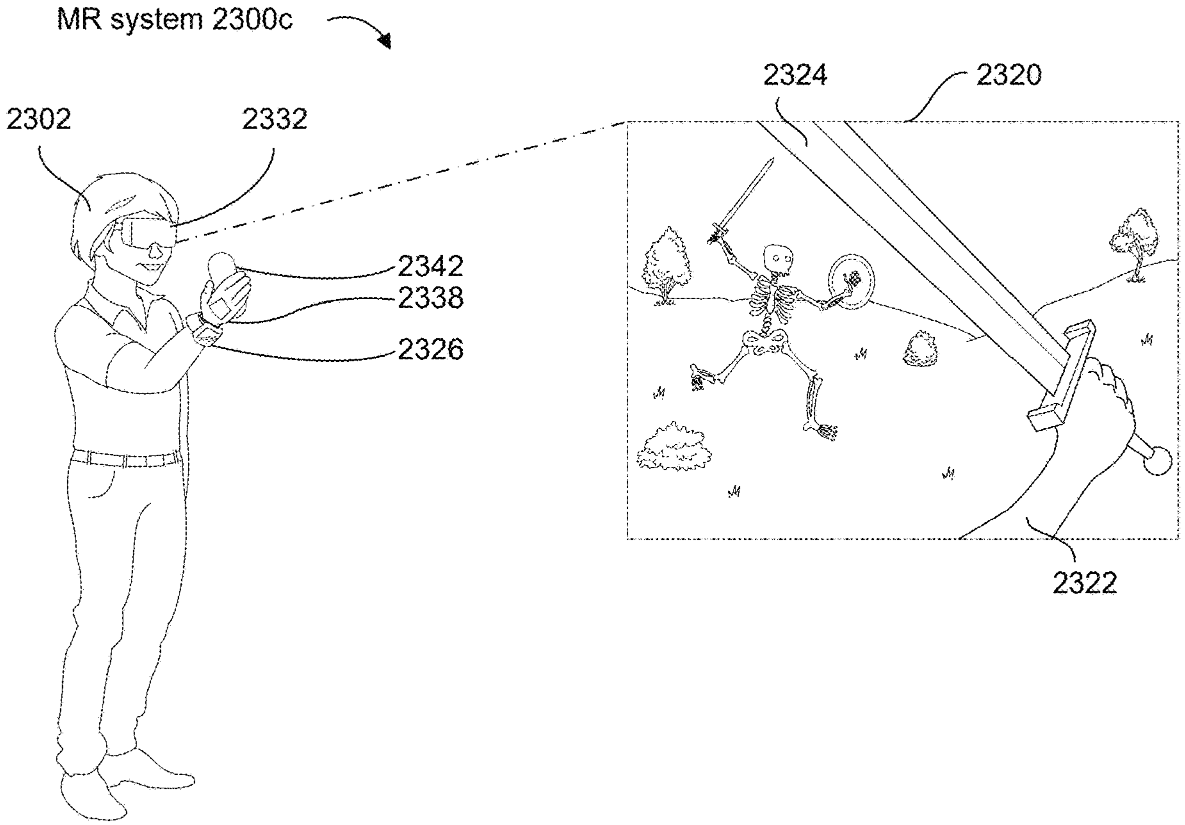
Figures 2, 23C:
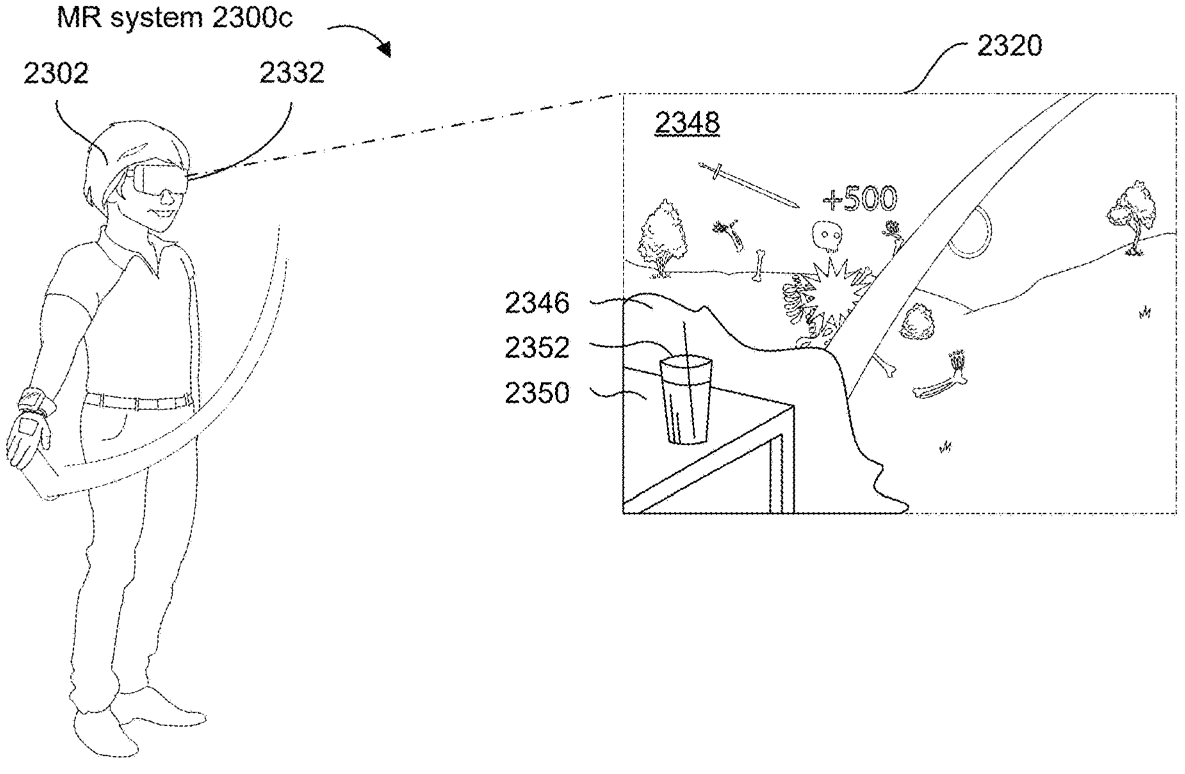

FIGS. 23A, 23B, 23C-1, and 23C-2, illustrate example XR systems that include AR and MR systems, in accordance with some embodiments. FIG. 23A shows a first XR system 2300*a* and first example user interactions using a wrist-wearable device 2326, a head-wearable device (e.g., AR device 2328), and/or a HIPD 2342. FIG. 23B shows a second XR system 2300*b* and second example user interactions using a wrist-wearable device 2326, AR device 2328, and/or an HIPD 2342. FIGS. 23C-1 and 23C-2 show a third MR system 2300*c* and third example user interactions using a wrist-wearable device 2326, a head-wearable device (e.g., an MR device such as a VR device), and/or an HIPD 2342. As the skilled artisan will appreciate upon reading the descriptions provided herein, the above-example AR and MR systems (described in detail below) can perform various functions and/or operations.

The wrist-wearable device 2326, the head-wearable devices, and/or the HIPD 2342 can communicatively couple via a network 2325 (e.g., cellular, near field, Wi-Fi, personal area network, wireless LAN). Additionally, the wrist-wearable device 2326, the head-wearable device, and/or the HIPD 2342 can also communicatively couple with one or more servers 2330, computers 2340 (e.g., laptops, computers), mobile devices 2350 (e.g., smartphones, tablets), and/or other electronic devices via the network 2325 (e.g., cellular, near field, Wi-Fi, personal area network, wireless LAN). Similarly, a smart textile-based garment, when used, can also communicatively couple with the wrist-wearable device 2326, the head-wearable device(s), the HIPD 2342, the one or more servers 2330, the computers 2340, the mobile devices 2350, and/or other electronic devices via the network 2325 to provide inputs.

Turning to FIG. 23A, a user 2302 is shown wearing the wrist-wearable device 2326 and the AR device 2328 and having the HIPD 2342 on their desk. The wrist-wearable device 2326, the AR device 2328, and the HIPD 2342 facilitate user interaction with an AR environment. In particular, as shown by the first AR system 2300*a*, the wrist-wearable device 2326, the AR device 2328, and/or the HIPD 2342 cause presentation of one or more avatars 2304, digital representations of contacts 2306, and virtual objects 2308. As discussed below, the user 2302 can interact with the one or more avatars 2304, digital representations of the contacts 2306, and virtual objects 2308 via the wrist-wearable device 2326, the AR device 2328, and/or the HIPD 2342. In addition, the user 2302 is also able to directly view physical objects in the environment, such as a physical table 2329, through transparent lens(es) and waveguide(s) of the AR device 2328. Alternatively, an MR device could be used in place of the AR device 2328 and a similar user experience can take place, but the user would not be directly viewing physical objects in the environment, such as table 2329, and would instead be presented with a virtual reconstruction of the table 2329 produced from one or more sensors of the MR device (e.g., an outward facing camera capable of recording the surrounding environment).

The user 2302 can use any of the wrist-wearable device 2326, the AR device 2328 (e.g., through physical inputs at the AR device and/or built-in motion tracking of a user's extremities), a smart-textile garment, externally mounted extremity tracking device, the HIPD 2342 to provide user inputs, etc. For example, the user 2302 can perform one or more hand gestures that are detected by the wrist-wearable device 2326 (e.g., using one or more EMG sensors and/or IMUs built into the wrist-wearable device) and/or AR device 2328 (e.g., using one or more image sensors or cameras) to provide a user input. Alternatively, or additionally, the user 2302 can provide a user input via one or more touch surfaces of the wrist-wearable device 2326, the AR device 2328, and/or the HIPD 2342, and/or voice commands captured by a microphone of the wrist-wearable device 2326, the AR device 2328, and/or the HIPD 2342. The wrist-wearable device 2326, the AR device 2328, and/or the HIPD 2342 include an artificially intelligent digital assistant to help the user in providing a user input (e.g., completing a sequence of operations, suggesting different operations or commands, providing reminders, confirming a command). For example, the digital assistant can be invoked through an input occurring at the AR device 2328 (e.g., via an input at a temple arm of the AR device 2328). In some embodiments, the user 2302 can provide a user input via one or more facial gestures and/or facial expressions. For example, cameras of the wrist-wearable device 2326, the AR device 2328, and/or the HIPD 2342 can track the user 2302's eyes for navigating a user interface.

The wrist-wearable device 2326, the AR device 2328, and/or the HIPD 2342 can operate alone or in conjunction to allow the user 2302 to interact with the AR environment. In some embodiments, the HIPD 2342 is configured to operate as a central hub or control center for the wrist-wearable device 2326, the AR device 2328, and/or another communicatively coupled device. For example, the user 2302 can provide an input to interact with the AR environment at any of the wrist-wearable device 2326, the AR device 2328, and/or the HIPD 2342, and the HIPD 2342 can identify one or more back-end and front-end tasks to cause the performance of the requested interaction and distribute instructions to cause the performance of the one or more back-end and front-end tasks at the wrist-wearable device 2326, the AR device 2328, and/or the HIPD 2342. In some embodiments, a back-end task is a background-processing task that is not perceptible by the user (e.g., rendering content, decompression, compression, application-specific operations), and a front-end task is a user-facing task that is perceptible to the user (e.g., presenting information to the user, providing feedback to the user). The HIPD 2342 can perform the back-end tasks and provide the wrist-wearable device 2326 and/or the AR device 2328 operational data corresponding to the performed back-end tasks such that the wrist-wearable device 2326 and/or the AR device 2328 can perform the front-end tasks. In this way, the HIPD 2342, which has more computational resources and greater thermal headroom than the wrist-wearable device 2326 and/or the AR device 2328, performs computationally intensive tasks and reduces the computer resource utilization and/or power usage of the wrist-wearable device 2326 and/or the AR device 2328.

In the example shown by the first AR system 2300*a*, the HIPD 2342 identifies one or more back-end tasks and front-end tasks associated with a user request to initiate an AR video call with one or more other users (represented by the avatar 2304 and the digital representation of the contact 2306) and distributes instructions to cause the performance of the one or more back-end tasks and front-end tasks. In particular, the HIPD 2342 performs back-end tasks for processing and/or rendering image data (and other data) associated with the AR video call and provides operational data associated with the performed back-end tasks to the AR device 2328 such that the AR device 2328 performs front-end tasks for presenting the AR video call (e.g., presenting the avatar 2304 and the digital representation of the contact 2306).

In some embodiments, the HIPD 2342 can operate as a focal or anchor point for causing the presentation of information. This allows the user 2302 to be generally aware of where information is presented. For example, as shown in the first AR system 2300*a*, the avatar 2304 and the digital representation of the contact 2306 are presented above the HIPD 2342. In particular, the HIPD 2342 and the AR device 2328 operate in conjunction to determine a location for presenting the avatar 2304 and the digital representation of the contact 2306. In some embodiments, information can be presented within a predetermined distance from the HIPD 2342 (e.g., within five meters). For example, as shown in the first AR system 2300*a*, virtual object 2308 is presented on the desk some distance from the HIPD 2342. Similar to the above example, the HIPD 2342 and the AR device 2328 can operate in conjunction to determine a location for presenting the virtual object 2308. Alternatively, in some embodiments, presentation of information is not bound by the HIPD 2342. More specifically, the avatar 2304, the digital representation of the contact 2306, and the virtual object 2308 do not have to be presented within a predetermined distance of the HIPD 2342. While an AR device 2328 is described working with an HIPD, an MR headset can be interacted with in the same way as the AR device 2328.

User inputs provided at the wrist-wearable device 2326, the AR device 2328, and/or the HIPD 2342 are coordinated such that the user can use any device to initiate, continue, and/or complete an operation. For example, the user 2302 can provide a user input to the AR device 2328 to cause the AR device 2328 to present the virtual object 2308 and, while the virtual object 2308 is presented by the AR device 2328, the user 2302 can provide one or more hand gestures via the wrist-wearable device 2326 to interact and/or manipulate the virtual object 2308. While an AR device 2328 is described working with a wrist-wearable device 2326, an MR headset can be interacted with in the same way as the AR device 2328.

Integration of Artificial Intelligence with XR Systems

FIG. 23A illustrates an interaction in which an artificially intelligent virtual assistant can assist in requests made by a user 2302. The AI virtual assistant can be used to complete open-ended requests made through natural language inputs by a user 2302. For example, in FIG. 23A the user 2302 makes an audible request 2344 to summarize the conversation and then share the summarized conversation with others in the meeting. In addition, the AI virtual assistant is configured to use sensors of the XR system (e.g., cameras of an XR headset, microphones, and various other sensors of any of the devices in the system) to provide contextual prompts to the user for initiating tasks.

FIG. 23A also illustrates an example neural network 2352 used in Artificial Intelligence applications. Uses of Artificial Intelligence (AI) are varied and encompass many different aspects of the devices and systems described herein. AI capabilities cover a diverse range of applications and deepen interactions between the user 2302 and user devices (e.g., the AR device 2328, an MR device 2332, the HIPD 2342, the wrist-wearable device 2326). The AI discussed herein can be derived using many different training techniques. While the primary AI model example discussed herein is a neural network, other AI models can be used. Non-limiting examples of AI models include artificial neural networks (ANNs), deep neural networks (DNNs), convolution neural networks (CNNs), recurrent neural networks (RNNs), large language models (LLMs), long short-term memory networks, transformer models, decision trees, random forests, support vector machines, k-nearest neighbors, genetic algorithms, Markov models, Bayesian networks, fuzzy logic systems, and deep reinforcement learnings, etc. The AI models can be implemented at one or more of the user devices, and/or any other devices described herein. For devices and systems herein that employ multiple AI models, different models can be used depending on the task. For example, for a natural-language artificially intelligent virtual assistant, an LLM can be used and for the object detection of a physical environment, a DNN can be used instead.

In another example, an AI virtual assistant can include many different AI models and based on the user's request, multiple AI models may be employed (concurrently, sequentially or a combination thereof). For example, an LLM-based AI model can provide instructions for helping a user follow a recipe and the instructions can be based in part on another AI model that is derived from an ANN, a DNN, an RNN, etc. that is capable of discerning what part of the recipe the user is on (e.g., object and scene detection).

As AI training models evolve, the operations and experiences described herein could potentially be performed with different models other than those listed above, and a person skilled in the art would understand that the list above is non-limiting.

A user 2302 can interact with an AI model through natural language inputs captured by a voice sensor, text inputs, or any other input modality that accepts natural language and/or a corresponding voice sensor module. In another instance, input is provided by tracking the eye gaze of a user 2302 via a gaze tracker module. Additionally, the AI model can also receive inputs beyond those supplied by a user 2302. For example, the AI can generate its response further based on environmental inputs (e.g., temperature data, image data, video data, ambient light data, audio data, GPS location data, inertial measurement (i.e., user motion) data, pattern recognition data, magnetometer data, depth data, pressure data, force data, neuromuscular data, heart rate data, temperature data, sleep data) captured in response to a user request by various types of sensors and/or their corresponding sensor modules. The sensors' data can be retrieved entirely from a single device (e.g., AR device 2328) or from multiple devices that are in communication with each other (e.g., a system that includes at least two of an AR device 2328, an MR device 2332, the HIPD 2342, the wrist-wearable device 2326, etc.). The AI model can also access additional information (e.g., one or more servers 2330, the computers 2340, the mobile devices 2350, and/or other electronic devices) via a network 2325.

A non-limiting list of AI-enhanced functions includes but is not limited to image recognition, speech recognition (e.g., automatic speech recognition), text recognition (e.g., scene text recognition), pattern recognition, natural language processing and understanding, classification, regression, clustering, anomaly detection, sequence generation, content generation, and optimization. In some embodiments, AI-enhanced functions are fully or partially executed on cloud-computing platforms communicatively coupled to the user devices (e.g., the AR device 2328, an MR device 2332, the HIPD 2342, the wrist-wearable device 2326) via the one or more networks. The cloud-computing platforms provide scalable computing resources, distributed computing, managed AI services, interference acceleration, pre-trained models, APIs and/or other resources to support comprehensive computations required by the AI-enhanced function.

Example outputs stemming from the use of an AI model can include natural language responses, mathematical calculations, charts displaying information, audio, images, videos, texts, summaries of meetings, predictive operations based on environmental factors, classifications, pattern recognitions, recommendations, assessments, or other operations. In some embodiments, the generated outputs are stored on local memories of the user devices (e.g., the AR device 2328, an MR device 2332, the HIPD 2342, the wrist-wearable device 2326), storage options of the external devices (servers, computers, mobile devices, etc.), and/or storage options of the cloud-computing platforms.

The AI-based outputs can be presented across different modalities (e.g., audio-based, visual-based, haptic-based, and any combination thereof) and across different devices of the XR system described herein. Some visual-based outputs can include the displaying of information on XR augments of an XR headset, user interfaces displayed at a wrist-wearable device, laptop device, mobile device, etc. On devices with or without displays (e.g., HIPD 2342), haptic feedback can provide information to the user 2302. An AI model can also use the inputs described above to determine the appropriate modality and device(s) to present content to the user (e.g., a user walking on a busy road can be presented with an audio output instead of a visual output to avoid distracting the user 2302).

Example Augmented Reality Interaction

FIG. 23B shows the user 2302 wearing the wrist-wearable device 2326 and the AR device 2328 and holding the HIPD 2342. In the second AR system 2300*b*, the wrist-wearable device 2326, the AR device 2328, and/or the HIPD 2342 are used to receive and/or provide one or more messages to a contact of the user 2302. In particular, the wrist-wearable device 2326, the AR device 2328, and/or the HIPD 2342 detect and coordinate one or more user inputs to initiate a messaging application and prepare a response to a received message via the messaging application.

In some embodiments, the user 2302 initiates, via a user input, an application on the wrist-wearable device 2326, the AR device 2328, and/or the HIPD 2342 that causes the application to initiate on at least one device. For example, in the second AR system 2300*b* the user 2302 performs a hand gesture associated with a command for initiating a messaging application (represented by messaging user interface 2312); the wrist-wearable device 2326 detects the hand gesture; and, based on a determination that the user 2302 is wearing the AR device 2328, causes the AR device 2328 to present a messaging user interface 2312 of the messaging application. The AR device 2328 can present the messaging user interface 2312 to the user 2302 via its display (e.g., as shown by user 2302's field of view 2310). In some embodiments, the application is initiated and can be run on the device (e.g., the wrist-wearable device 2326, the AR device 2328, and/or the HIPD 2342) that detects the user input to initiate the application, and the device provides another device operational data to cause the presentation of the messaging application. For example, the wrist-wearable device 2326 can detect the user input to initiate a messaging application, initiate and run the messaging application, and provide operational data to the AR device 2328 and/or the HIPD 2342 to cause presentation of the messaging application. Alternatively, the application can be initiated and run at a device other than the device that detected the user input. For example, the wrist-wearable device 2326 can detect the hand gesture associated with initiating the messaging application and cause the HIPD 2342 to run the messaging application and coordinate the presentation of the messaging application.

Further, the user 2302 can provide a user input provided at the wrist-wearable device 2326, the AR device 2328, and/or the HIPD 2342 to continue and/or complete an operation initiated at another device. For example, after initiating the messaging application via the wrist-wearable device 2326 and while the AR device 2328 presents the messaging user interface 2312, the user 2302 can provide an input at the HIPD 2342 to prepare a response (e.g., shown by the swipe gesture performed on the HIPD 2342). The user 2302's gestures performed on the HIPD 2342 can be provided and/or displayed on another device. For example, the user 2302's swipe gestures performed on the HIPD 2342 are displayed on a virtual keyboard of the messaging user interface 2312 displayed by the AR device 2328.

In some embodiments, the wrist-wearable device 2326, the AR device 2328, the HIPD 2342, and/or other communicatively coupled devices can present one or more notifications to the user 2302. The notification can be an indication of a new message, an incoming call, an application update, a status update, etc. The user 2302 can select the notification via the wrist-wearable device 2326, the AR device 2328, or the HIPD 2342 and cause presentation of an application or operation associated with the notification on at least one device. For example, the user 2302 can receive a notification that a message was received at the wrist-wearable device 2326, the AR device 2328, the HIPD 2342, and/or other communicatively coupled device and provide a user input at the wrist-wearable device 2326, the AR device 2328, and/or the HIPD 2342 to review the notification, and the device detecting the user input can cause an application associated with the notification to be initiated and/or presented at the wrist-wearable device 2326, the AR device 2328, and/or the HIPD 2342.

While the above example describes coordinated inputs used to interact with a messaging application, the skilled artisan will appreciate upon reading the descriptions that user inputs can be coordinated to interact with any number of applications including, but not limited to, gaming applications, social media applications, camera applications, web-based applications, financial applications, etc. For example, the AR device 2328 can present to the user 2302 game application data and the HIPD 2342 can use a controller to provide inputs to the game. Similarly, the user 2302 can use the wrist-wearable device 2326 to initiate a camera of the AR device 2328, and the user can use the wrist-wearable device 2326, the AR device 2328, and/or the HIPD 2342 to manipulate the image capture (e.g., zoom in or out, apply filters) and capture image data.

While an AR device 2328 is shown being capable of certain functions, it is understood that an AR device can be an AR device with varying functionalities based on costs and market demands. For example, an AR device may include a single output modality such as an audio output modality. In another example, the AR device may include a low-fidelity display as one of the output modalities, where simple information (e.g., text and/or low-fidelity images/video) is capable of being presented to the user. In yet another example, the AR device can be configured with face-facing light emitting diodes (LEDs) configured to provide a user with information, e.g., an LED around the right-side lens can illuminate to notify the wearer to turn right while directions are being provided or an LED on the left-side can illuminate to notify the wearer to turn left while directions are being provided. In another embodiment, the AR device can include an outward-facing projector such that information (e.g., text information, media) may be displayed on the palm of a user's hand or other suitable surface (e.g., a table, whiteboard). In yet another embodiment, information may also be provided by locally dimming portions of a lens to emphasize portions of the environment in which the user's attention should be directed. Some AR devices can present AR augments either monocularly or binocularly (e.g., an AR augment can be presented at only a single display associated with a single lens as opposed presenting an AR augmented at both lenses to produce a binocular image). In some instances an AR device capable of presenting AR augments binocularly can optionally display AR augments monocularly as well (e.g., for power-saving purposes or other presentation considerations). These examples are non-exhaustive and features of one AR device described above can be combined with features of another AR device described above. While features and experiences of an AR device have been described generally in the preceding sections, it is understood that the described functionalities and experiences can be applied in a similar manner to an MR headset, which is described below in the proceeding sections.

Example Mixed Reality Interaction

Turning to FIGS. 23C-1 and 23C-2, the user 2302 is shown wearing the wrist-wearable device 2326 and an MR device 2332 (e.g., a device capable of providing either an entirely VR experience or an MR experience that displays object(s) from a physical environment at a display of the device) and holding the HIPD 2342. In the third AR system 2300*c*, the wrist-wearable device 2326, the MR device 2332, and/or the HIPD 2342 are used to interact within an MR environment, such as a VR game or other MR/VR application. While the MR device 2332 presents a representation of a VR game (e.g., first MR game environment 2320) to the user 2302, the wrist-wearable device 2326, the MR device 2332, and/or the HIPD 2342 detect and coordinate one or more user inputs to allow the user 2302 to interact with the VR game.

In some embodiments, the user 2302 can provide a user input via the wrist-wearable device 2326, the MR device 2332, and/or the HIPD 2342 that causes an action in a corresponding MR environment. For example, the user 2302 in the third MR system 2300*c* (shown in FIG. 23C-1) raises the HIPD 2342 to prepare for a swing in the first MR game environment 2320. The MR device 2332, responsive to the user 2302 raising the HIPD 2342, causes the MR representation of the user 2322 to perform a similar action (e.g., raise a virtual object, such as a virtual sword 2324). In some embodiments, each device uses respective sensor data and/or image data to detect the user input and provide an accurate representation of the user 2302's motion. For example, image sensors (e.g., SLAM cameras or other cameras) of the HIPD 2342 can be used to detect a position of the HIPD 2342 relative to the user 2302's body such that the virtual object can be positioned appropriately within the first MR game environment 2320; sensor data from the wrist-wearable device 2326 can be used to detect a velocity at which the user 2302 raises the HIPD 2342 such that the MR representation of the user 2322 and the virtual sword 2324 are synchronized with the user 2302's movements; and image sensors of the MR device 2332 can be used to represent the user 2302's body, boundary conditions, or real-world objects within the first MR game environment 2320.

In FIG. 23C-2, the user 2302 performs a downward swing while holding the HIPD 2342. The user 2302's downward swing is detected by the wrist-wearable device 2326, the MR device 2332, and/or the HIPD 2342 and a corresponding action is performed in the first MR game environment 2320. In some embodiments, the data captured by each device is used to improve the user's experience within the MR environment. For example, sensor data of the wrist-wearable device 2326 can be used to determine a speed and/or force at which the downward swing is performed and image sensors of the HIPD 2342 and/or the MR device 2332 can be used to determine a location of the swing and how it should be represented in the first MR game environment 2320, which, in turn, can be used as inputs for the MR environment (e.g., game mechanics, which can use detected speed, force, locations, and/or aspects of the user 2302's actions to classify a user's inputs (e.g., user performs a light strike, hard strike, critical strike, glancing strike, miss) or calculate an output (e.g., amount of damage)).

FIG. 23C-2 further illustrates that a portion of the physical environment is reconstructed and displayed at a display of the MR device 2332 while the MR game environment 2320 is being displayed. In this instance, a reconstruction of the physical environment 2346 is displayed in place of a portion of the MR game environment 2320 when object(s) in the physical environment are potentially in the path of the user (e.g., a collision with the user and an object in the physical environment are likely). Thus, this example MR game environment 2320 includes (i) an immersive VR portion 2348 (e.g., an environment that does not have a corollary counterpart in a nearby physical environment) and (ii) a reconstruction of the physical environment 2346 (e.g., table 2350 and cup 2352). While the example shown here is an MR environment that shows a reconstruction of the physical environment to avoid collisions, other uses of reconstructions of the physical environment can be used, such as defining features of the virtual environment based on the surrounding physical environment (e.g., a virtual column can be placed based on an object in the surrounding physical environment (e.g., a tree)).

While the wrist-wearable device 2326, the MR device 2332, and/or the HIPD 2342 are described as detecting user inputs, in some embodiments, user inputs are detected at a single device (with the single device being responsible for distributing signals to the other devices for performing the user input). For example, the HIPD 2342 can operate an application for generating the first MR game environment 2320 and provide the MR device 2332 with corresponding data for causing the presentation of the first MR game environment 2320, as well as detect the user 2302's movements (while holding the HIPD 2342) to cause the performance of corresponding actions within the first MR game environment 2320. Additionally or alternatively, in some embodiments, operational data (e.g., sensor data, image data, application data, device data, and/or other data) of one or more devices is provided to a single device (e.g., the HIPD 2342) to process the operational data and cause respective devices to perform an action associated with processed operational data.

In some embodiments, the user 2302 can wear a wrist-wearable device 2326, wear an MR device 2332, wear smart textile-based garments 2338 (e.g., wearable haptic gloves), and/or hold an HIPD 2342 device. In this embodiment, the wrist-wearable device 2326, the MR device 2332, and/or the smart textile-based garments 2338 are used to interact within an MR environment (e.g., any AR or MR system described above in reference to FIGS. 23A-23B). While the MR device 2332 presents a representation of an MR game (e.g., second MR game environment 2320) to the user 2302, the wrist-wearable device 2326, the MR device 2332, and/or the smart textile-based garments 2338 detect and coordinate one or more user inputs to allow the user 2302 to interact with the MR environment.

In some embodiments, the user 2302 can provide a user input via the wrist-wearable device 2326, an HIPD 2342, the MR device 2332, and/or the smart textile-based garments 2338 that causes an action in a corresponding MR environment. In some embodiments, each device uses respective sensor data and/or image data to detect the user input and provide an accurate representation of the user 2302's motion. While four different input devices are shown (e.g., a wrist-wearable device 2326, an MR device 2332, an HIPD 2342, and a smart textile-based garment 2338) each one of these input devices entirely on its own can provide inputs for fully interacting with the MR environment. For example, the wrist-wearable device can provide sufficient inputs on its own for interacting with the MR environment. In some embodiments, if multiple input devices are used (e.g., a wrist-wearable device and the smart textile-based garment 2338) sensor fusion can be utilized to ensure inputs are correct. While multiple input devices are described, it is understood that other input devices can be used in conjunction or on their own instead, such as but not limited to external motion-tracking cameras, other wearable devices fitted to different parts of a user, apparatuses that allow for a user to experience walking in an MR environment while remaining substantially stationary in the physical environment, etc.

As described above, the data captured by each device is used to improve the user's experience within the MR environment. Although not shown, the smart textile-based garments 2338 can be used in conjunction with an MR device and/or an HIPD 2342.

While some experiences are described as occurring on an AR device and other experiences are described as occurring on an MR device, one skilled in the art would appreciate that experiences can be ported over from an MR device to an AR device, and vice versa.

Some definitions of devices and components that can be included in some or all of the example devices discussed are defined here for ease of reference. A skilled artisan will appreciate that certain types of the components described may be more suitable for a particular set of devices, and less suitable for a different set of devices. But subsequent reference to the components defined here should be considered to be encompassed by the definitions provided.

In some embodiments example devices and systems, including electronic devices and systems, will be discussed. Such example devices and systems are not intended to be limiting, and one of skill in the art will understand that alternative devices and systems to the example devices and systems described herein may be used to perform the operations and construct the systems and devices that are described herein.

As described herein, an electronic device is a device that uses electrical energy to perform a specific function. It can be any physical object that contains electronic components such as transistors, resistors, capacitors, diodes, and integrated circuits. Examples of electronic devices include smartphones, laptops, digital cameras, televisions, gaming consoles, and music players, as well as the example electronic devices discussed herein. As described herein, an intermediary electronic device is a device that sits between two other electronic devices, and/or a subset of components of one or more electronic devices and facilitates communication, and/or data processing and/or data transfer between the respective electronic devices and/or electronic components.

The foregoing descriptions of FIGS. 23A-23C-2 provided above are intended to augment the description provided in reference to FIGS. 1A-22D. While terms in the following description may not be identical to terms used in the foregoing description, a person having ordinary skill in the art would understand these terms to have the same meaning.

Any data collection performed by the devices described herein and/or any devices configured to perform or cause the performance of the different embodiments described above in reference to any of the Figures, hereinafter the "devices," is done with user consent and in a manner that is consistent with all applicable privacy laws. Users are given options to allow the devices to collect data, as well as the option to limit or deny collection of data by the devices. A user is able to opt in or opt out of any data collection at any time. Further, users are given the option to request the removal of any collected data.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A non-transitory computer readable storage medium including executable instructions that, when executed by one or more processors, cause the one or more processors to:

while a user is wearing an extended-reality (XR) headset:

cause the XR headset to present a glance user interface element at a first portion of a display of the XR headset;

in response to a first request from the user of the XR headset to display a follow user interface element, cause the XR headset to present the follow user interface element at a second portion of the display of the XR headset and cease presenting the glance user interface element, wherein the second portion is larger than the first portion; and in response to a second request from the user of the XR headset to display an application user interface element, cause the XR headset to present the application user interface element at a third portion of the display of the XR headset and cease presenting the glance user interface element, wherein the third portion is larger than the second portion.

2. The non-transitory computer readable storage medium of claim 1, wherein:

the application user interface element includes a launcher menu;

the launcher menu includes a plurality of selectable application icons; and each selectable application icon of the plurality of selectable application icons is associated with a respective application executable at one or more of the XR headset and another device communicatively coupled to the XR headset.

3. The non-transitory computer readable storage medium of claim 2, wherein the executable instructions further cause the one or more processors to:

while the XR headset is presenting the application user interface element including the launcher menu and in response to an icon select user input directed at a first selectable application icon of the plurality of selectable application icons associated with a first application, cause the XR headset to present an application XR augment associated with the first application.

4. The non-transitory computer readable storage medium of claim 3, wherein the executable instructions further cause the one or more processors to:

while the XR headset is presenting the application user interface element including the launcher menu and in response to another icon select user input directed at a second selectable application icon of the plurality of selectable application icons associated with a second application, cause the XR headset to present a first application XR augment associated with the first application and a second application XR augment associated with the second application.

5. The non-transitory computer readable storage medium of claim 4, wherein the first application XR augment is presented at a first subportion of the third portion of the display and the second application XR augment is displayed at a second subportion of the third portion of the display, distinct from the first subportion.

6. The non-transitory computer readable storage medium of claim 1, wherein:

while the XR headset presents the application user interface element, the application user interface element appears at a first location in an environment around the user; and the executable instructions further cause the one or more processors to:

while the XR headset presents the application user interface element and in response to the user changing a position of their head, cause the XR headset to present the application user interface element such that the application user interface element continues to appear at the first location in the environment.

7. The non-transitory computer readable storage medium of claim 6, wherein the executable instructions further cause the one or more processors to:

while the XR headset presents the application user interface element and in accordance with a determination that the user has changed the position of their head such that the first location in the environment is no longer within a field-of-view of the user, cause the XR headset to cease presenting the application user interface element.

8. The non-transitory computer readable storage medium of claim 7, wherein the executable instructions further cause the one or more processors to:

in accordance with the determination that the user has changed the position of their head such that the first location in the environment is no longer within the field-of-view of the user, cause the XR headset to present the follow user interface element at the second portion of the display of the XR headset.

9. The non-transitory computer readable storage medium of claim 1, wherein the executable instructions further cause the one or more processors to:

in response to a third request from the user of the XR headset to display an exclusive interface, cause the XR headset to present the exclusive interface at a fourth portion of the display of the XR headset and cease presenting the glance user interface element, wherein the fourth portion is larger than the third portion.

10. The non-transitory computer readable storage medium of claim 1, wherein the executable instructions further cause the one or more processors to:

while the XR headset is presenting one or more of the follow user interface element and the application user interface element and in response to a fourth request from the user of the XR headset to display the glance user interface element, cause the XR headset to present the glance user interface element at the first portion of the display of the XR headset and cease presenting the one or more of the follow user interface element and the application user interface element.

11. The non-transitory computer readable storage medium of claim 1, wherein the executable instructions further cause the one or more processors to:

in response to a sleep mode request to the user of the XR headset to enter a sleep mode, cause the XR headset to cease presenting the glance user interface element.

12. The non-transitory computer readable storage medium of claim 1, wherein the glance user interface element indicates to the user that a notification has been received at one or more of the XR headset and another device communicatively coupled to the XR headset.

13. The non-transitory computer readable storage medium of claim 1, wherein the follow user interface element includes information from an application executed at one or more of the XR headset and another device communicatively coupled to the XR headset.

14. The non-transitory computer readable storage medium of claim 1, wherein the application user interface element includes one or more of application XR augments, each application XR augment of the one or more application XR augments including respective information from a respective application executed at one or more of the XR headset and another device communicatively coupled to the XR headset.

15. The non-transitory computer readable storage medium of claim 1, wherein the executable instructions further cause the one or more processors to:

while the XR headset presents the glance user interface element and in response to the user changing a position of their head, continue to cause the XR headset to present the glance user interface element at the first portion of the display of the XR headset.

16. The non-transitory computer readable storage medium of claim 1, wherein the executable instructions further cause the one or more processors to:

while the XR headset presents the follow user interface element and in response to the user changing a position of their head, continue to cause the XR headset to present the follow user interface element at the second portion of the display of the XR headset.

17. The non-transitory computer readable storage medium of claim 1, wherein the executable instructions further cause the one or more processors to:

while the XR headset is presenting the follow user interface element and in response to the second request from the user of the XR headset to display the application user interface element, cause the XR headset to present the application user interface element at the third portion of the display of the XR headset and cease presenting the follow user interface element.

18. The non-transitory computer readable storage medium of claim 1, wherein the executable instructions further cause the one or more processors to:

while the XR headset is presenting the application user interface element and in response to the first request from the user of the XR headset to display the follow user interface element, cause the XR headset to present the follow user interface element at the second portion of the display of the XR headset and cease presenting the application user interface element.

19. A method comprising:

causing an extended-reality (XR) headset to present a glance user interface element at a first portion of a display of the XR headset;

in response to a first request from a user of the XR headset to display a follow user interface element, causing the XR headset to present the follow user interface element at a second portion of the display of the XR headset, wherein the second portion is larger than the first portion; and in response to a second request from the user of the XR headset to display an application user interface element, causing the XR headset to present the application user interface element at a third portion of the display of the XR headset, wherein the third portion is larger than the second portion.

20. An extended-reality (XR) headset including one or more displays, the XR headset configured to:

while a user is wearing the XR headset:

present a glance user interface element at a first portion of the one or more displays of the XR headset;

in response to a first request from the user of the XR headset to display a follow user interface element, present the follow user interface element at a second portion of the one or more displays of the XR headset, wherein the second portion is larger than the first portion; and in response to a second request from the user of the XR headset to display an application user interface element, present the application user interface element at a third portion of the one or more displays of the XR headset, wherein the third portion is larger than the second portion.

* * * * *